US010442914B2

(12) United States Patent
Condo et al.

(10) Patent No.: US 10,442,914 B2
(45) **Date of Patent: *Oct. 15, 2019**

(54) NANOCOMPOSITES CONTAINING SILICA NANOPARTICLES AND DISPERSANT, COMPOSITES, ARTICLES, AND METHODS OF MAKING SAME

(71) Applicant: 3M INNOVATIVE PROPERTIES COMPANY, St. Paul, MN (US)

(72) Inventors: Peter D. Condo, Lake Elmo, MN (US); Jeremy O. Swanson, Woodbury, MN (US); James E. Thorson, Hudson, WI (US); Kristin L. Thunhorst, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 188 days.

This patent is subject to a terminal disclaimer.

(21) Appl. No.: 14/911,058

(22) PCT Filed: Aug. 12, 2014

(86) PCT No.: PCT/US2014/050661

§ 371 (c)(1),
(2) Date: Feb. 9, 2016

(87) PCT Pub. No.: WO2015/023640

PCT Pub. Date: Feb. 19, 2015

(65) Prior Publication Data

US 2016/0200898 A1 Jul. 14, 2016

Related U.S. Application Data

(60) Provisional application No. 61/865,308, filed on Aug. 13, 2013, provisional application No. 61/909,575, filed on Nov. 27, 2013, provisional application No. 61/918,302, filed on Dec. 19, 2013, provisional application No. 62/018,993, filed on Jun. 30, 2014.

(51) Int. Cl.

| | |
|---|---|
| ***C08K 9/04*** | (2006.01) |
| ***C09D 7/40*** | (2018.01) |
| ***C08J 5/24*** | (2006.01) |
| ***C08K 9/06*** | (2006.01) |
| ***C08J 5/00*** | (2006.01) |
| ***C08K 7/00*** | (2006.01) |
| ***C08K 7/18*** | (2006.01) |
| ***C08K 7/28*** | (2006.01) |
| ***C08L 63/00*** | (2006.01) |
| ***C08K 3/36*** | (2006.01) |
| ***C09D 7/20*** | (2018.01) |

(52) U.S. Cl.

CPC ................ *C08K 9/04* (2013.01); *C08J 5/005* (2013.01); *C08J 5/24* (2013.01); *C08K 3/36* (2013.01); *C08K 7/00* (2013.01); *C08K 7/18* (2013.01); *C08K 7/28* (2013.01); *C08K 9/06* (2013.01); *C08L 63/00* (2013.01); *C09D 7/20* (2018.01); *C09D 7/40* (2018.01); *B05D 2601/02* (2013.01); *B05D 2601/22* (2013.01); *C08J 2333/08* (2013.01); *C08J 2333/24* (2013.01); *C08J 2363/00* (2013.01); *C08K 2201/003* (2013.01); *C08K 2201/011* (2013.01)

(58) Field of Classification Search

CPC .................................. C09D 7/40; C08K 9/04

See application file for complete search history.

(56) References Cited

U.S. PATENT DOCUMENTS

| | | | |
|---|---|---|---|
| 3,018,262 | A | 1/1962 | Schroeder |
| 3,298,998 | A | 1/1967 | McConnell |
| 3,562,223 | A | 2/1971 | Bargain |
| 3,627,780 | A | 12/1971 | Bonnard |
| 3,661,544 | A | 5/1972 | Whitaker |
| 3,839,358 | A | 10/1974 | Bargain |
| 4,100,140 | A | 7/1978 | Zahir |
| 4,157,360 | A | 6/1979 | Prevorsek |
| 4,447,564 | A | 5/1984 | Grimmer |
| 4,468,497 | A | 8/1984 | Street |
| 4,522,958 | A | 6/1985 | Das |
| 4,624,971 | A | 11/1986 | Van Tao |
| 4,842,837 | A | 6/1989 | Shimizu |
| 5,221,497 | A | 6/1993 | Watanabe |
| 5,648,407 | A | 7/1997 | Goetz |
| 5,717,009 | A | 2/1998 | Matsushita et al. |
| 5,733,644 | A | 3/1998 | Tanaka et al. |
| 6,703,116 | B2 | 3/2004 | Ohshima et al. |
| 7,175,118 | B2 | 2/2007 | Hockmeyer |

(Continued)

FOREIGN PATENT DOCUMENTS

| | | |
|---|---|---|
| CN | 1319737 | 10/2001 |
| CN | 101386700 | 3/2009 |

(Continued)

OTHER PUBLICATIONS

Birdi, ed., Handbook of Surface and Colloid Chemistry, 4th ed., pp. 640-641 (2015).

(Continued)

*Primary Examiner* — Megan McCulley
(74) *Attorney, Agent, or Firm* — Adrian L. Pishko

(57) ABSTRACT

A nanocomposite is provided including silica nanoparticles and a dispersant dispersed in a curable resin or a curing agent, where the nanocomposite contains less than 2% by weight solvent. The silica nanoparticles include nonspherical silica nanoparticles and/or spherical pyrogenic silica nanoparticles. A composite is also provided including from about 4 to 70 weight percent of silica nanoparticles, and a dispersant, dispersed in a cured resin, and a filler embedded in the cured resin. Optionally, the composite further contains a curing agent. Further, a method of preparing a nanoparticle-containing curable resin system is provided including mixing from 10 to 70 weight percent of aggregated silica nanoparticles with a curable resin and a dispersant to form a mixture. The mixture contains less than 2% by weight solvent. The method also includes milling the mixture in an immersion mill containing milling media to form a milled resin system including silica nanoparticles dispersed in the curable resin.

21 Claims, 17 Drawing Sheets

(56) References Cited

U.S. PATENT DOCUMENTS

| | | | | |
|---|---|---|---|---|
| 2001/0033924 | A1 | 10/2001 | Qian | |
| 2005/0245665 | A1 | 11/2005 | Chen | |
| 2005/0277723 | A1 | 12/2005 | Gong et al. | |
| 2006/0029811 | A1 | 2/2006 | Sugioka et al. | |
| 2006/0079623 | A1 | 4/2006 | Chen | |
| 2006/0148651 | A1 | 7/2006 | Lipinsky et al. | |
| 2006/0235127 | A1 | 10/2006 | Moad et al. | |
| 2007/0049660 | A1 | 3/2007 | Wilkenhoener et al. | |
| 2007/0135588 | A1 | 6/2007 | Diakoumakos et al. | |
| 2007/0199477 | A1 | 8/2007 | Hill | |
| 2007/0232727 | A1 | 10/2007 | Lin | |
| 2008/0176987 | A1 | 7/2008 | Trevet et al. | |
| 2008/0277814 | A1 | 11/2008 | Moszner et al. | |
| 2009/0137706 | A1 | 5/2009 | Healy | |
| 2009/0180976 | A1 | 7/2009 | Seeney | |
| 2009/0318598 | A1 | 12/2009 | Perez et al. | |
| 2010/0152325 | A1 | 6/2010 | Isayev et al. | |
| 2010/0283004 | A1 | 11/2010 | Lee et al. | |
| 2011/0079668 | A1 | 4/2011 | Nelson | |
| 2011/0097212 | A1 | 4/2011 | Thompson et al. | |
| 2011/0189432 | A1 | 8/2011 | Goto | |
| 2011/0245376 | A1 | 10/2011 | Schultz | |
| 2012/0059086 | A1 | 3/2012 | Nelson et al. | |
| 2012/0071586 | A1 | 3/2012 | Thunhorst | |
| 2012/0100770 | A1 | 4/2012 | Fung | |
| 2012/0202918 | A1 | 8/2012 | Singh et al. | |
| 2012/0214948 | A1 | 8/2012 | Condo | |
| 2012/0244338 | A1 | 9/2012 | Schultz | |
| 2012/0277378 | A1* | 11/2012 | Nelson .................. | B82Y 30/00 525/65 |
| 2013/0037310 | A1 | 2/2013 | Kimura | |
| 2013/0157061 | A1 | 6/2013 | Sogame et al. | |
| 2013/0317137 | A1 | 11/2013 | Thomasson et al. | |
| 2016/0194479 | A1 | 7/2016 | Condo et al. | |
| 2016/0194480 | A1 | 7/2016 | Condo et al. | |
| 2016/0194481 | A1 | 7/2016 | Condo et al. | |

FOREIGN PATENT DOCUMENTS

| | | |
|---|---|---|
| CN | 102112536 | 6/2011 |
| CN | 102458646 | 5/2012 |
| CN | 102690496 | 9/2012 |
| EP | 2 490 983 | 8/2016 |
| JP | H02-84400 | 3/1990 |
| JP | 2008-214568 | 9/2008 |
| WO | WO 2004-074574 | 9/2004 |
| WO | WO 2008-027979 | 3/2008 |
| WO | WO 2009-120846 | 10/2009 |
| WO | WO 2009-134538 | 11/2009 |
| WO | WO 2010-080459 | 7/2010 |
| WO | WO 2011-159521 | 12/2011 |
| WO | WO 2012-037265 | 3/2012 |
| WO | WO 2015-023642 | 2/2015 |
| WO | WO 2015-023718 | 2/2015 |
| WO | WO 2015-069347 | 5/2015 |

OTHER PUBLICATIONS

ASTM D2196-15, Standard Test Methods for Rheological Properties of Non-Newtonian Materials by Rotational Viscometer.

Azeez, "Epoxy clay nanocomposites—processing, properties and applications: A review", Composites: Part B, Feb. 2012, vol. 45, No. 1, pp. 308-320.

Becker, "Epoxy Layered Silicate Nanocomposites", Advances in Polymer Science, Jun. 6, 2005, vol. 179, pp. 29-82.

Goodman, Handbook of Thermoset Plastics, 122, 1998.

Hussain, "Polymer-matrix Nanocomposites, Processing, Manufacturing, And Application: An Overview", Journal of Composite Materials, 2006, vol. 40, No. 17, pp. 1511-1575.

Lee, Handbook of Epoxy Resins, 36-140, 1967.

Liu, "A novel approach of chemical functionalization on nano-scaled silica particles", Nanotechnology, 2003, vol. 14, pp. 813-819.

May, Epoxy Resins, Chemistry and Technology, 1-4, 1988.

Melo, "High Energy Mill Processing of Polymer Based Nanocomposites", Journal of Composite Materials, 2008, vol. 42, No. 22, pp. 2363-2375.

Utracki, "Synthetic, layered nanoparticles for polymeric nanocomposites (PNCs)", Polymer for Advanced Technologies, 2007, vol. 18, pp. 1-37.

International Search Report for PCT International Application No. PCT/US2014/050661, dated Nov. 7, 2014, 4pages.

Wang, et al., "Corrosion and Control of Tube," Northwestern Polytechnical University Press, Mar. 2013, pp. 137-138.

SpecialChem Product News, BYK Unveils DISPERBYK®-2152 Wetting & Dispersing Agent for Epoxy & Reactive Coatings, at https://coatings.specialchem.com/news/product-news/byk-unveils-disperbyk2152-wetting--dispersing-agent-for-epoxy--reactive-coatings (2012) (retrieved Nov. 26, 2018).

* cited by examiner

1μm

100nm

NANOCOMPOSITES CONTAINING SILICA NANOPARTICLES AND DISPERSANT, COMPOSITES, ARTICLES, AND METHODS OF MAKING SAME

CROSS REFERENCE TO RELATED APPLICATIONS

This application is a national stage filing under 35 U.S.C. 371 of PCT/US2014/050661, filed Aug. 12, 2014, which claims priority to U.S. Application No. 61/865,308, filed Aug. 13, 2013; U.S. Application No. 61/909,575, filed Nov. 27, 2013; U.S. Application No. 61/918,302, filed Dec. 19, 2013; and U.S. Application No. 62/018,993, filed Jun. 30, 2014 the disclosures of which are incorporated by reference in their entirety herein.

TECHNICAL FIELD

The present disclosure relates to nanocomposites, composites, and articles that contain silica nanoparticles and dispersant, as well as methods of making the same.

BACKGROUND

A persistent issue for nanocomposites, and in turn composites that contain nanoparticles, is cost, including cost associated with the processing steps. One approach to processing nanocomposites is a solvent-based approach where an aqueous dispersion of nanoparticles is the raw material. The dispersion is typically dilute, in which the nanoparticles are present in an amount between about 15-40 weight percent. A solvent, typically a water-miscible solvent, is added in a 1:1 ratio with the water in the dispersion, further diluting the nanoparticles. The solvent is typically chosen so that the dispersed state of the nanoparticles is maintained. The solvent further serves to counteract the thickening effect of silica nanoparticles on resin systems. A surface treating agent is typically used to make the nanoparticles more compatible with the matrix resin. The surface treating agent is typically soluble in the water:solvent:nanoparticle dispersion. After completion of the surface treatment process, the modified nanoparticle dispersion is mixed with resin. This is followed by removal of the water and solvent to yield a nanocomposite.

There is a cost associated with the processes of preparing the nanoparticle aqueous dispersion, addition of solvent, surface treatment of the nanoparticles, compounding the nanoparticles into a resin, and removal of the water and solvent to form the nanocomposite. The removal of water and solvent is typically the most expensive of these processes.

Another approach to processing nanocomposites is the solvent-free approach where dry, aggregated particles are reduced in size, surface treated, and compounded into a resin by a mechanical grinding process (e.g., milling) without the aid of a solvent.

SUMMARY

The present disclosure provides nanocomposites and articles that contain silica nanoparticles, and methods of making the nanocomposites and articles, which have decreased cost of materials and processing, as compared to other preparation approaches.

In a first embodiment, the present disclosure provides a nanocomposite including silica nanoparticles and a dispersant, dispersed in a curable resin, wherein the nanocomposite contains less than 2% by weight solvent. The silica nanoparticles include nonspherical silica nanoparticles, spherical pyrogenic silica nanoparticles, or a combination thereof.

In a second embodiment, the present disclosure provides a nanocomposite including silica nanoparticles and a dispersant dispersed in a curing agent, wherein the nanocomposite contains less than 2% by weight solvent. The silica nanoparticles include nonspherical silica nanoparticles, spherical pyrogenic silica nanoparticles, or a combination thereof.

In a third embodiment, the present disclosure provides a composite including from about 4 to 70 weight percent of silica nanoparticles, and a dispersant, dispersed in a cured resin, and a filler embedded in the cured resin. The silica nanoparticles include nonspherical silica nanoparticles, spherical pyrogenic silica nanoparticles, or a combination thereof. The filler comprises at least one of a reinforcing continuous fiber, reinforcing discontinuous fibers, and hollow glass bubbles.

In a fourth embodiment, the present disclosure provides an article including from about 10 to about 50 weight percent of silica nanoparticles, and a dispersant, dispersed in a cured resin. The silica nanoparticles include nonspherical silica nanoparticles, spherical pyrogenic silica nanoparticles, or a combination thereof.

In a fifth embodiment, the present disclosure provides a method of preparing a nanoparticle-containing curable resin system including mixing from 10 to 70 weight percent of aggregated silica nanoparticles with a curable resin, a first dispersant, and optionally a catalyst, a diluent, a surface treatment agent, and/or a curing agent, to form a mixture. The mixture contains less than 2% by weight solvent. The method further includes milling the first mixture in a first immersion mill containing milling media to form a milled resin system comprising silica nanoparticles and the dispersant dispersed in the curable resin.

Various unexpected results and advantages are obtained in exemplary embodiments of the disclosure. One such advantage of exemplary embodiments of the present disclosure is the ability to produce low cost, high performance silica nanocomposites and articles. Another potential advantage of exemplary embodiments of the present disclosure is the ability to prepare dispersions of silica nanoparticles in curable resin and/or in a curing agent at high loading amounts without the use of solvents.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the cited list serves only as a representative group and should not be interpreted as an exclusive list.

BRIEF DESCRIPTION OF THE DRAWINGS

FIG. 2 is a graph presenting the measured storage modulus in the rubber plateau region and in the glassy plateau region of each of Comparative Example 1a, Comparative Example 2a, Example 1a, Example 2a, Example 3a, Example 4a, Example 5a, and Example 6a.

FIG. 4 is a graph presenting the measured storage modulus in the rubber plateau region and in the glassy plateau region of each of Comparative Example 3a, Comparative Example 4a, and Example 9a.

FIG. 7 is a graph presenting the measured storage modulus in the rubber plateau region and in the glassy plateau region of each of Comparative Example 6a, Comparative Example 7a, Example 11a, and Example 12a.

FIG. 9 is a graph presenting the measured storage modulus in the rubber plateau region and in the glassy plateau region of each of Comparative Example 8a, Comparative Example 7b, Example 14a, Example 15a, and Example 16a.

FIG. 11 is a graph presenting the measured storage modulus in the rubber plateau region and in the glassy plateau region of each of Comparative Example 9a, Comparative Example 10a, Example 20a, and Example 21a.

FIG. 12A is a scanning electron microscope (SEM) image of Example 21a.

FIG. 13A is an SEM image of Example 20a.

FIG. 15 is a graph presenting the measured storage modulus in the rubber plateau region and in the glassy plateau region of each of Comparative Example 11a, Comparative Example 12a, Example 22a, and Example 23a.

DETAILED DESCRIPTION

Figure 1:
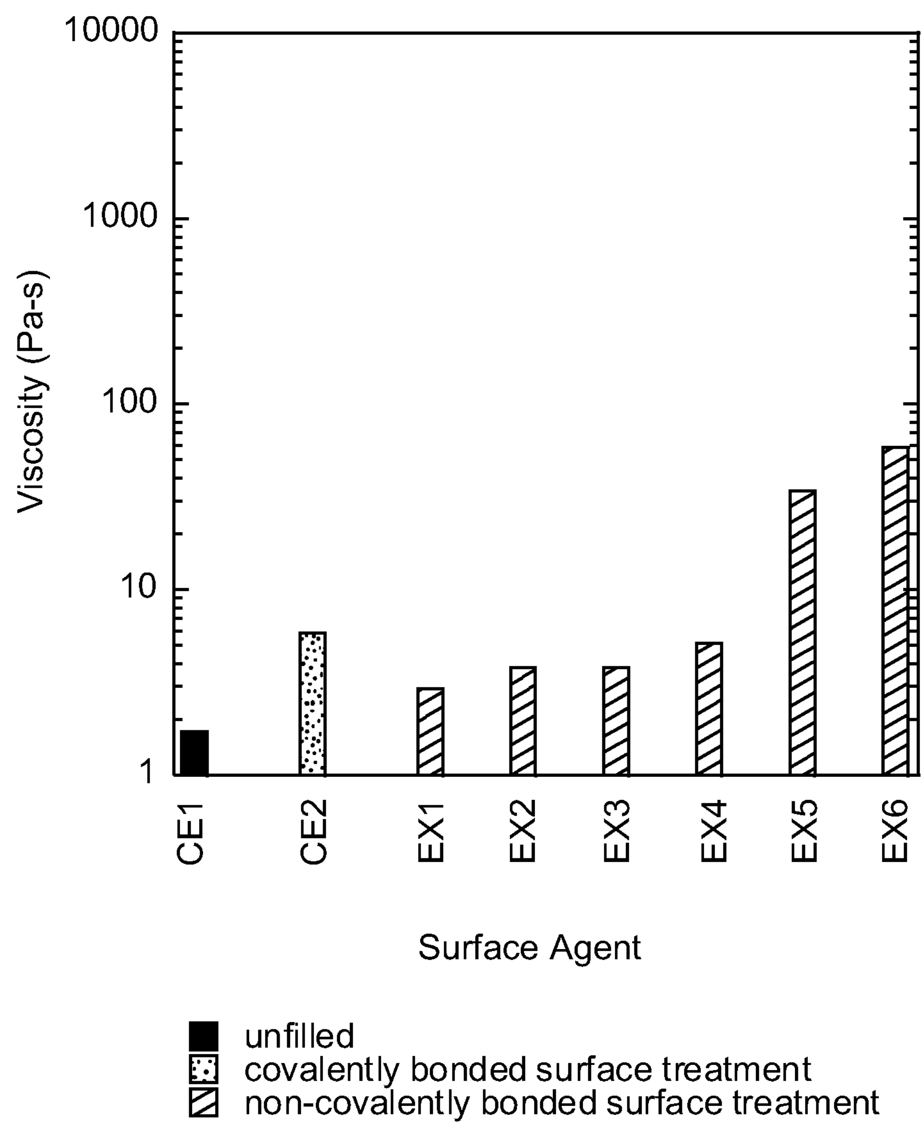
FIG. 1 is a graph presenting the measured viscosity of each of Comparative Example 1, Comparative Example 2, Example 1. Example 2, Example 3, Example 4, Example 5, and Example 6.

Nanocomposites, composites, and articles are provided that contain silica nanoparticles, as well as methods of making the nanocomposites, composites, and articles. There is a need for a more efficient process for the incorporation of silica nanoparticles into nanocomposites and articles.

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should be understood that, as used herein:

As used in this specification and the appended embodiments, the singular forms "a", "an", and "the" include plural referents unless the content clearly dictates otherwise. Thus, for example, reference to "a compound" includes a mixture of two or more compounds.

As used in this specification and the appended embodiments, the term "or" is generally employed in its sense including "and/or" unless the content clearly dictates otherwise. The term "and/or" means either or both. For example, the expression "A and/or B" means A, B, or a combination of A and B.

As used in this specification, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

The term "comprises" and variations thereof do not have a limiting meaning where these terms appear in the description and claims.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

The term "nanoparticle" refers to particles that are submicron in size. The nanoparticles have an average particle size, which refers to the average longest dimension of the particles, that is no greater than 1000 nanometers, no greater than 500 nanometers, no greater than 200 nanometers, no greater than 100 nanometers, no greater than 75 nanometers, no greater than 50 nanometers, no greater than 40 nanometers, no greater than 25 nanometers, or no greater than 20 nanometers. The average particle size is often determined using transmission electron microscopy but various light scattering methods (e.g., laser diffraction) can be used as well. The average particle size typically refers to the average size of non-agglomerated and/or non-aggregated single nanoparticles.

The term "agglomerated" refers to a weak association of primary particles or aggregated particles usually held together by charge or polarity. Agglomerated particles can typically be broken down into smaller entities by, for example, shearing forces encountered during dispersion of the agglomerated particles in a liquid.

The terms "aggregated" and "aggregates" refer to a strong association of primary particles often bound together by, for example, residual chemical treatment, covalent chemical bonds, or ionic chemical bonds. Further breakdown of the aggregates into smaller entities is very difficult to achieve.

The term "spherical" means a round body whose surface is at all points equidistant from the center. The term "non-spherical" means any shape other than essentially spherical, including for example and without limitation, cubic, rhombohedral, pyramidal, oval, plate-like, conical, diamond shaped, and acicular, and including regular and/or irregular shapes. For instance, a shape that is at least partially spherical but has portions missing from the sphere is encompassed by the term nonspherical. The term "nonspherical" encompasses a population of clusters of spherical primary nanoparticles (e.g., an aggregate of spherical nanoparticles), wherein the cluster is defined to have any shape other than essentially spherical and is submicron in size. The population of clusters (i.e., the clusters within the population) has a mean size, which refers to the average longest dimension of the clusters of spherical primary nanoparticles, that is no greater than 1000 nanometers, no greater than 500 nanometers, no greater than 200 nanometers, no greater than 100 nanometers, no greater than 75 nanometers, no greater than 50 nanometers, or no greater than 40 nanometers. The term "acicular" encompasses shapes such as rods, ellipsoids, needles, and the like. Certain nonspherical shapes have an aspect ratio of at least 2:1, at least 3:1, at least 5:1, or at least 10:1. The term "aspect ratio" refers to the ratio of the average longest dimension (e.g., of a nanoparticle) to the average shortest dimension.

As used herein, the term "silica" refers to amorphous silicon dioxide ($SiO_2$). As used herein, the term "pyrogenic" silica refers to silicon dioxide formed in flame or in sufficiently high temperature to decompose organic materials.

As used herein, the term "silica nanoparticle" refers to a nanoparticle having a silica surface. This includes nanoparticles that are substantially, entirely silica, as well nanoparticles comprising other inorganic (e.g., metal oxide) or organic cores having a silica surface. In some embodiments, the core comprises a metal oxide. Any known metal oxide may be used.

Exemplary metal oxides include silica, titania, alumina, zirconia, vanadia, chromia, antimony oxide, tin oxide, zinc oxide, ceria, and mixtures thereof.

The term "curable" as used herein means chemically or physically crosslinkable to form a glassy, insoluble, non-flowable network which is maintained under normal use conditions.

The term "cured" as used herein means chemically or physically crosslinked in the form of a glassy, insoluble, non-flowable network which is maintained under normal use conditions.

The term "resin" as used herein means one polymer or at least two polymers blended together, in either solid or molten form.

The term "matrix" as used herein in the term "matrix resin" refers to a curable or cured resin into which additional components may be included (e.g., particles, fibers, etc.).

The term "nanocomposite" as used herein refers to a material comprising a curable or cured resin and silica nanoparticles.

The term "composite" as used herein refers to a cured nanocomposite comprising a cured resin, silica nanoparticles, and a filler comprising at least one of a continuous fiber, discontinuous fibers, and hollow glass bubbles. Continuous fibers include for example and without limitation, glass, carbon, basalt, ceramic (e.g., NEXTEL ceramic oxide fibers available from 3M Company (St. Paul, Minn.)), and organic fibers (e.g., aromatic polyamide (e.g., KEVLAR available from DuPont (Wilmington, Del.)), polypropylene, and polyacrylnitrile).

The term "article" as used herein refers to an object comprising a cured nanocomposite comprising a cured resin and silica nanoparticles, and optionally a filler comprising at least one of a reinforcing continuous fiber, reinforcing discontinuous fibers, and hollow glass bubbles (i.e., a composite).

The term "neat" as used herein in the term "neat resin" refers to a curable or cured resin which does not include a macroscopic filler (e.g., continuous or discontinuous fibers, hollow glass bubbles, etc.).

The term "(co)polymer" is inclusive of both homopolymers containing a single monomer and copolymers containing two or more different monomers.

The term "(meth)acrylic" or "(meth)acrylate" is inclusive of both acrylic and methacrylic (or acrylate and methacrylate).

The term "aliphatic group" means a saturated or unsaturated linear or branched hydrocarbon group. This term is used to encompass alkyl, alkenyl, and alkynyl groups, for example.

The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkylene group" refers to a divalent alkyl group.

The term "heteroalkyl group" means an alkyl group having at least one —$CH_2$— replaced with a heteroatom such as O or S. In many embodiments, the heteroalkyl group is a monovalent polyether group. The term "heteroalkylene group" refers to a divalent heteroalkyl group. In many embodiments, the heteroalkylene group is a divalent polyether group.

The term "alicyclic group" means a cyclic hydrocarbon group having properties resembling those of aliphatic groups. The term "aromatic group" or "aryl group" means a mono- or polynuclear aromatic hydrocarbon group.

The term "unsaturation" means either a double bond between two atoms (e.g., C═C), or a triple bond between two atoms (e.g., C═C).

When a group is present more than once in a formula described herein, each group is "independently" selected, whether specifically stated or not. For example, when more than one R group is present in a formula, each R group is independently selected.

The term "component" refers to any compound (e.g., any reactant), heterogeneous catalyst, solvent, or other material, which is present in a reactor.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment," "in many embodiments" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

Various exemplary embodiments of the disclosure will now be described. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the limitations set forth in the claims and any equivalents thereof.

Thus, in a first exemplary embodiment, the disclosure provides a nanocomposite comprising silica nanoparticles and a dispersant, dispersed in a curable resin; wherein the silica nanoparticles comprise nonspherical silica nanoparticles, spherical pyrogenic silica nanoparticles, or a combination thereof, and wherein the nanocomposite comprises less than 2% by weight solvent. Preferably, the nanocomposite comprises less than 0.5% by weight solvent, or even more preferably the nanocomposite comprises essentially no solvent.

In a second exemplary embodiment, the disclosure provides a nanocomposite comprising silica nanoparticles and a dispersant, dispersed in a curing agent; wherein the silica nanoparticles include nonspherical silica nanoparticles, spherical pyrogenic silica nanoparticles, or a combination thereof, and wherein the nanocomposite contains less than 2% by weight solvent.

In a third exemplary embodiment, the disclosure provides a composite comprising from about 4 to 70 weight percent of silica nanoparticles, and a dispersant, dispersed in a cured resin, and a filler embedded in the cured resin; wherein the silica nanoparticles comprise nonspherical silica nanoparticles, spherical pyrogenic silica nanoparticles, or a combination thereof. The filler comprises at least one of a reinforcing continuous fiber, reinforcing discontinuous fibers, and hollow glass bubbles. In certain embodiments, an article is provided comprising the composite.

In a fourth exemplary embodiment, the present disclosure provides an article comprising from about 10 to about 50 weight percent of silica nanoparticles, and a dispersant, dispersed in a cured resin; wherein the silica nanoparticles comprise nonspherical silica nanoparticles, spherical pyrogenic silica nanoparticles, or a combination thereof.

In a fifth exemplary embodiment, the present disclosure provides a method of preparing a nanoparticle-containing curable resin system comprising mixing from 10 to 70 weight percent of aggregated silica nanoparticles with a curable resin, a first dispersant, and optionally a catalyst, a diluent, a surface treatment agent, and/or a curing agent, to form a mixture comprising less than 2% by weight solvent; and milling the first mixture in a first immersion mill containing milling media to form a milled resin system comprising silica nanoparticles and the dispersant dispersed in the curable resin.

Accordingly, in a third exemplary embodiment, an article is provided comprising a nanocomposite comprising from about 4 to about 70 weight percent of silica nanoparticles and a dispersant dispersed in a cured resin. The silica nanoparticles comprise nonspherical silica nanoparticles and/or spherical pyrogenic silica nanoparticles. In certain aspects, the article contains from about 10 to about 30 weight percent, or from about 10 to about 70 weight percent, or from about 15 to about 30 weight percent, or from about 15 to about 50 weight percent, or from about 20 to about 50 weight percent, or from about 25 to about 50 weight percent, or from about 15 to about 70 weight percent, or from about 25 to about 70 weight percent, or from about 35 to about 70 weight percent, or from about 50 to about 70 weight percent of the silica nanoparticles. In certain embodiments, the article comprises nonspherical silica nanoparticles comprising one or more irregular shapes.

In certain embodiments, the nanocomposite or article further comprises one or more additional components (e.g., additives), for example and without limitation, catalysts, surface treatment agents, reactive diluents, curing agents, cure accelerators, defoamers, air release agents, crosslinking agents, dyes, flame retardants, pigments, impact modifiers, and flow control agents.

Silica nanoparticles (both spherical and nonspherical) often have an average width (diameter for spherical nanoparticles and smallest dimension for nonspherical nanoparticles) equal to at least 1 nanometer, at least 2 nanometers, or at least 5 nanometers. The average width of silica nanoparticles is often no greater than 250 nanometers, no greater than 100 nanometers, or no greater than 50 nanometers. The nonspherical silica nanoparticles will have a different length than width, and can have an average length D1 measured by dynamic light scattering methods that is, for example, at least 25 nanometers, at least 50 nanometers, at least 75 nanometers, or at least 100 nanometers. The average length D1 (e.g., longer dimension) can be up to 200 nanometers, up to 400 nanometers, or up to 500 nanometers. Acicular nonspherical silica particles may have an elongation ratio D1/D2 in a range of 5 to 30, wherein D2 means a diameter in nanometers calculated by the equation D2=2720/S and S means specific surface area in meters squared per gram ($m^2$/gram) of the nanoparticle, as described in U.S. Pat. No. 5,221,497 (Watanabe et al.).

In certain embodiments, nonspherical silica nanoparticles comprise a population of clusters of primary spherical silica nanoparticles. The population of clusters of primary spherical silica nanoparticles comprises a mean (i.e., average) size of the longest dimension in the range from 40 to 900 nanometers, or from 40 to 700 nanometers, or from 40 to 500 nanometers, or from 40 to 250 nanometers, or from 40 to 150 nanometers, or from 500 to 900 nanometers, or from 250 to 500 nanometers, or from 400 to 600 nanometers, or from 100 to 300 nanometers. In such embodiments, the primary spherical silica nanoparticles comprise a particle diameter in the range from 1 to 100 nanometers, or from 1 to 50 nanometers, or from 1 to 25 nanometers, or from 75 to 100 nanometers, or from 50 to 100 nanometers, or from 25 to 75 nanometers.

In certain embodiments, the silica nanoparticles are selected to have an average specific surface area equal to at least 20 $m^2$/gram, at least 50 $m^2$/gram, at least 100 $m^2$/gram, at least 150 m/gram, at least 200 $m^2$/gram, at least 250 $m^2$/gram, at least 300 $m^2$/gram, or at least 400 $m^2$/gram. Nanoparticles having average specific surface areas equal to at least 150 $m^2$/gram often have an average diameter (e.g., longest dimension) less than 40 nanometers, less than 30 nanometers, less than 25 nanometers, or less than 20 nanometers.

Various sizes and/or various shapes of silica nanoparticles may be used in combination. In certain embodiments, bimodal distributions of particle sizes may be used. For example, nanoparticles having an average particle size (i.e., of the diameter or of the longest dimension) of at least 50 nanometers (e.g., in the range of 50 to 200 nanometers or in the range of 50 to 100 nanometers) can be used in combination with nanoparticles having an average diameter no greater than 40 nanometers. The weight ratio of the larger to smaller nanoparticles can be in the range of 2:98 to 98:2, in the range of 5:95 to 95:5, in the range of 10:90 to 90:10, or in the range of 20:80 to 80:20. Nanocomposites having a bimodal distribution of silica nanoparticles can include 2 to 20 weight percent silica nanoparticles having an average particle size of 40 nanometers or less and 2 to 40 weight percent silica nanoparticles having an average particle size of 50 nanometers or greater. The amount is based on a total weight of the nanocomposite. In an aspect, the silica nanoparticles comprise a bimodal particle size distribution. In another aspect, the silica nanoparticles comprise a unimodal particle size distribution. The silica nanoparticles typically comprise an average particle size of the longest dimension in the range from about 1 nanometer to about 1000 nanometers, or from about 1 nanometer to about 500 nanometers, or from about 1 nanometer to about 100 nanometers, or from about 1 nanometer to about 50 nanometers, or from about 100 nanometers to about 400 nanometers, or from about 500 nanometers to about 1000 nanometers. In certain embodiments, mixtures of spherical silica nanoparticles and non-spherical silica nanometers are employed.

In some embodiments, the silica nanoparticle cores have a narrow particle size distribution. In some embodiments, the core is substantially fully condensed. In some embodiments, the core is amorphous. In some embodiments, the core is isotropic. In some embodiments, the silica nanoparticles are substantially non-agglomerated.

The silica particles to be included in a nanocomposite are typically commercially available in the form of a silica microparticle powder. Example precipitated silica powder is available under the trade designations TIXOSIL (e.g., TIXOSIL 68) from Rhodia (Bristol, Pa.), SIPERNAT (e.g., SIPERNAT 33) from Evonik Degussa Corporation (Parsippany, N.Y. USA), ZEOFREE (e.g., ZEOFREE 80) from Huber Engineered Materials (Atlanta, Ga., USA), HI-SIL (e.g., HI-SIL T-800) from PPG Industries (Pittsburgh, Pa.), and SYLOID (e.g., SYLOID 244) from W.R. Grace and Company (Columbia, Md., USA). Example fumed silica powder is available under the trade designation ORISIL 200 from Orisil (Lviv, Ukraine), AEROSIL (e.g., AEROSIL 200) from Evonik Degussa Corporation (Parsippany, N.Y., USA), I-DK (e.g., HDK N20) from Wacker Chemical Corporation (Adrian, Mich.). CABOSIL (e.g., CABOSIL IHP-60) from Cabot Corporation (Billerica, Mass.), KONASIL (e.g., KONASIL K-200) from Keysu Industrial Company, Limited (Seoul, Korea), REOLOSIL from Tokuyama Corporation (Tokyo, Japan), and XYSIL (e.g., XYSII 200) from Xunyu Chemical Company. Limited (Zhengshou City, China). Example pyrogenic silica is available under the trade designation NANOSIL (e.g., NANOSIL ASD) from Energy Strategy Associates, Inc. (Old Chatham, N.Y.).

In certain embodiments, the nanocomposite or article comprises from about 4 to about 70 weight percent of the silica nanoparticles, or from about 6 to about 30 weight percent, or from about 10 to about 30 weight percent, or from about 10 to about 50 weight percent, or from about 10 to about 70 weight percent, or from about 5 to about 30 weight percent, or from about 15 to about 50 weight percent, or from about 20 to about 50 weight percent, or from about 25 to about 50 weight percent, or from about 15 to about 70 weight percent, or from about 25 to about 70 weight percent, or from about 35 to about 70 weight percent, or from about 50 to about 70 weight percent of the silica nanoparticles. In an aspect, the nanocomposite consists essentially of the silica nanoparticles and a dispersant dispersed in the curable resin. In an aspect, the article consists essentially of the silica nanoparticles and a dispersant dispersed in the cured resin.

Nanoparticles, including surface-modified nanoparticles, have been compounded into curable resins to alter the properties of the resulting cured resin system. For example, U.S. Pat. No. 5,648,407 (Goetz et al.) describes, among other things, curable resins comprising colloidal microparticles in curable resin, and the use of such particle-containing resins in combination with reinforcing fibers. International Patent Publication No. WO2008/027979 (Goenner et al.) describes, among other things, resin systems comprising one or more crosslinkable resins, one or more reactive diluents, and a plurality of reactive, surface-modified nanoparticles.

Traditionally, nanoparticles have been compounded into resins using a combination of solvent exchange and solvent stripping processes. In addition to being time-consuming and requiring the use of multiple solvents, such processes often expose the curable resins to high temperatures. Such high temperatures can lead to oligomerization and other undesirable reactions during the compounding process with a resultant increase in viscosity. In addition, low-boiling-temperature components (e.g., volatile reactive diluents) may be lost during these compounding steps.

Moreover, prior to solvent stripping, silica nanoparticle dispersions typically contain only about 20% by weight nanoparticles, thus to make a concentrated (e.g., 50 wt. %) nanocomposite is difficult, particularly when employing a batch process requiring a large volume stripping unit to contain the feed, 80 vol. % of which is waste (e.g., water and solvent).

The present disclosure provides alternative procedures for combining nanoparticles, including agglomerated nanoparticles, into a curable resin. These procedures do not require the use of solvents and may be used to compound curable resins without causing premature cure.

Silica particles are typically included in resin systems as thickeners; generally, the smaller the particle size, the greater the increase in viscosity of the silica particle-containing resin. Such thickening effects can be observed at silica particle loadings of as little as 3 weight percent (wt. %), 2 wt. %, or even 1 wt. %. Typically, a loading of about 10 weight percent or more silica microparticles or silica nanoparticles in resin poses challenges with respect to effective dispersion of the particles within the resin. For example, high resin system viscosities (e.g., greater than about 1,000 centipoises (cP), or greater than about 5,000 cP) inhibits dispersion of silica particles into a resin system according to usual methods. In contrast to prior systems, embodiments of the nanocomposites, articles, and methods of the present disclosure achieve dispersion of silica particles at high loadings (e.g., at least 4 wt. %, at least 6 wt. %, at least 8 wt. %, at least 10 wt. %, at least 12 wt. %, at least 15 wt. %, at least 20 wt. %, at least 25 wt. %, at least 30 wt. %, at least 35 wt. %, at least 40 wt. %, at least 45 wt. %, at least 50 wt. %, at least 55 wt. %, at least 60 wt. %, or at least 65 wt. %) without requiring the use of solvents to decrease the viscosity of the resin system. Similarly, embodiments of the nanocomposites, articles, and methods of the present disclosure achieve dispersion of silica particles at high loadings without requiring a pretreatment of the silica particles with surface treatment agents to improve the compatibility of the silica particles with the specific resin(s) of the resin system.

Generally, curable resin systems are used in a wide variety of applications, e.g., as a protective layer (e.g., gel coats) and as the impregnation resin in composites. Advanced structural composites, for example, are high modulus, high strength materials useful in many applications requiring high strength to weight ratios, e.g., applications in the automotive, sporting goods, and aerospace industries. Exemplary composites include for example and without limitation, a turbine blade, golf club, a baseball bat, a fishing rod, a racquet, a bicycle frame, a pressure vessel (e.g., a container having pressurized contents), an aerospace part (e.g., an exterior panel of an airplane), and a cable (e.g., a hoist cable, an underwater tether, an umbilical cable, and the like). Such composites typically comprise reinforcing fibers (e.g., carbon or glass) embedded in a cured matrix resin. Resin systems are often selected based on the desired mechanical properties of the final product including, e.g., hardness, toughness, fracture resistance, and the like. In some applications, the optical appearance of the finished product may be important such that properties like clarity and haze must be considered. In addition, process conditions may lead to preferred ranges for properties such as viscosity. Finally, the desired end use of the product often leads to additional requirements, e.g., erosion resistance or anti-blistering.

Curable resins suitable for use in the nanocomposites of the invention are those resins, e.g., thermosetting resins and radiation-curable resins, which are capable of being cured to form a glassy network polymer. Suitable resins include, e.g., epoxy resins, curable imide resins (especially maleimide resins, but also including, e.g., commercial K-3 polyimides (available from DuPont) and polyimides having a terminal reactive group such as acetylene, diacetylene, phenylethynyl, norbornene, nadimide, or benzocyclobutane), vinyl ester resins and acrylic resins (e.g., (meth)acrylic esters or amides of polyols, epoxies, and amines), bisbenzocyclobutane resins, polycyanate ester resins, and mixtures thereof. The resins can be utilized in the form of either monomers or prepolymers. Preferred curable resins include epoxy resins, maleimide resins, polycyanate ester resins, and mixtures thereof. Epoxy resins are especially preferred due to their processing characteristics, high temperature properties, and environmental resistance.

Epoxy resins are well-known in the art and comprise compounds or mixtures of compounds which contain one or more epoxy groups of the structure

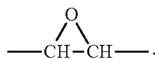

The compounds can be saturated or unsaturated, aliphatic, alicyclic, aromatic, or heterocyclic, or can comprise combinations thereof. Compounds which contain more than one epoxy group (i.e., polyepoxides) are preferred.

Polyepoxides which can be utilized in the nanocomposites of the invention include, e.g., both aliphatic and aromatic polyepoxides, but aromatic polyepoxides are preferred for high temperature applications. The aromatic polyepoxides are compounds containing at least one aromatic ring structure, e.g. a benzene ring, and more than one epoxy group. Preferred aromatic polyepoxides include the polyglycidyl ethers of polyhydric phenols (e.g., bisphenol A derivative resins, epoxy cresol-novolac resins, bisphenol F derivative resins, epoxy phenol-novolac resins), glycidyl esters of aromatic carboxylic acids, and glycidyl amines of aromatic amines. The most preferred aromatic polyepoxides are the polyglycidyl ethers of polyhydric phenols.

Representative examples of aliphatic polyepoxides which can be utilized in the nanocomposites of the invention include 3',4'-epoxycyclohexylmethyl-3,4-epoxycyclohexanecarboxylate, 3,4-epoxycyclohexyloxirane, 2-(3',4'-epoxycyclohexyl)-5,1"-spiro-3",4"-epoxycyclohexane-1,3-dioxane, bis(3,4-epoxycyclohexylmethyl)adipate, the diglycidyl ester of linoleic dimer acid, 1,4-bis(2,3-epoxypropoxy)butane, 4-(1,2-epoxyethyl)-1,2-epoxycyclohexane, 2,2-bis(3,4-epoxycyclohexyl)propane, polyglycidyl ethers of aliphatic polyols such as glycerol or hydrogenated 4,4'-dihydroxydiphenyl-dimethylmethane, and mixtures thereof.

Representative examples of aromatic polyepoxides which can be utilized in the nanocomposites of the invention include glycidyl esters of aromatic carboxylic acids, e.g., phthalic acid diglycidyl ester, isophthalic acid diglycidyl ester, trimellitic acid triglycidyl ester, and pyromellitic acid tetraglycidyl ester, and mixtures thereof; N-glycidylaminobenzenes, e.g., N,N-diglycidylbenzeneamine, bis(N,N-diglycidyl-4-aminophenyl)methane, 1,3-bis(N,N-diglycidylamino)benzene, and N,N-diglycidyl-4-glycidyloxybenzeneamine, and mixtures thereof; and the polyglycidyl derivatives of polyhydric phenols, e.g., 2,2-bis-[4-(2,3-epoxypropoxy)phenyl]propane, the polyglycidyl ethers of polyhydric phenols such as tetrakis(4-hydroxyphenyl)ethane, pyrocatechol, resorcinol, hydroquinone, 4,4'-dihydroxydiphenyl methane, 4,4'-dihydroxydiphenyl dimethyl methane, 4,4'-dihydroxy-3,3'-dimethyldiphenyl methane, 4,4'-dihydroxydiphenyl methyl methane, 4,4'-dihbydroxydiphenyl cyclohexane, 4,4'-dihydroxy-3,3'-dimethyldiphenyl propane, 4,4'-dihydroxydiphenyl sulfone, and tris-(4-hydroxyphenyl)methane, polyglycidyl ethers of novolacs (reaction products of monohydric or polyhydric phenols with aldehydes in the presence of acid catalysts), and the derivatives described in U.S. Pat. No. 3,018,262 (Schoeder) and U.S. Pat. No. 3,298,998 (Coover et al.), the descriptions of which are incorporated herein by reference, as well as the derivatives described in the Handbook of Epoxy Resins by Lee and Neville, McGraw-Hill Book Co., New York (1967) and in Epoxy Resins, Chemistry and Technology, Second Edition, edited by C. May, Marcel Dekker, Inc., New York (1988), and mixtures thereof. A preferred class of polyglycidyl ethers of polyhydric phenols for use in the nanocomposites of the invention is the diglycidyl ethers of bisphenol that have pendant carbocyclic groups, e.g., those described in U.S. Pat. No. 3,298,998 (Coover et al.), the description of which is incorporated herein by reference. Examples of such compounds include 2,2-bis[4-(2,3-epoxypropoxy)phenyl]norcamphane and 2,2-bis[4-(2,3-epoxypropoxy)phenyl]decahydro-1,4,5,8-dimethanonaphthalene. A preferred compound is 9,9-bis[4-(2,3-epoxypropoxy)phenyl]fluorene.

Suitable epoxy resins can be prepared by, e.g., the reaction of epichlorohydrin with a polyol, as described, e.g., in U.S. Pat. No. 4,522,958 (Das et al.), the description of which is incorporated herein by reference, as well as by other methods described by Lee and Neville and by May, supra. Many epoxy resins are also commercially available.

Maleimide resins suitable for use in the nanocomposites of the invention include bismaleimides, polymaleimides, and polyaminobismaleimides. Such maleimides can be conveniently synthesized by combining maleic anhydride or substituted maleic anhydrides with di- or polyamine(s). Preferred are N,N'-bismaleimides, which can be prepared, e.g., by the methods described in U.S. Pat. No. 3,562,223 (Bargain et al.), U.S. Pat. No. 3,627,780 (Bonnard et al.), U.S. Pat. No. 3,839,358 (Bargain), and U.S. Pat. No. 4,468,497 (Beckley et al.) (the descriptions of which are incorporated herein by reference) and many of which are commercially available.

Representative examples of suitable N,N'-bismaleimides include the N,N'-bismaleimides of 1,2-ethanediamine, 1,6- hexanediamine, trimethyl-1,6-hexanediamine, 1,4-benzenediamine, 4,4'-methylenebisbenzenamine, 2-methyl-1,4-benzenediamine, 3,3'-methylenebisbenzenamine, 3,3'-sulfonylbisbenzenamine, 4,4'-sulfonylbisbenzenamine, 3,3'-oxybisbenzenamine, 4,4'-oxybisbenzenamine, 4,4'-methylenebiscyclohexanamine, 1,3-benzenedimethanamine, 1,4-benzenedimethanamine, 4,4'-cyclohexanebisbenzenamine, and mixtures thereof.

Co-reactants for use with the bismaleimides can include any of a wide variety of unsaturated organic compounds, particularly those having multiple unsaturation, either ethylenic, acetylenic, or both. Examples include acrylic acids and amides and the ester derivatives thereof, e.g., acrylic acid, methacrylic acid, acrylamide, methacrylamide, and methylmethacrylate; dicyanoethylene; tetracyanoethylene; allyl alcohol; 2,2'-diallylbisphenol A; 2,2'-dipropenylbisphenol A; diallylphthalate; triallylisocyanurate; triallylcyanurate; N-vinyl-2-pyrrolidinone; N-vinyl caprolactam; ethylene glycol dimethacrylate; diethylene glycol dimethacrylate; trimethylolpropane triacrylate: trimethylolpropane trimethacrylate; pentaerythritol tetramethacrylate; 4-allyl-2-methoxyphenol; triallyl trimellitate; divinyl benzene; dicyclopentadienyl acrylate; dicyclopentadienyloxyethyl acrylate; 1,4-butanediol divinyl ether, 1,4-dihydroxy-2-butene; styrene; .alpha.-methyl styrene; chlorostyrene; p-phenylstyrene; p-methylstyrene; t-butylstyrene; and phenyl vinyl ether. Of particular interest are resin systems employing a bismaleimide in combination with a bis(alkenylphenol). Descriptions of a typical resin system of this type are found in U.S. Pat. No. 4,100,140 (Zahir et al.), the descriptions of which are incorporated herein by reference. Particularly preferred components are 4,4'-bismaleimidodiphenylmethane and o,o'-diallyl bisphenol A.

Polycyanate ester resins suitable for use in the nanocomposites of the invention can be prepared by combining cyanogen chloride or bromide with an alcohol or phenol. The preparation of such resins and their use in polycyclotrimerization to produce polycyanurates are described in U.S. Pat. No. 4,157,360 (Chung et al.), the descriptions of which are incorporated herein by reference. Representative examples of suitable polycyanate ester resins include 1,2-dicyanatobenzene, 1,3-dicyanatobenzene, 1,4-dicyanatobcnzene, 2,2'-dicyanatodiphenylmethane, 3,3'-dicyanatodiphenylmethane, 4,4'-dicyanatodiphenylmethane, and the dicyanates prepared from biphenol A, bisphenol F, and bisphenol S. Tri- and higher functionality cyanate resins are also suitable.

In some embodiments, the curable resin may be an ethylenically-unsaturated curable resin. For example, in some embodiments, an unsaturated polyester resin may be used. In some embodiments, the unsaturated polyester resin is the condensation product of one or more carboxylic acids or derivatives thereof (e.g., anhydrides and esters) with one or more alcohols (e.g., polyhydric alcohols).

In other embodiments, vinyl ester resins are used. As used herein, the term “vinyl ester” refers to the reaction product of epoxy resins with ethylenically-unsaturated monocarboxylic acids. Exemplary epoxy resins include bisphenol A digycidyl ether (e.g., EPON 828, available from Hexion Specialty Chemicals, Columbus, Ohio). Exemplary monocarboxylic acids include acrylic acid and methacrylic acid. Although such reaction products are acrylic or methacrylic esters, the term “vinyl ester” is used consistently in the gel coat industry. (See, e.g., Handbook of Thermoset Plastics (Second Edition), William Andrew Publishing, page 122 (1998).)

In still other embodiments, (meth)acrylate resins, including, e.g., urethane (meth)acrylates, polyethyleneglycol (multi)(meth)acrylates, and epoxy (multi)(meth)acrylates may be used. In other embodiments, direct milling into epoxy resins may be achieved. Epoxy resins may contain diluents such as hexanedioldiglycidyl ether.

Depending on the selection of the curable resin, in some embodiments, the resin system may also include a reactive diluent. Exemplary reactive diluents include styrene, alpha-methylstyrene, vinyl toluene, divinylbenzene, triallyl cyanurate, methyl methacrylate, diallyl phthalate, ethylene glycol dimethacrylate, hydroxyethyl methacrylate, hydroxyethyl acrylate, and other mono- and multi-functional (meth)acrylates.

In certain embodiments of the nanocomposite, the curable resin comprises an epoxy resin, a curable imide resin, a vinyl ester resin, an acrylic resin, a bisbenzocyclobutane resin, a polycyanate ester resin, or a mixture thereof. In an embodiment, the curable resin comprises an epoxy resin, a maleimide resin, a polycyanate ester resin, or a mixture thereof. In an embodiment, the curable resin comprises an epoxy resin or a mixture of epoxy resins. In an embodiment, the curable resin comprises a digycidyl ether of bisphenol A, a diglycidyl ether of bisphenol F, ethylidene bis-4,1-phenylene dicyanate, N,N'-4,4'-diphenylmethanebismaleimide, 4,4'-(1-methylethylidene)bis(2-(2-propenyl)phenol), or a mixture thereof.

Similarly, in certain embodiments of the article, the cured resin comprises an epoxy resin, a cured imide resin, a vinyl ester resin, an acrylic resin, a bisbenzocyclobutane resin, a polycyanate ester resin, or a mixture thereof. Such resins are discussed in detail above. In an embodiment, the cured resin comprises an epoxy resin, a maleimide resin, a polycyanate ester resin, or a mixture thereof. In an embodiment, the cured resin comprises an epoxy resin or a mixture of epoxy resins. In an embodiment, the cured resin comprises a digycidyl ether of bisphenol A, a diglycidyl ether of bisphenol F, ethylidene bis-4,1-phenylene dicyanate, N,N'-4,4'-diphenylmethanebismaleimide, 4,4'-(1-methylethylidene)bis(2-(2-propenyl)phenol), or a mixture thereof.

The nanocomposite or article further includes one or more dispersants. Suitable dispersants include for example and without limitation, a copolymer comprising acidic groups, for instance BYK W9010, BYK 180, which is an alkylol ammonium salt of a copolymer with acid groups, a phosphoric acid polyester dispersant, and BYK 2152, which is a hyperbranched high molecular weight polyester dispersant. Each of the BYK dispersants is commercially available from BYK USA, Inc. (Wallingford, Conn.). A further suitable dispersant is a nonionic polymeric polyester copolymer, for instance ZEPHRYM PD 2246, which is commercially available from Croda, Inc. (Edison, N.J.). Another suitable dispersant is a slightly anionic polymeric polyester having part acid functionality, for instance ZEPHRYM PD 1000, which is commercially available from Croda, Inc. (Edison, N.J.). An additional suitable dispersant is an acrylic polymer salt, for example SOLPLUS D570, which is commercially available from Lubrizol Additives (Wickliffe, Ohio). Another suitable dispersant is a Jeffamine sulfonate, the sulfonic acid ligand containing JEFFAMINE M-6000 (commercially available from Huntsman Corporation, (The Woodlands, Tex.)) reacted with propane sulfone, as described in International Patent Publication No. WO 2010/080459 (Schultz et al.). Other suitable dispersants include polymeric dispersants commercially available under the trade designations SOLPLUS D510 (available from Lubrizol Additives (Wickliffe, Ohio). In many embodiments, the polymeric dispersants are added to the nanocomposite at the same time as the aggregated silica nanoparticles and curable resin. The polymeric dispersants are often added to the nanocomposite at the same time as the aggregated silica nanoparticles and curing agent. Typical high molecular weight dispersants are polymeric and have weight average molecular weights (Mw) of greater than 1000 gm/mole, or even greater than 2000 gm/mole. In certain embodiments, the dispersant is cross-linkable.

Nanocomposites comprising silica nanoparticles and a dispersant dispersed in a curable resin typically comprise a viscosity of 1 to 150 Pascals·second (Pa·s), inclusive, as measured according to ASTM D2196 at 30 degrees Celsius. In certain embodiments, the nanocomposite comprises from about 10 to about 30 weight percent of the silica nanoparticles and comprises a viscosity of 1 to 30 Pa·s, inclusive, or the nanocomposite comprises from about 35 to about 70 weight percent of the silica nanoparticles and comprises a viscosity of 30 to 150 Pa·s, inclusive (as measured according to ASTM D2196 at 30 degrees Celsius). Advantageously, in embodiments comprising spherical pyrogenic silica nanoparticles and a dispersant dispersed in a curable resin, a particularly low viscosity is attained. For instance, a nanocomposite comprising 20 wt. % spherical pyrogenic silica nanoparticles, and a dispersant, dispersed in a curable resin typically comprises a viscosity of less than 15 Pa·s, or less than 10 Pa·s (as measured according to ASTM D2196 at 30 degrees Celsius).

In an embodiment, the nanocomposite or article includes one or more catalysts for reacting silanol groups on the surface of the silica nanoparticles with the curable resin system. Suitable catalysts include for instance stannous chloride ($SnCl_2$) and methylethylketone peroxide.

In an embodiment, the nanocomposite or article includes one or more defoamers for acting as a defoamer and/or as an entrapped air release agent. Suitable defoamers include for instance BYK-1790 and BYK-A535, silicone-free polymeric defoamers, and BYK-A500 air release additives, commercially available from BYK USA, Inc. (Wallingford, Conn.).

Generally, "surface modified nanoparticles" comprise surface treatment agents attached to the surface of a nanoparticle. Advantageously, according to methods of the present disclosure, it is not necessary to modify the surface of silica nanoparticles in a separate step, prior to incorporating the nanoparticles into the nanocomposite. Surface treatment agents can simply be added to the nanocomposite and mixed in with the curable resin and silica nanoparticles, treating the surfaces of the silica nanoparticles during the dispersion of the silica nanoparticles in the curable resin.

In many embodiments, a surface treatment agent is an organic species having a first functional group capable of chemically attaching (e.g., covalently or ionically bonding) or physically attaching (e.g., strong physisorptively attaching) to the surface of a nanoparticle, wherein the attached surface treatment agent alters one or more properties of the nanoparticle. In some embodiments, covalently-bonded surface treatment agents may be preferred. In some embodiments, surface treatment agents have no more than three functional groups for attaching to the core. In some embodiments, the surface treatment agents have a low molecular weight, e.g. a weight average molecular weight less than 1000 grams per mole. In some embodiments, the surface treatment agent is an organosilane (e.g., alkyl chlorosilanes, trialkoxy arylsilanes, or trialkoxy alkylsilanes) or a compound having oxirane groups. Exemplary surface treatment agents include methacryloxypropyltrimethoxysilane, phenyl trimethoxysilane, 3-(trimethoxysilyl)propyl methacrylate) polyethyleneglycol(trimethoxy)silane benzooxasilepin dimethyl ester, phenethyltrimethoxysilane, N-phenylaminopropyl trimethoxysilane, diglycidylether of bisphenol-A, glycidylmethacrylate, allylglycidylether, or combinations thereof.

In some embodiments, the surface treatment agent further includes one or more additional functional groups providing one or more additional desired properties. For example, in some embodiments, an additional functional group may be selected to provide a desired degree of compatibility between the surface modified nanoparticles and one or more of the additional constituents of the resin system, e.g., one or more of the curable resins and/or diluents. In some embodiments, an additional functional group may be selected to modify the rheology of the resin system, e.g., to increase or decrease the viscosity, or to provide non-Newtonian theological behavior, e.g., thixotropy (shear-thinning). In an embodiment, the silica nanoparticles comprise treated surfaces, for example silica nanoparticle surfaces treated with an organosilane, a monohydric alcohol, or a polyol.

In some embodiments, the surface-modified nanoparticles are reactive; that is, at least one of the surface treatment agents used to surface modify the nanoparticles of the present disclosure may include a second functional group capable of reacting with one or more of the curable resin(s) and/or one or more reactive diluent(s) present in the nanocomposite.

In an embodiment, the nanocomposite or article includes at least one diluent, including at least one reactive diluent. Suitable diluents include, a polyfunctional glycidyl ether, styrene, mono- and multi-functional (meth)acrylates, or combinations thereof. Some exemplary suitable diluents include for example and without limitation dicyclopentenyloxyethyl methacrylate, alpha-methylstyrene, vinyl toluene, divinylbenzene, triallyl cyanurate, methyl methacrylate, diallyl phthalate, ethylene glycol dimethacrylate, hydroxyethyl methacrylate, hydroxyethyl acrylate. Other suitable reactive diluents for epoxy resins include for example mono- and multi-functional, aliphatic and aromatic, glycidyl ethers including, e.g., some of those available under the trade name HELOXY from Hexion Specialty Chemicals, Columbus, Ohio. Exemplary reactive diluents include, e.g., polypropylene glycol diglycidyl ether, allyl glycidyl ether, trimethylol propane triglycidyl ether, 1,4-butane diol diglycidyl ether, neopentyl glycol diglycidyl ether, n-butyl glycidyl ether, 2-ethylhexyl glycidyl ether, p-tertiary butyl phenyl glycidyl ether, phenyl glycidyl ether, and cyclohexane dimethanol diglycidyl ether.

In certain embodiments, the nanocomposite or article includes a curing agent. The term "curative" as used herein also refers to a curing agent. Typically, the curing agent comprises an amine curing agent, an anhydride curing agent, a dicyandiamide curing agent, or a combination thereof. More particularly, in an aspect, the curing agent comprises an amine curing agent. In an aspect, the curing agent comprises an anhydride curing agent. In an aspect, the curing agent comprises a dicyandiamide curing agent. In an aspect, the curing agent comprises a mixed curing agent. A suitable amine curing agent includes for instance EPIKURE 3230 (commercially available from Momentive Performance Materials Inc. (Albany, N.Y.)) and a suitable anhydride curing agent includes for example LINDRIDE 36V (commercially available from Lindau Chemicals Inc. (Columbia S.C.)).

Epoxy resins can be cured by a variety of curing agents, some of which are described (along with a method for calculating the amounts to be used) by Lee and Neville in Handbook of Epoxy Resins. McGraw-Hill, pages 36-140, New York (1967). Useful epoxy resin curing agents include polyamines such as ethylenediamine, diethylenetriamine, aminoethylethanolamine, and the like, diaminodiphenylsulfone, 9,9-bis(4-aminophenyl)fluorene, 9,9-bis(3-chloro-4-(aminophenyl)fluorene, amides such as dicyandiamide, polycarboxylic acids such as adipic acid, acid anhydrides such as phthalic anhydride and chlorendic anhydride, and polyphenols such as bisphenol A, and the like. Generally, the epoxy resin and curing agent are used in stoichiometric amounts, but the curing agent can be used in amounts ranging from about 0.1 to 1.7 times the stoichiometric amount of epoxy resin.

Thermally-activated catalytic agents, e.g., Lewis acids and bases, tertiary amines, imidazoles, complexed Lewis acids, and organometallic compounds and salts, can also be utilized in curing epoxy resins. Thermally-activated catalysts can generally be used in amounts ranging from about 0.05 to about 5 percent by weight, based on the amount of epoxy resin present in the curable resin nanocomposite.

N,N'-bismaleimide resins can be cured using diamine curing agents, such as those described in U.S. Pat. No. 3,562,223 (Bargain et al.), the description of which is incorporated herein by reference. Generally, from about 0.2 to about 0.8 moles of diamine can be used per mole of N,N'-bismaleimide. N,N'-bismaleimides can also cure by other mechanisms, e.g., co-cure with aromatic olefins (such as bis-allylphenyl ether, 4,4'-bis(o-propenylphenoxy)benzophenone, or o,o'-diallyl bisphenol A) or thermal cure via a self-polymerization mechanism.

Polycyanate resins can be cyclotrimerized by application of heat and/or by using catalysts such as zinc octoate, tin octoate, zinc stearate, tin stearate, copper acetylacetonate, and chelates of iron, cobalt, zinc, copper, manganese, and titanium with bidentate ligands such as catechol. Such catalysts can generally be used in amounts of from about 0.001 to about 10 parts by weight per 100 parts of polycyanate ester resin.

As disclosed above, in an exemplary embodiment a nanocomposite comprises silica nanoparticles and a dispersant, dispersed in a curing agent; wherein the silica nanoparticles include nonspherical silica nanoparticles, spherical pyrogenic silica nanoparticles, or a combination thereof, and wherein the nanocomposite contains less than 2% by weight solvent. For applications in which a large amount of curing agent is employed, providing a nanocomposite comprising silica nanoparticles dispersed in curing agent advantageously maintains a high silica nanoparticle loading level in the final composite or article. Accordingly, in certain embodiments two part nanocomposites are provided, in which the first part comprises silica nanoparticles and a dispersant dispersed in a curable resin, and the second part comprises silica nanoparticles and a dispersant dispersed in a curing agent. The two parts are then mixed and cured to form a composite or article (which preferably also contains at least one filler).

In certain embodiments, the nanocomposite or article further comprises reinforcing fibers, and optionally the reinforcing fibers are continuous. Suitable reinforcing fibers include for example and without limitation, carbon, glass, ceramic, boron, silicon carbide, polyimide, polyamide, polyethylene, or a combination thereof. In an embodiment, the reinforcing fibers comprise a unidirectional array of individual continuous fibers, woven fabric, knitted fabric, yarn, roving, braided constructions, or non-woven mat.

Advantageously, the nanocomposite is suitable for use in a prepreg, which includes any reinforcing or molding material that can be impregnated with the nanocomposite. In an embodiment, a prepreg includes the nanocomposite of any of the aspects or embodiments disclosed above. The curable nanocomposites of the invention can be used to make composite articles by a variety of conventional processes, e.g., resin transfer molding, filament winding, tow placement, resin infusion processes, compression sheet molding, or traditional prepreg processes. Prepregs can be prepared by impregnating an array of fibers (or a fabric) with the nanocomposite and then layering the impregnated tape or fabric. The resulting prepreg can then be cured by application of heat, along with the application of pressure or vacuum (or both) to remove any trapped air.

The nanocomposites can also be used to make composite parts by a resin transfer molding process, which is widely used to prepare composite parts for the aerospace and automotive industries. In this process, fibers are first shaped into a preform which is then compressed to final part shape in a metal mold. The nanocomposite can then be deposited into the mold and heat-cured.

Composites can also be prepared from the nanocomposites by a filament winding process, which is typically used to prepare cylinders or other composites having a circular or oval cross-sectional shape. In this process, a fiber tow or an array of tows is impregnated with the nanocomposite by running it through a resin bath (preferably, containing a low viscosity resin) and immediately winding the impregnated tow onto a mandrel. The resulting composite can then be heat-cured.

A pultrusion process (a continuous process used to prepare constant cross-section parts) can also be used to make composites from the curable resin sols. In such a process, a large array of continuous fibers is first wetted out in a resin bath (preferably, containing a low viscosity resin). The resulting wet array is then pulled through a heated die, where trapped air is squeezed out and the resin is cured.

in a further exemplary embodiment, a method is provided of preparing a nanoparticle-containing curable resin system. The method comprises mixing from 10 to 70 weight percent of aggregated silica nanoparticles with a curable resin, a first dispersant, and optionally a catalyst, a surface treatment agent, and/or a diluent, to form a first mixture, wherein the mixture includes less than 2% by weight solvent; milling the first mixture in a first immersion mill including milling media to form a milled resin system comprising silica nanoparticles and the dispersant dispersed in the curable resin.

In embodiments comprising a two part nanocomposite, the method further comprises mixing from 10 to 70 weight percent of aggregated silica nanoparticles with a curing agent and a second dispersant to form a second mixture, wherein the second mixture includes less than 2% by weight solvent; milling the second mixture in a second immersion mill including milling media to form a milled composition comprising silica nanoparticles dispersed in the curing agent; and mixing the milled resin system with the milled composition. In certain embodiments, the first mixture includes from 10 to 50 weight percent of aggregated silica nanoparticles and the second mixture includes from 10 to 50 weight percent of aggregated silica nanoparticles.

Advantageously, methods according to the present application eliminate the need to employ a solvent, or a silica nanoparticle sol to effectively disperse the silica nanoparticles in a curable resin. The silica nanoparticles, moreover, need not be functionalized with a surface treatment agent prior to mixing with a curable resin. Hence, it is a benefit of embodiments of the method that high loadings (e.g., greater than 10 weight percent) of aggregated silica nanoparticles are dispersed in a curable resin with a dispersant, while optionally including in the nanocomposite one or more of a catalyst, a diluent, a surface treatment agent, or a curing agent. Such optional components, however, are able to be mixed into the nanocomposite simultaneously with the aggregated silica nanoparticles, curable resin, and dispersant.

Methods of the present disclosure are typically performed using an immersion mill apparatus, which combines milling and mixing to disperse a solid component into a liquid component, particularly for high viscosity systems. One suitable immersion mill apparatus is described in U.S. Pat. No. 7,175,118 (Hockmeyer). Such immersion mill apparatuses typically include a mixing tank for holding the mixture to be milled, each of 1) a high shear impeller assembly, 2) a low shear mixer blade assembly, and 3) an immersion mill, for immersion in the mixing tank, and controllers for simultaneously operating the assemblies. In operation, the mixture is directed by the low shear mixer blade assembly to the high shear impeller assembly to initiate dispersion of the solid components into the liquid components, and then to the immersion mill for milling to decrease the aggregate sizes of any aggregated solid components (e.g., aggregated silica nanoparticles) and to further disperse the solid component in the liquid component. In certain embodiments, the milling media in the immersion mill comprises zirconia particles, preferably yttrium-stabilized zirconia beads.

The aggregated silica nanoparticles typically comprise a particle size of about 250 micrometers (μm), or between about 25 μm and about 300 μm, or between about 25 μm and about 100 μm, or between about 100 μm and about 300 μm, or between about 200 μm and about 300 μm.

In embodiments of the method, the milling of the aggregated silica nanoparticles and curable resin is performed until the aggregated silica nanoparticles are dispersed to form nonspherical or spherical silica nanoparticles comprising an average particle size (of the longest dimension) in the range from about 1 nanometer to about 1000 nanometers, or from about 1 nanometer to about 500 nanometers, or from about 1 nanometer to about 100 nanometers, or from about 1 nanometer to about 50 nanometers, or from about 100 nanometers to about 400 nanometers, or from about 500 nanometers to about 1000 nanometers. The nonspherical silica nanoparticles typically comprise a bimodal particle size distribution or a unimodal particle size distribution while the spherical silica nanoparticles typically comprise a broad unimodal particle size distribution.

In certain embodiments of the method, the nanoparticle-containing curable resin system comprises from about 10 to about 30 weight percent, or from about 10 to about 50 weight percent, or from about 10 to about 70 weight percent, or from about 15 to about 50 weight percent, or from about 20 to about 50 weight percent, or from about 20 to about 35 weight percent, or from about 25 to about 50 weight percent, or from about 30 to about 50 weight percent, or from about 15 to about 70 weight percent, or from about 25 to about 70 weight percent, or from about 35 to about 70 weight percent, or from about 50 to about 70 weight percent of the silica nanoparticles. In an embodiment, the milled resin system consists essentially of about 10 to about 70 weight percent of silica nanoparticles dispersed in a curable resin with a dispersant.

In certain embodiments, the method comprises including at least one additional component (e.g., additive) with the aggregated silica nanoparticles and curable resin. Such components include for example and without limitation, diluents, catalysts, surface treatment agents, curing agents, cure accelerators, defoamers, air release agents, crosslinking agents, dyes, flame retardants, pigments, impact modifiers, and flow control agents. In certain embodiments, the method further comprises including a catalyst with the aggregated silica nanoparticles and curable resin for reacting silanol groups on the surface of the silica nanoparticles with the curable resin system. In certain embodiments, the method further comprises including a diluent with the aggregated silica nanoparticles and curable resin. In certain embodiments, the method further comprises including a surface treatment agent with the aggregated silica nanoparticles and curable resin. It is an advantage of such embodiments that a catalyst, a diluent, and/or a surface treatment agent are included in a nanocomposite comprising a curable resin and aggregated silica nanoparticles, rather than requiring mixture or reaction with the aggregated silica nanoparticles prior to mixing with the curable resin. Suitable catalyst(s), diluent(s) and surface treatment agent(s) are as described in detail above.

In some embodiments, the method further comprises including fillers (e.g., reinforcing fibers, hollow glass spheres, etc.) in the milled resin system. Fillers suitable for including in the milled resin system are as described in detail above.

EXEMPLARY EMBODIMENTS

1. A nanocomposite including silica nanoparticles and a dispersant dispersed in a curable resin; wherein the silica nanoparticles include nonspherical silica nanoparticles, spherical pyrogenic silica nanoparticles, or a combination thereof, and wherein the nanocomposite contains less than 2% by weight solvent.

2. The nanocomposite of embodiment 1 wherein the silica nanoparticles include nonspherical silica nanoparticles including a population of clusters of primary spherical silica nanoparticles. The population of clusters includes a mean size in the range of from 40 to 900 nanometers, and the primary spherical silica nanoparticles have a diameter in the range of from 1 to 100 nanometers.

3. The nanocomposite of embodiment 1 or embodiment 2 wherein the silica nanoparticles include spherical pyrogenic silica nanoparticles.

4. The nanocomposite of any one of embodiments 1 through 3 wherein the dispersant includes a copolymer having acidic groups.

5. The nanocomposite of any one of embodiments 1 through 4 wherein the dispersant includes a phosphoric acid polyester dispersant, a Jeffamine sulfonate, a hyperbranched high molecular weight polyester, or a combination thereof.

6. The nanocomposite of any one of embodiments 1 through 5 further including a catalyst for reacting silanol groups on the surface of the silica nanoparticles with the curable resin system.

7. The nanocomposite of embodiment 6 wherein the catalyst includes stannous chloride ($SnCl_2$) or methylethylketone peroxide.

8. The nanocomposite of any one of embodiments 1 through 7 further including a surface treatment agent including an organosilane, a monohydric alcohol, a polyol, or a combination thereof.

9. The nanocomposite of embodiment 8 wherein the surface treatment agent comprises phenyl trimethoxysilane, benzooxasilepin dimethyl ester, phenethyltrimethoxy silane, N-phenylaminopropyl trimethoxysilane, or a mixture thereof.

10. The nanocomposite of any one of embodiments 1 through 9 further including at least one diluent.

11. The nanocomposite of embodiment 10 wherein the at least one diluent includes a mono- or poly-functional glycidyl ether, styrene, or a combination thereof.

12. The nanocomposite of any one of embodiments 1 through 11 further including at least one additive selected from the group consisting of curing agents, cure accelerators, defoamers, air release agents, crosslinking agents, dyes, flame retardants, pigments, impact modifiers, and flow control agents.

13. The nanocomposite of any one of embodiments 1 through 12 wherein the silica nanoparticles include a bimodal particle size distribution.

14. The nanocomposite of any one of embodiments 1 through 12 wherein the silica nanoparticles include a unimodal particle size distribution.

15. The nanocomposite of any one of embodiments 1 through 14 wherein the curable resin includes an epoxy resin, a curable imide resin, a vinyl ester resin, an acrylic resin, a bisbenzocyclobutane resin, a polycyanate ester resin, or a mixture thereof.

16. The nanocomposite of any one of embodiments 1 through 15 wherein the curable resin includes an epoxy resin, a maleimide resin, a polycyanate ester resins, or a mixture thereof.

17. The nanocomposite of any one of embodiments 1 through 16 wherein the curable resin includes a digycidyl ether of bisphenol A, a diglycidyl ether of bisphenol F, ethylidene bis-4,1-phenylene dicyanate, N,N'-4,4'-diphenylmethanebismaleimide, 4,4'-(1-methylethylidene)bis(2-(2-propenyl)phenol), or a mixture thereof.

18. The nanocomposite of any one of embodiments 1 through 17 wherein the curable resin includes an epoxy resin or a mixture of epoxy resins.

19. The nanocomposite of any one of embodiments 1 or 3 through 18 wherein the silica nanoparticles include an average particle size in the range from about 1 nanometer to about 1000 nanometers.

20. The nanocomposite of any one of embodiments 1 or 3 through 19 wherein the silica nanoparticles include an average particle size in the range from about 1 nanometer to about 500 nanometers.

21. The nanocomposite of any one of embodiments 1 or 3 through 20 wherein the silica nanoparticles include an average particle size in the range from about 1 nanometer to about 100 nanometers.

22. The nanocomposite of any one of embodiments 1 through 21 wherein the nanocomposite includes from about 10 to about 70 weight percent of the silica nanoparticles.

23. The nanocomposite of any one of embodiments 1 through 22 wherein the nanocomposite includes from about 15 to about 30 weight percent of the silica nanoparticles.

24. The nanocomposite of any one of embodiments 1 through 22 wherein the nanocomposite includes from about 20 to about 70 weight percent of the silica nanoparticles.

25. The nanocomposite of any one of embodiments 1 through 24 further including a filler including at least one of reinforcing continuous fibers, reinforcing discontinuous fibers, and hollow glass bubbles.

26. The nanocomposite of embodiment 25 wherein the filler includes at least one of reinforcing continuous fibers and reinforcing discontinuous fibers.

27. The nanocomposite of embodiment 25 or embodiment 26 wherein the filler includes carbon, glass, ceramic, boron, silicon carbide, basalt, ceramic, polyimide, polyamide, polyethylene, or a combination thereof.

28. The nanocomposite of any one of embodiments 25 through 27 wherein said reinforcing fibers include a unidirectional array of individual continuous fibers, woven fabric, knitted fabric, yarn, roving, braided constructions, or non-woven mat.

29. The nanocomposite of any one of embodiments 1 through 28 wherein the nanocomposite includes less than 0.5% by weight solvent.

30. The nanocomposite of any one of embodiments 1 through 29 further including a curing agent including an amine curing agent, an anhydride curing agent, a dicyandiamide curing agent, a diaminodiphenyl sulfone curing agent, or a combination thereof.

31. The nanocomposite of embodiment 30 wherein the curing agent includes an amine curing agent.

32. The nanocomposite of embodiment 30 wherein the curing agent includes an anhydride curing agent.

33. The nanocomposite of embodiment 30 wherein the curing agent includes a dicyandiamide curing agent.

34. The nanocomposite of any one of embodiments 1 through 33 wherein the nanocomposite comprises a viscosity of 1 to 150 Pascals·second (Pa·s), inclusive, as measured according to ASTM D2196 at 30 degrees Celsius.

35. The nanocomposite of any one of embodiments 1 through 21 wherein the nanocomposite includes from about 10 to about 30 weight percent of the silica nanoparticles and comprises a viscosity of 1 to 30 Pa·s, inclusive, as measured according to ASTM D2196 at 30 degrees Celsius.

36. The nanocomposite of any one of embodiments 1 through 21 wherein the nanocomposite includes from about 35 to about 70 weight percent of the silica nanoparticles and comprises a viscosity of 30 to 150 Pa·s, inclusive, as measured according to ASTM D2196 at 30 degrees Celsius.

37. The nanocomposite of embodiment 1 wherein the nanocomposite consists essentially of the silica nanoparticles and the dispersant dispersed in the curable resin.

38. A nanocomposite including silica nanoparticles and a dispersant dispersed in a curing agent; wherein the silica nanoparticles include nonspherical silica nanoparticles, spherical pyrogenic silica nanoparticles, or a combination thereof, and wherein the nanocomposite contains less than 2% by weight solvent.

39. The nanocomposite of embodiment 38 wherein the silica nanoparticles include nonspherical silica nanoparticles including a population of clusters of primary spherical silica nanoparticles. The population of clusters includes a mean size in the range of from 40 to 900 nanometers, and the primary spherical silica nanoparticles have a diameter in the range of from 1 to 100 nanometers.

40. The nanocomposite of embodiment 38 or embodiment 39 wherein the curing agent includes an amine curing agent, an anhydride curing agent, a dicyandiamide curing agent, a diaminodiphenyl sulfone curing agent, or a combination thereof.

41. The nanocomposite of any one of embodiments 38 through 40 wherein the curing agent includes an amine curing agent.

42. The nanocomposite of any one of embodiments 38 through 40 wherein the curing agent includes an anhydride curing agent.

43. The nanocomposite of any one of embodiments 38 through 40 wherein the curing agent includes a dicyandiamide curing agent.

44. The nanocomposite of any one of embodiments 38 through 43 wherein the dispersant includes a copolymer having acidic groups.

45. The nanocomposite of any one of embodiments 38 through 44 wherein the dispersant includes a phosphoric acid polyester dispersant, a Jeffamine sulfonate, a hyperbranched high molecular weight polyester, or a combination thereof.

46. The nanocomposite of any one of embodiments 38 through 45 further including a surface treatment agent including an organosilane, a monohydric alcohol, a polyol, or a combination thereof.

47. The nanocomposite of embodiment 46 wherein the surface treatment agent comprises phenyl trimethoxysilane, benzooxasilepin dimethyl ester, phenethyltrimethoxy silane, N-phenylaminopropyl trimethoxysilane, or a mixture thereof.

48. The nanocomposite of any one of embodiments 38 through 47 further including at least one diluent.

49. The nanocomposite of embodiment 48 wherein the at least one diluent includes a mono- or poly-functional glycidyl ether, styrene, or a combination thereof.

50. The nanocomposite of any one of embodiments 38 through 49 further including at least one additive selected from the group consisting of cure accelerators, defoamers, air release agents, crosslinking agents, dyes, flame retardants, pigments, impact modifiers, and flow control agents.

51. The nanocomposite of any one of embodiments 38 through 50 wherein the silica nanoparticles include a bimodal particle size distribution.

52. The nanocomposite of any one of embodiments 38 through 50 wherein the silica nanoparticles include a unimodal particle size distribution.

53. The nanocomposite of any one of embodiments 38 or 40 through 52 wherein the silica nanoparticles include an average particle size in the range from about 1 nanometer to about 1000 nanometers.

54. The nanocomposite of any one of embodiments 38 or 40 through 53 wherein the silica nanoparticles include an average particle size in the range from about 1 nanometer to about 500 nanometers.

55. The nanocomposite of any one of embodiments 38 or 40 through 54 wherein the silica nanoparticles include an average particle size in the range from about 1 nanometer to about 100 nanometers.

56. The nanocomposite of any one of embodiments 38 through 55 wherein the nanocomposite includes from about 10 to about 70 weight percent of the silica nanoparticles.

57. The nanocomposite of any one of embodiments 38 through 56 wherein the nanocomposite includes from about 15 to about 30 weight percent of the silica nanoparticles.

58. The nanocomposite of any one of embodiments 38 through 57 wherein the nanocomposite includes from about 20 to about 70 weight percent of the silica nanoparticles.

59. The nanocomposite of any one of embodiments 38 through 58 further including a filler including at least one of reinforcing continuous fibers, reinforcing discontinuous fibers, and hollow glass bubbles.

60. The nanocomposite of embodiment 59 wherein the filler includes at least one of reinforcing continuous fibers and reinforcing discontinuous fibers.

61. The nanocomposite of embodiment 59 or embodiment 60 wherein the filler includes carbon, glass, ceramic, boron, silicon carbide, basalt, ceramic, polyimide, polyamide, polyethylene, or a combination thereof.

62. The nanocomposite of any one of embodiments 59 through 61 wherein said reinforcing fibers include a unidirectional array of individual continuous fibers, woven fabric, knitted fabric, yarn, roving, braided constructions, or non-woven mat.

63. The nanocomposite of any one of embodiments 38 through 62 wherein the nanocomposite includes less than 0.5% by weight solvent.

64. The nanocomposite of embodiment 38 wherein the nanocomposite consists essentially of the silica nanoparticles and the dispersant, dispersed in the curing agent.

65. A prepreg including the nanocomposite of any one of embodiments 1 through 64.

66. A composite including the cured nanocomposite of any one of embodiments 1 through 24 or 29 through 35 as a matrix resin and at least one filler embedded in the matrix resin.

67. An article including the composite of embodiment 63.

68. A composite including a cured mixture of the nanocomposite of any one of embodiments 38 through 58 and the nanocomposite of any one of embodiments 1 through 24 or 29 as a matrix resin, and at least one filler embedded in the matrix resin.

69. An article including the composite of embodiment 68.

70. A composite including from about 4 to 70 weight percent of silica nanoparticles, and a dispersant, dispersed in a cured resin; and a filler embedded in the cured resin. The silica nanoparticles include nonspherical silica nanoparticles, spherical pyrogenic silica nanoparticles, or a combination thereof. The filler includes at least one of a reinforcing continuous fiber, reinforcing discontinuous fibers, and hollow glass bubbles.

71. The composite of embodiment 70, wherein the silica nanoparticles include nonspherical silica nanoparticles including a population of clusters of primary spherical silica nanoparticles. The population of clusters includes a mean size in the range of from 40 to 900 nanometers, and the primary spherical silica nanoparticles have a diameter in the range of from 1 to 100 nanometers.

72. The composite of embodiment 70 or embodiment 71 wherein the silica nanoparticles include spherical pyrogenic silica nanoparticles.

73. The composite of any one of embodiments 70 through 72 wherein the dispersant includes a copolymer having acidic groups.

74. The composite of any one of embodiments 70 through 73 wherein the dispersant includes a phosphoric acid polyester dispersant, a Jeffamine sulfonate, a hyperbranched high molecular weight polyester, or a combination thereof.

75. The composite of any one of embodiments 70 through 74 further including a catalyst.

76. The composite of embodiment 75 wherein the catalyst includes stannous chloride ($SnCl_2$) or methylethylketone peroxide.

77. The composite of any one of embodiments 70 through 76 further including a surface treatment agent including an organosilane, a monohydric alcohol, a polyol, or a combination thereof.

78. The composite of embodiment 77 wherein the surface treatment agent comprises phenyl trimethoxysilane, benzooxasilepin dimethyl ester, phenethyltrimethoxy silane, N-phenylaminopropyl trimethoxysilane, or a mixture thereof.

79. The composite of any one of embodiments 70 through 78 further including at least one diluent.

80. The composite of embodiment 79 wherein the at least one diluent includes a mono- or poly-functional glycidyl ether, styrene, or a combination thereof.

81. The composite of any one of embodiments 70 through 80 further including at least one additive selected from the group consisting of curing agents, cure accelerators, defoamers, air release agents, crosslinking agents, dyes, flame retardants, pigments, impact modifiers, and flow control agents.

82. The composite of any one of embodiments 70 through 81 wherein the silica nanoparticles include a bimodal particle size distribution.

83. The composite of any one of embodiments 70 through 81 wherein the silica nanoparticles include a unimodal particle size distribution.

84. The composite of any one of embodiments 70 through 83 wherein the cured resin includes an epoxy resin, a cured imide resin, a vinyl ester resin, an acrylic resin, a bisbenzocyclobutane resin, a polycyanate ester resin, or a mixture thereof.

85. The composite of any one of embodiments 70 through 84 wherein the cured resin includes an epoxy resin, a maleimide resin, a polycyanate ester resins, or a mixture thereof.

86. The composite of any one of embodiments 70 through 85 wherein the cured resin includes a digycidyl ether of bisphenol A, a diglycidyl ether of bisphenol F, ethylidene bis-4,1-phenylene dicyanate, N,N'-4,4'-diphenylmethanebismaleimide, 4,4'-(1-methylethylidene)bis(2-(2-propenyl) phenol), or a mixture thereof.

87. The composite of any one of embodiments 70 through 86 wherein the cured resin includes an epoxy resin or a mixture of epoxy resins.

88. The composite of any one of embodiments 70 or 72 through 87 wherein the silica nanoparticles include an average particle size in the range from about 1 nanometer to about 1000 nanometers.

89. The composite of any one of embodiments 70 or 72 through 88 wherein the silica nanoparticles include an average particle size in the range from about 1 nanometer to about 500 nanometers.

90. The composite of any one of embodiments 70 or 72 through 89 wherein the silica nanoparticles include an average particle size in the range from about 1 nanometer to about 100 nanometers.

91. The composite of any one of embodiments 70 through 90 wherein the composite includes from about 10 to about 50 weight percent of the silica nanoparticles.

92. The composite of any one of embodiments 70 through 91 wherein the composite includes from about 15 to about 30 weight percent of the silica nanoparticles.

93. The composite of any one of embodiments 70 through 92 wherein the composite includes from about 20 to about 70 weight percent of the silica nanoparticles.

94. The composite of any one of embodiments 70 through 93 wherein the filler includes at least one of reinforcing continuous fibers and reinforcing discontinuous fibers.

95. The composite of embodiment 94 wherein the filler includes carbon, glass, ceramic, boron, silicon carbide, basalt, ceramic, polyimide, polyamide, polyethylene, polypropylene, polyacrylnitrile, or a combination thereof.

96. The composite of embodiment 94 or embodiment 95 wherein the reinforcing continuous fibers include a unidirectional array of individual continuous fibers, woven fabric, knitted fabric, yarn, roving, braided constructions, or nonwoven mat.

97. The composite of any one of embodiments 70 through 96 further including a curing agent including an amine curing agent, an anhydride curing agent, a dicyandiamide curing agent, a diaminodiphenyl sulfone curing agent, or a combination thereof.

98. The composite of embodiment 97 wherein the curing agent includes an amine curing agent.

99. The composite of embodiment 97 wherein the curing agent includes an anhydride curing agent.

100. The composite of embodiment 97 wherein the curing agent includes a dicyandiamide curing agent.

101. The composite of embodiment 97 wherein the curing agent includes a diaminodiphenyl sulfone curing agent.

102. The composite of embodiment 70 wherein the composite consists essentially of the silica nanoparticles and a dispersant dispersed in the curable resin and the filler embedded in the cured resin.

103. An article including from about 10 to about 50 weight percent of silica nanoparticles, and a dispersant, dispersed in a cured resin; wherein the silica nanoparticles include nonspherical silica nanoparticles, spherical pyrogenic silica nanoparticles, or a combination thereof.

104. The article of embodiment 103, wherein the silica nanoparticles include nonspherical silica nanoparticles including a population of clusters of primary spherical silica nanoparticles. The population of clusters includes a mean size in the range of from 40 to 900 nanometers, and the primary spherical silica nanoparticles have a diameter in the range of from 1 to 100 nanometers.

105. The article of embodiment 103 or embodiment 104 wherein the silica nanoparticles include spherical pyrogenic silica nanoparticles.

106. The article of any one of embodiments 103 through 105 wherein the dispersant includes a copolymer having acidic groups.

107. The article of any one of embodiments 103 through 106 wherein the dispersant includes a phosphoric acid polyester dispersant, a Jeffamine sulfonate, a hyperbranched high molecular weight polyester, or a combination thereof.

108. The article of any one of embodiments 103 through 107 further including a catalyst.

109. The article of embodiment 108 wherein the catalyst includes stannous chloride ($SnCl_2$) or methylethylketone peroxide.

110. The article of any one of embodiments 103 through 109 further including a surface treatment agent including an organosilane, a monohydric alcohol, a polyol, or a combination thereof.

111. The article of embodiment 110 wherein the surface treatment agent comprises phenyl trimethoxysilane, benzooxasilepin dimethyl ester, phenethyltrimethoxy silane, N-phenylaminopropyl trimethoxysilane, or a mixture thereof.

112. The article of any one of embodiments 103 through 111 further including at least one diluent.

113. The article of embodiment 112 wherein the at least one diluent includes a mono- or poly-functional glycidyl ether, styrene, or a combination thereof.

114. The article of any one of embodiments 103 through 113 further including at least one additive selected from the group consisting of curing agents, cure accelerators, defoamers, air release agents, crosslinking agents, dyes, flame retardants, pigments, impact modifiers, and flow control agents.

115. The article of any one of embodiments 103 through 114 wherein the silica nanoparticles include a bimodal particle size distribution.

116. The article of any one of embodiments 103 through 114 wherein the silica nanoparticles include a unimodal particle size distribution.

117. The article of any one of embodiments 103 through 116 wherein the cured resin includes an epoxy resin, a cured imide resin, a vinyl ester resin, an acrylic resin, a bisbenzocyclobutane resin, a polycyanate ester resin, or a mixture thereof.

118. The article of any one of embodiments 103 through 117 wherein the cured resin includes an epoxy resin, a maleimide resin, a polycyanate ester resins, or a mixture thereof.

119. The article of any one of embodiments 103 through 118 wherein the cured resin includes a digycidyl ether of bisphenol A, a diglycidyl ether of bisphenol F, ethylidene bis-4,1-phenylene dicyanate, N,N'-4,4'-diphenylmethanebismaleimide, 4,4'-(1-methylethylidene)bis(2-(2-propenyl) phenol), or a mixture thereof.

120. The article of any one of embodiments 103 through 119 wherein the cured resin includes an epoxy resin or a mixture of epoxy resins.

121. The article of any one of embodiments 103 or 105 through 120 wherein the silica nanoparticles include an average particle size in the range from about 1 nanometer to about 1000 nanometers.

122. The article of any one of embodiments 103 or 105 through 121 wherein the silica nanoparticles include an average particle size in the range from about 1 nanometer to about 500 nanometers.

123. The article of any one of embodiments 103 or 105 through 122 wherein the silica nanoparticles include an average particle size in the range from about 1 nanometer to about 100 nanometers.

124. The article of any one of embodiments 103 through 123 wherein the article includes from about 10 to about 30 weight percent of the silica nanoparticles.

125. The article of any one of embodiments 103 through 124 wherein the article includes from about 15 to about 30 weight percent of the silica nanoparticles.

126. The article of any one of embodiments 103 through 124 wherein the article includes from about 20 to about 70 weight percent of the silica nanoparticles.

127. The article of any one of embodiments 103 through 126 further including a filler embedded in the cured resin, wherein the filler includes at least one of reinforcing continuous fibers, reinforcing discontinuous fibers, and hollow glass bubbles.

128. The article of embodiment 127 wherein the filler includes at least one of reinforcing continuous fibers and reinforcing discontinuous fibers.

129. The article of embodiment 127 or embodiment 128 wherein the filler includes carbon, glass, ceramic, boron, silicon carbide, basalt, ceramic polyimide, polyamide, polyethylene, polypropylene, polyacrylnitrile, or a combination thereof.

130. The article of any one of embodiments 128 through 129 wherein the reinforcing continuous fibers include a unidirectional array of individual continuous fibers, woven fabric, knitted fabric, yarn, roving, braided constructions, or non-woven mat.

131. The article of any one of embodiments 103 through 130 further including a curing agent including an amine curing agent, an anhydride curing agent, a dicyandiamide curing agent, a diaminodiphenyl sulfone, or a combination thereof.

132. The article of embodiment 131 wherein the curing agent includes an amine curing agent.

133. The article of embodiment 131 wherein the curing agent includes an anhydride curing agent.

134. The article of embodiment 131 wherein the curing agent includes a dicyandiamide curing agent.

135. The article of embodiment 131 wherein the curing agent includes a diaminodiphenyl sulfone curing agent.

136. The article of any one of embodiments 103 through 135 wherein the article includes a turbine blade, a pressure vessel, an aerospace part, a cable, or sporting goods equipment.

137. The article of embodiment 136 wherein the article includes a golf club, a baseball bat, a fishing rod, a racquet, or a bicycle frame.

138. The article of embodiment 136 wherein the article includes a pressure vessel.

139. The article of embodiment 103 wherein the nanocomposite consists essentially of about 4 to about 50 weight percent of silica nanoparticles, and a dispersant, dispersed in a cured resin.

140. A method of preparing a nanoparticle-containing curable resin system including mixing from 10 to 70 weight percent of aggregated silica nanoparticles with a curable resin, a first dispersant, and optionally a catalyst, a surface treatment agent, and/or a diluent, to form a first mixture, wherein the mixture includes less than 2% by weight solvent; and milling the first mixture in a first immersion mill including milling media to form a milled resin system comprising silica nanoparticles and the first dispersant dispersed in the curable resin.

141. The method of embodiment 140 further including mixing from 10 to 70 weight percent of aggregated silica nanoparticles with a curing agent and a second dispersant to form a second mixture, wherein the second mixture includes less than 2% by weight solvent; milling the second mixture in a second immersion mill including milling media to form a milled composition comprising silica nanoparticles and the second dispersant dispersed in the curing agent; and mixing the milled resin system with the milled composition.

142. The method of embodiment 141 wherein the first mixture includes from 10 to 50 weight percent of aggregated silica nanoparticles and the second mixture includes from 10 to 50 weight percent of aggregated silica nanoparticles.

143. The method of any one of embodiments 140 through 142 wherein the aggregated silica nanoparticles include an average size in the range from about 25 micrometers (μm) to about 300 μm.

144. The method of any one of embodiments 140 through 143, wherein the silica nanoparticles include nonspherical silica nanoparticles including a population of clusters of primary spherical silica nanoparticles. The population of clusters includes a mean size in the range of from 40 to 900 nanometers, and the primary spherical silica nanoparticles have a diameter in the range of from 1 to 100 nanometers.

145. The method of any one of embodiments 140 through 144 wherein the silica nanoparticles include spherical pyrogenic silica nanoparticles.

146. The method of any one of embodiments 140 through 145 wherein the milling media includes zirconia particles.

147. The method of any one of embodiments 140 through 146 wherein the milling media includes yttrium-stabilized zirconia beads.

148. The method of any one of embodiments 140 through 143 or 145 through 147 wherein the milling is performed until the aggregated silica nanoparticles are dispersed to form silica nanoparticles including an average particle size in the range from about 1 nanometer to about 1000 nanometers.

149. The method of any one of embodiments 140 through 143 or 145 through 148 wherein the silica nanoparticles include an average particle size in the range from about 1 nanometer to about 500 nanometers.

150. The method of embodiment 140 through 143 or 145 through 148 wherein the silica nanoparticles include an average particle size in the range from about 1 nanometer to about 100 nanometers.

151. The method of any one of embodiments 140 through 150 wherein the first dispersant includes a copolymer having acidic groups.

152. The method of embodiment 140 through 151 wherein the first dispersant includes a phosphoric acid polyester dispersant, a Jeffamine sulfonate, a hyperbranched high molecular weight polyester, or a combination thereof.

153. The method of any one of embodiments 140 through 152 further comprising including a catalyst in the first mixture for reacting silanol groups on the surface of the silica nanoparticles with the curable resin system.

154. The method of embodiment 153 wherein the catalyst includes stannous chloride ($SnCl_2$) or methylethylketone peroxide.

155. The method of any one of embodiments 140 through 154 further including a surface treatment agent including an organosilane, a monohydric alcohol, a polyol, or a combination thereof.

156. The method of embodiment 155 wherein the surface treatment agent includes surfaces treated with phenyl trimethoxysilane, benzooxasilepin dimethyl ester, phenethyltrimethoxy silane, N-phenylaminopropyl trimethoxysilane, or a mixture thereof.

157. The method of any one of embodiments 140 through 156 further comprising including at least one diluent in the first mixture.

158. The method of embodiment 157 wherein the at least one diluent includes a mono- or poly-functional glycidyl ether, styrene, or a combination thereof.

159. The method of any one of embodiments 140 through 158 further including at least one additive selected from the group consisting of curing agents, cure accelerators, defoamers, air release agents, catalysts, crosslinking agents, dyes, flame retardants, pigments, impact modifiers, and flow control agents.

160. The method of any one of embodiments 140 through 159 wherein the silica nanoparticles include a bimodal particle size distribution.

161. The method of any one of embodiments 140 through 159 wherein the silica nanoparticles include a unimodal particle size distribution.

162. The method of any one of embodiments 140 through 161 wherein the curable resin includes an epoxy resin, a curable imide resin, a vinyl ester resin, an acrylic resin, a bisbenzocyclobutane resin, a polycyanate ester resin, or a mixture thereof.

163. The method of any one of embodiments 140 through 162 wherein the curable resin includes an epoxy resin, a maleimide resin, a polycyanate ester resins, or a mixture thereof.

164. The method of any one of embodiments 140 through 163 wherein the curable resin includes a digycidyl ether of bisphenol A, a diglycidyl ether of bisphenol F, ethylidene bis-4,1-phenylene dicyanate, N,N'-4,4'-diphenylmethanebismaleimide, 4,4'-(1-methylethyl idene)bis(2-(2-propenyl) phenol), or a mixture thereof.

165. The method of any one of embodiments 140 through 164 wherein the curable resin includes an epoxy resin or a mixture of epoxy resins.

166. The method of any one of embodiments 140 through 165 wherein the milled resin system includes from about 15 to about 30 weight percent of the silica nanoparticles.

167. The method of any one of embodiments 140 through 166 wherein the milled resin system includes from about 20 to about 30 weight percent of the silica nanoparticles.

168. The method of any one of embodiments 140 through 165 wherein the milled resin system includes from about 20 to about 70 weight percent of the silica nanoparticles.

169. The method of any one of embodiments 140 through 168 further comprising including a filler in the milled resin system including at least one of reinforcing continuous fibers, reinforcing discontinuous fibers, and hollow glass bubbles.

170. The method of embodiment 169 wherein the filler includes at least one of reinforcing continuous fibers and reinforcing discontinuous fibers.

171. The method of embodiment 169 or embodiment 170 wherein the filler includes carbon, glass, ceramic, boron, silicon carbide, basalt, ceramic, polyimide, polyamide, polyethylene, polypropylene, polyacrylnitrile, or a combination thereof.

172. The method of embodiment 170 or embodiment 171 wherein the reinforcing continuous fibers include a unidirectional array of individual continuous fibers, woven fabric, knitted fabric, yarn, roving, braided constructions, or non-woven mat.

173. The method of any one of embodiments 140 or 143 through 172 further comprising including a curing agent in the milled resin system, the curing agent including an amine curing agent, an anhydride curing agent, a dicyandiamide curing agent, a diaminodiphenyl sulfone curing agent, or a combination thereof.

174. The method of embodiment 173 wherein the curing agent includes an amine curing agent.

175. The method of embodiment 173 wherein the curing agent includes an anhydride curing agent.

176. The method of embodiment 173 wherein the curing agent includes a dicyandiamide curing agent.

177. The method of embodiment 173 wherein the curing agent includes a diaminodiphenyl sulfone curing agent.

178. The method of embodiment 141 wherein the curing agent includes an amine curing agent, an anhydride curing agent, a dicyandiamide curing agent, a diaminodiphenyl sulfone curing agent, or a combination thereof.

179. The method of embodiment 178 wherein the curing agent includes an amine curing agent.

180. The method of embodiment 178 wherein the curing agent includes an anhydride curing agent.

181. The method of embodiment 178 wherein the curing agent includes a dicyandiamide curing agent.

182. The method of embodiment 178 wherein the curing agent includes a diaminodiphenyl sulfone curing agent.

183. The method of embodiment 140 wherein the first milled resin system consists essentially of about 10 to about 70 weight percent of silica nanoparticles and a dispersant, dispersed in a curable resin.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

SUMMARY OF MATERIALS

Unless otherwise noted, all parts, percentages, ratios, etc, in the Examples and the rest of the specification are by weight. Table 1 provides a description or role, and a source, for materials used in the Examples below:

TABLE 1

| Material | Description or Role | Source |
|---|---|---|
| TIXOSIL 68 | Silica nano-particles | Rhodia, Bristol, PA |
| NANOSIL | Silica nano-particles | Energy Strategy Associates, Inc., Old Chatham, NY |
| NALCO 2329 | Silica nano-particles | Nalco Chemical Company, Oak Brook, IL |
| NALCO 2327 | Silica nano-particles | Nalco Chemical Company, |
| EPON 826 | Liquid epoxy resin | Momentive Performance Materials Inc. |
| EPON 1001F | Solid epoxy resin | Momentive Performance Materials Inc. |
| HELOXY 68 | Neopentyl glycol diglycidyl ether | Momentive Performance Materials Inc. |
| HELOXY 107 | Cyclohexane dimethanol diglycidyl ether | Momentive Performance Materials Inc. |
| Phenyl trimethoxysilane (TMPS) | Silica surface treatment | Gelest, Inc., Morrisville, PA |
| BYK 180 | Dispersant - alkylol ammonium salt of a copolymer with acid groups | BYK USA, Inc., Wallingford, CT |
| BYK 2152 | Dispersant - hyperbranched polyester | BYK USA, Inc., |
| BYK W9010 | Dispersant - copolymer with acidic groups | BYK USA, Inc. |
| SOLPLUS D510 | Dispersant - polymeric | Lubrizol Additives, Wickliffe, OH |
| SOLPLUS D570 | Dispersant - acrylic polymer salt | Lubrizol Additives |
| ZEPHRYM PD 1000 | Dispersant - polymeric | Croda, Inc., Edison, NJ |
| ZEPHRYM PD 2246 | Dispersant - nonionic polymeric polyester copolymer | Croda, Inc. |
| JAS | Dispersant - Jeffamine sulfonate | 3M Company, St. Paul, MN |
| EPIKURE 3230 | Amine curing agent | Momentive Performance Materials Inc. |
| LINDRIDE 36V | Anhydride curing agent | Lindau Chemicals Inc., Columbia, SC |
| 1-methoxy-2-propanol | Solvent | Univar USA Inc., Kirkland, WA |
| Methylethylketone | Solvent | Avantor Performance Materials, Inc., Center Valley, PA |
| Deionized water | Solvent | — |

Particle Size Test Method

Particle size of the silica particles was measured by laser diffraction using a Horiba LA-950 (Horiba, Kyoto, Japan). The optical model used a refractive index of 1.46 for silica and 1.38 for methylethylketone (MEK). The second differential method was used for smoothing based on 150 iterations. The dispersion was diluted to approximately 1 weight percent solids with MEK. The diluted sample was then added to the measurement cell which was filled with MEK until the transmittance was between the recommended levels of 85-95%. The particle size was reported as a mean (i.e., average diameter) and as a D90. D90 is defined as the diameter at which 90% of the particles have a diameter below the value.

Viscosity Test Method

Viscosity was measured according to ASTM D 2196. Measurements were performed using a Brookfield CAP 2000+ viscometer (Brookfleld Engineering, Middleboro, Mass.).

Glass Transition Temperature Test Method

Glass transition temperature was measured according to ASTM D 7028, using a Q800 dynamic mechanical analyzer (DMA) (TA Instruments, New Castle, Del.).

Tensile Properties Test Method

Storage modulus (E') was measured according to ASTM D 638, using a Q800 dynamic mechanical analyzer (DMA) (TA Instruments, New Castle, Del.).

Immersion Mill Method—Curable Resin Nanocomposites

Example silica nanocomposites were prepared using the following solvent-free milling method. A premix was prepared with the components of the silica nanocomposite. Epoxy (EPON 826) was preheated to 90° C. to decrease its viscosity for ease of handling. The preheated epoxy resin was transferred to a stainless steel jacketed kettle. To the kettle may be added a reactive diluent (HELOXY 68 or HELOXY 107) or solid epoxy (EPON 1001F), and a dispersant as described in the examples. In the case of the solid epoxy (EPON 1001F), it was melted prior to addition to the kettle. A 1:3 ethylene glycol:water mixture was circulated through the jacket of the kettle to control composition temperature during preparation of the premix as well as during milling. The temperature of the glycol:water mixture, and in turn, the composition was regulated by a circulator (PHOENIX II, Thermo Fisher Scientific. Newington, N.H.). The kettle containing the liquid components was secured to the frame of a disperser equipped with a 90 millimeter f-blade (DISPERMAT, CN-10, BYK-Gardner, Columbia, Md.). After activation of the f-blade, mixing of the liquid components, dry silica (NANOSIL or TIXOSIL 68) was gradually added to the kettle.

Milling was performed using a Micro Mill immersion mill (Hockmeyer Equipment Corporation, Elizabeth City, N.C.). The immersion mill was operated with a 0.1 millimeter wire wedge screen filled with approximately 40 milliliters (65 grams) of 0.5-0.7 mm yttrium-stabilized zirconia milling media (Zirmil, Saint-Gobain, Le Pontet Cedex, France). Enclosed in the media field were 8 pegs to agitate the media. A turbo prop at the bottom exterior of the screen provided the driving force for material to circulate through the media field. No auger was used when milling. The mill hardware (screen, milling media, pegs, prop) was wetted and heated with pure epoxy (EPON 826) prior to milling. To accomplish this, the mill hardware was immersed in a stainless steel vessel containing epoxy and the mill activated. The process of milling the pure epoxy both wetted and heated the mill hardware that would be in contact with the composition. After wetting and heating, the hardware was raised from the epoxy and the mill jogged to remove excess epoxy from the hardware. The kettle containing the premix was then transferred from the disperser station to the milling station and milling initiated. The mill was operated at 4.000 revolutions per minute (rpm).

Milling resulted in size reduction of the silica particles from tens to hundreds of micrometers to about a hundred nanometers, as well as, simultaneous surface modification of the silica, and compounding of the silica nanoparticles into the epoxy. Milling was continued until no further significant reduction in silica particle size was measured.

Immersion Mill Method—Curative Nanocomposites

Example curative nanocomposites were prepared using the following solvent-free milling method. A premix was prepared with the components of the silica nanocomposite. Curing agent (LINDRIDE 36V) was placed in a stainless steel jacketed kettle as described in the examples. To the kettle was added a dispersant (W9010). A 1:3 ethylene glycol:water mixture was circulated through the jacket of the kettle to control composition temperature during preparation of the premix as well as during milling. The temperature of the glycol:water mixture, and in turn, the composition was regulated by a circulator (PHOENIX II, Thermo Fisher Scientific, Newington, N.H.). The kettle containing the liquid components was secured to the frame of a disperser equipped with a 90 millimeter f-blade (DISPERMAT, CN-10, BYK-Gardner, Columbia, Md.). After activation of the f-blade, mixing of the liquid components, dry silica (NANOSIL or TIXOSIL 68) was gradually added to the kettle.

Milling was performed using a Micro Mill immersion mill (Hockmeyer Equipment Corporation, Elizabeth City, N.C.). The immersion mill was operated with a 0.1 millimeter wire wedge screen filled with approximately 40 milliliters (65 grams) of 0.5-0.7 mm yttrium-stabilized zirconia milling media (Zirmil, Saint-Gobain, Le Pontet Cedex, France). Enclosed in the media field were 8 pegs to agitate the media. A turbo prop at the bottom exterior of the screen provided the driving force for material to circulate through the media field. No auger was used when milling. The kettle containing the premix was transferred from the disperser station to the milling station. A nitrogen purge may be used to blanket the nanocomposite with an inert atmosphere to inhibit reaction of the curing agent as described in the examples. The mill was operated at 4.000 revolutions per minute (rpm).

Milling resulted in size reduction of the silica particles from tens to hundreds of micrometers to about a hundred nanometers, as well as, simultaneous surface modification of the silica, and compounding of the silica nanoparticles into the curing agent. Milling was continued until no further significant reduction in silica particle size was measured.

Comparative Example 1

Resin without Silica Nanoparticles

The resin of Comparative Example 1 was prepared by mixing epoxy (EPON 826) and reactive diluent (HELOXY 68) according to Table 2 using a speedmixer (Model ARV-3 Vacuum Mixer, Thinky USA, Inc., Laguna Hills, Calif.).

Comparative Example 2

Silica Nanocomposite with Covalently Bonded Surface Treatment

The silica nanocomposite of Comparative Example 2 was prepared using a mixture of surface treated colloidal silicas (NALCO 2329 and NALCO 2327). The surface treatment process of Comparative Example 2 was similar to the methods described in Examples 1 and 9-13 of International Patent Application Publication No. WO 2009/120846 (Tiefenbruck et al.). Phenyl trimethoxysilane (TMPS) was used as the surface treatment agent. Upon completion of the surface treatment process, epoxy (EPON 826) and reactive diluent (HELOXY 107) were compounded into the dispersion. The dispersion was then fed through a wiped film evaporator to remove the water and solvent from the dispersion, according to methods described in International Patent Application Publication No. WO 2011/159521 (Thunhorst et al.). The completion of the stripping process yielded a nanocomposite of silane covalently bonded to the silica in epoxy. The silica nanocomposite was diluted with epoxy (EPON 826) and reactive diluent (HELOXY 68) using a speedmixer (Model ARV-3 Vacuum Mixer, Thinky USA, Inc., Laguna Hills, Calif.) to achieve the final composition of Table 2.

Examples 1-5

Silica Nanocomposite with Non-Covalently Bonded Surface Treatment

The silica nanocomposites of Examples 1-5 were prepared using a nonspherical silica, a non-covalently bonded surface treatment, and a solvent-free method. A dispersant was used to treat the silica particle surface without covalently bonding. The dispersant was chosen to serve two purposes: 1) to reduce the tendency for the particle to reaggregate once milled to smaller sizes; and 2) to chemically modify the particle surface to make it more compatible with the matrix material (e.g. epoxy resin). The Immersion Mill Method—Curable Resin Nanocomposites was used to prepare the examples. The composition, milling conditions, and viscosity are given in Table 2.

Example 6

Silica Nanocomposite with Non-Covalently Bonded Surface Treatment

Example 6 was prepared as Examples 1-5 except two dispersants were used. The composition, milling conditions, and viscosity are given in Table 2.

Examples 7 and 8

Silica Nanocomposite with Non-Covalently Bonded Surface Treatment

Examples 7 and 8 did not result in silica nanocomposites. During preparation of the premix by the method used in Examples 1-5, it was found that the premix viscosity was too high to mill. The composition of Examples 7 and 8 are given in Table 3.

TABLE 2

Composition, milling conditions, and characterization of control and silica nanocomposites with epoxy(EPON 826) and reactive diluent (HELOXY 68)

| | | | Solvent-free | | | | | |
|---|---|---|---|---|---|---|---|---|
| Example | Control CE 1 | Solvent-based CE 2 | EX 1 | EX 2 | EX 3 | EX 4 | EX 5 | EX 6 |
| Silica Particle | n/a[1] | NALCO | TIXOSIL | TIXOSIL | TIXOSIL | TIXOSIL | TIXOSIL | TIXOSIL W9010, |
| Surface Agent | n/a | TMPS | D570 | W9010 | JAS | 2152 | PD1000 | D510 |
| Nanoparticle (wt. %) | — | 20.0 | 20.0 | 20.0 | 20.0 | 20.0 | 20.0 | 20.0 |
| Epoxy (EPON 826) (wt. %) | 75.0 | 59.5 | 58.5 | 58.5 | 58.5 | 58.5 | 58.5 | 58.5 |
| Diluent (HELOXY 68) (wt. %) | 25.0 | 19.8 | 19.5 | 19.5 | 19.5 | 19.5 | 19.5 | 19.5 |
| Surface Agent (wt. %) | — | 0.7 | 2.0 | 2.0 | 2.0 | 2.0 | 2.0 | 1.4, 0.6 |
| Mill Time (hr:min) | n/a | n/a | 5:00 | 4:00 | 4:00 | 4:00 | 5:00 | 4:00 |
| Mill Temperature (° C.) | n/a | n/a | 103 | 100 | 103 | 106 | 100 | 100 |
| Mean Particle Size (nm) | n/a | NM[2] | 102 | 89 | 90 | 91 | 102 | 121 |
| D90 Particle Size (nm) | n/a | NM | 119 | 112 | 112 | 113 | 132 | 173 |
| Peak 1 Distribution (%) | n/a | NM | 99.6 | 99.5 | 99.6 | 100 | 98.6 | 99.4 |
| Viscosity @ 30° C. (Pa-s) | 1.7 | 5.8 | 2.9 | 3.8 | 3.8 | 5.2 | 34 | 59 |

[1]n/a: not applicable.
[2]NM: not measured

TABLE 3

Composition of premixes that were too viscous to mill

| | Solvent-free | |
|---|---|---|
| Example | EX 7 | EX 8 |
| Silica Particle | TIXOSIL 180 | TIXOSIL PD2246 |
| Surface Agent | | |
| Nanoparticle (wt. %) | 20.0 | 20.0 |
| Epoxy (EPON 826) (wt. %) | 58.5 | 58.5 |
| Diluent (HELOXY 68) (wt. %) | 19.5 | 19.5 |
| Surface Agent (wt. %) | 2.0 | 2.0 |
| Mill Time (hr:min) | — | — |
| Mill Temperature (° C.) | — | — |
| Mean Particle Size (nm) | — | — |
| D90 Particle Size (nm) | — | — |
| Peak 1 Distribution (%) | — | — |
| Viscosity @ 30° C. (Pa-s) | — | — |

FIG. 1 shows the viscosity of the control and silica nanocomposites of Comparative Examples 1 and 2, and Examples 1-6. The viscosities of the silica nanocomposites prepared with non-covalently bonded surface treatment are comparable to the nanocomposite with covalently bonded surface treatment. Exceptions are the nanocomposites with dispersants PD1000 and the mixed dispersant W9010/D510 which exhibit higher viscosity.

Comparative Example 1a

Cured Resin without Silica Nanoparticles

Comparative Example 1a was prepared by mixing Comparative Example 1 with an amine curing agent (EPIKURE 3230) according to Table 4 using a speedmixer (Model ARV-3 Vacuum Mixer, Thinky USA, Inc., Laguna Hills, Calif.). The mixture was transferred to a mold and then placed in an oven. The example was cured for 2 hour at 80° C. followed by a post cure for 2 hour at 125° C.

Comparative Example 2a

Cured Silica Nanocomposite with Covalently Bonded Surface Treatment

Comparative Example 2a was prepared as Comparative Example 1a except the silica nanocomposite of Comparative Example 2 was used as the uncured resin.

Examples 1a-6a

Silica Nanocomposite with Non-Covalently Bonded Surface Treatment

Examples 1a-6a were prepared as Comparative Example 1a except the silica nanocomposites of Examples 1-6 were used as the uncured resin.

TABLE 4

Composition and characterization of cured control and silica nanocomposites with epoxy (EPON 826) and reactive diluent (HELOXY 68)

| | | | Solvent-free | | | | | |
|---|---|---|---|---|---|---|---|---|
| Example | Control CE 1a | Solvent-based CE 2a | EX 1a | EX 2a | EX 3a | EX 4a | EX 5a | EX 6a |
| Silica Particle | n/a[1] | NALCO | TIXOSIL | TIXOSIL | TIXOSIL | TIXOSIL | TIXOSIL | TIXOSIL W9010, |
| Surface Agent | n/a | TMPS | D570 | W9010 | JAS | 2152 | PD1000 | D510 |
| Epoxy Nanocomposite (wt. %) | — | 78.7 (CE 2) | 78.6 (EX 1) | 78.6 (EX 2) | 78.6 (EX 3) | 78.6 (EX 4) | 78.6 (EX 5) | 78.6 (EX 6) |
| Epoxy (EPON 826) (wt. %) | 55.6 | — | — | — | — | — | — | — |

TABLE 4-continued

Composition and characterization of cured control and silica nanocomposites with epoxy (EPON 826) and reactive diluent (HELOXY 68)

| | | | Solvent-free | | | | | |
|---|---|---|---|---|---|---|---|---|
| Example | Control CE 1a | Solvent-based CE 2a | EX 1a | EX 2a | EX 3a | EX 4a | EX 5a | EX 6a |
| Silica Particle | n/a[1] | NALCO | TIXOSIL D570 | TIXOSIL W9010 | TIXOSIL JAS | TIXOSIL 2152 | TIXOSIL PD1000 | TIXOSIL W9010, D510 |
| Surface Agent | n/a | TMPS | | | | | | |
| Diluent (HELOXY 68) (wt. %) | 18.5 | — | — | — | — | — | — | — |
| Curing Agent (EPIKURE 3230) (wt. %) | 25.9 | 21.3 | 21.3 | 21.3 | 21.3 | 21.3 | 21.3 | 21.3 |
| $E'_{glass}$ (Mpa) | 1,516 | 1,987 | 1,811 | 1,898 | 1,805 | 1,821 | 1,502 | 1,737 |
| Tg (° C.) | 66.6 | 63.7 | 73.2 | 70.5 | 70.9 | 68.6 | 70.1 | 68.6 |
| $E'_{rubber}$ (Mpa) | 13.42 | 17.33 | 22.19 | 23.02 | 22.71 | 22.96 | 23.28 | 22.37 |

[1]n/a: not applicable

Figure 2:
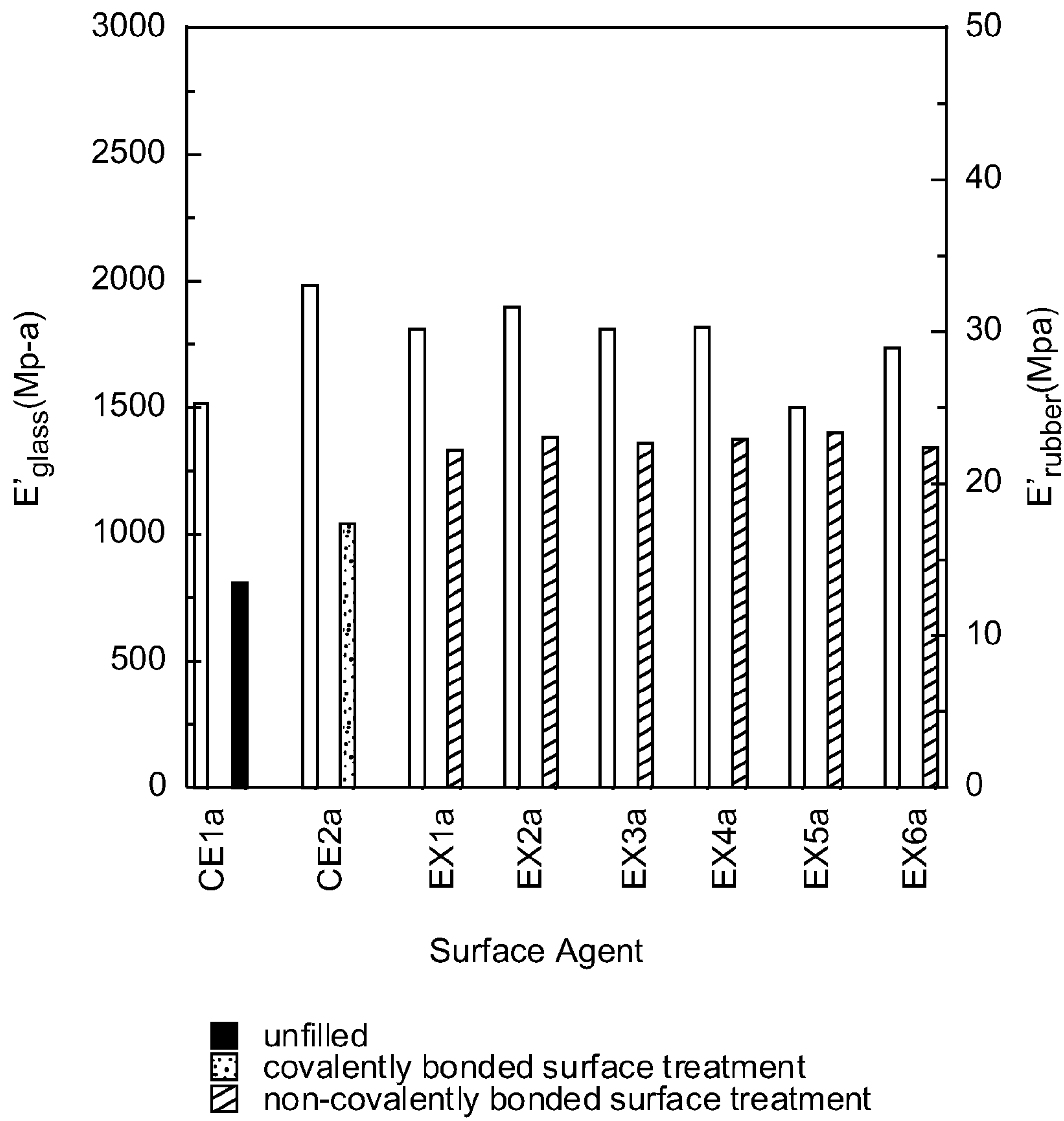

FIG. 2 shows the cured silica nanocomposites with a non-covalently bonded surface treatment of Examples 1a-6a exhibit higher storage modulus in both the glassy and rubber plateau regions relative to the cured unfilled resin of Comparative Example 1a. In FIG. 2, each of the white bars corresponds to the glassy modulus, whereas each of the patterned bars corresponds to the rubber modulus. The glassy modulus of the silica nanocomposites of Examples 1a-6a is slightly lower and the rubber modulus higher than the silica nanocomposite of Comparative Example 2a with covalently bonded surface treatment.

Comparative Example 3

Resin without Silica Nanoparticles

The resin of Comparative Example 3 is pure epoxy (EPON 826).

Comparative Example 4

Silica Nanocomposite with Covalently Bonded Surface Treatment

The silica nanocomposite of Comparative Example 4 was prepared as Comparative Example 2 except the dilution was performed with pure epoxy (EPON 826) and no reactive diluent (HELXOY 68). The composition of Comparative Example 4 is given in Table 5.

Example 9

Silica Nanocomposite with Non-Covalently Bonded Surface Treatment

The silica nanocomposite of Example 9 was prepared as Example 2 except the resin was pure epoxy (EPON 826) and no reactive diluent (HELOXY 68). The milling conditions, final composition, and viscosity are given in Table 5.

TABLE 5

Composition, milling conditions, and characterization of control and silica nanocomposites with epoxy (EPON 826)

| Example | Control CE 3 | Solvent-based CE 4 | Solvent-free EX 9 |
|---|---|---|---|
| Silica Particle | n/a[1] | NALCO TMPS | TIXOSIL W9010 |
| Surface Agent | n/a | | |
| Nanoparticle (wt. %) | — | 20.0 | 20.0 |
| Epoxy (EPON 826) (wt. %) | 100.0 | 79.3 | 78.0 |
| Surface Agent (wt. %) | — | 0.7 | 2.0 |
| Mill Time (hr:min) | n/a | n/a | 5:00 |
| Mill Temperature (° C.) | n/a | n/a | 101 |
| Mean Particle Size (nm) | n/a | NM[2] | 101 |
| D90 Particle Size (nm) | n/a | NM | 128 |
| Peak 1 Distribution (%) | n/a | NM | 98.6 |
| Viscosity @ 30° C. (Pa-s) | 30 | 90 | 594 |

[1]n/a: not applicable.

[2]NM: not measured

Comparative Example 3a

Cured Resin without Silica Nanoparticles

Comparative Example 3a was prepared by mixing Comparative Example 3 with an amine curing agent (EPIKURE 3230) according to Table 6 using a speedmixer (Model ARV-3 Vacuum Mixer, Thinky USA, Inc., Laguna Hills, Calif.). The mixture was transferred to a mold and then placed in an oven. The example was cured for 2 hour at 80° C. followed by a post cure for 2 hour at 125° C.

Comparative Example 4a

Cured Silica Nanocomposite with Covalently Bonded Surface Treatment

Comparative Example 4a was prepared as Comparative Example 3a except the silica nanocomposite of Comparative Example 4 was used as the uncured resin.

Example 9a

Cured Silica Nanocomposites with Non-Covalently Bonded Surface Treatment

Example 9a was prepared as Comparative Example 2a except the silica nanocomposite of Example 9 was used as the uncured resin.

TABLE 6

Composition and characterization of cured control and silica nanocomposites with epoxy (EPON 826)

| Example | Control CE 3a | Solvent-based CE 4a | Solvent-free EX 9a |
|---|---|---|---|
| Silica Particle | n/a[1] | NALCO TMPS | TIXOSIL W9010 |
| Surface Agent | n/a | | |
| Epoxy Nanocomposite (wt. %) | — | 79.4 (CE 4) | 79.1 (EX 9) |
| Epoxy (EPON 826) (wt %) | 75.2 | — | — |
| Curing Agent (EPIKURE 3230) (wt. %) | 24.8 | 20.6 | 20.9 |
| $E'_{glass}$ (Mpa) | 1,256 | 1,447 | 1,811 |
| Tg (° C.) | 92.9 | 93.5 | 73.2 |
| $E'_{rubber}$ (Mpa) | 14.64 | 18.73 | 22.19 |

[1]n/a: not applicable

Figure 3:
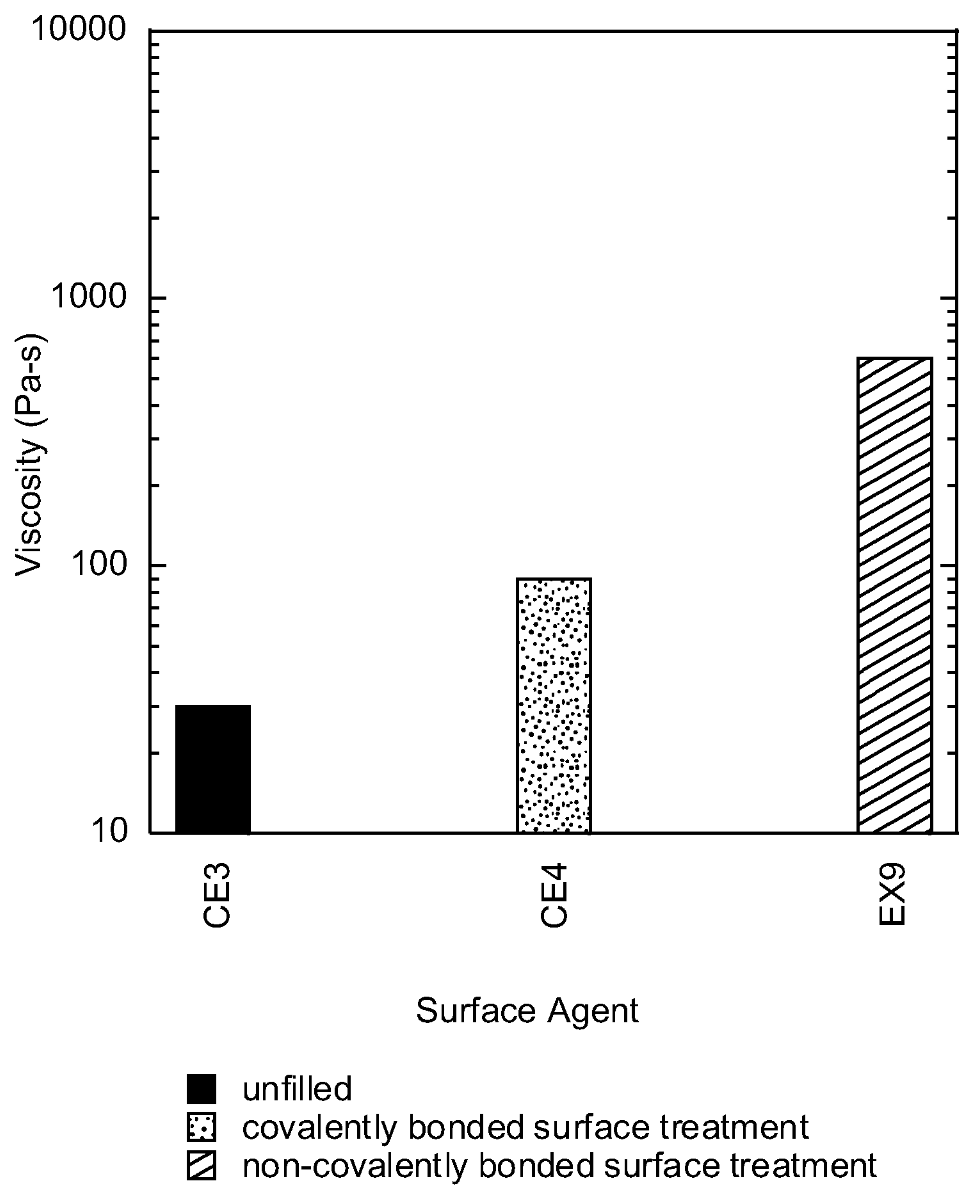
FIG. 3 a graph presenting the measured viscosity of each of Comparative Example 3, Comparative Example 4, and Example 9.
Figure 4:
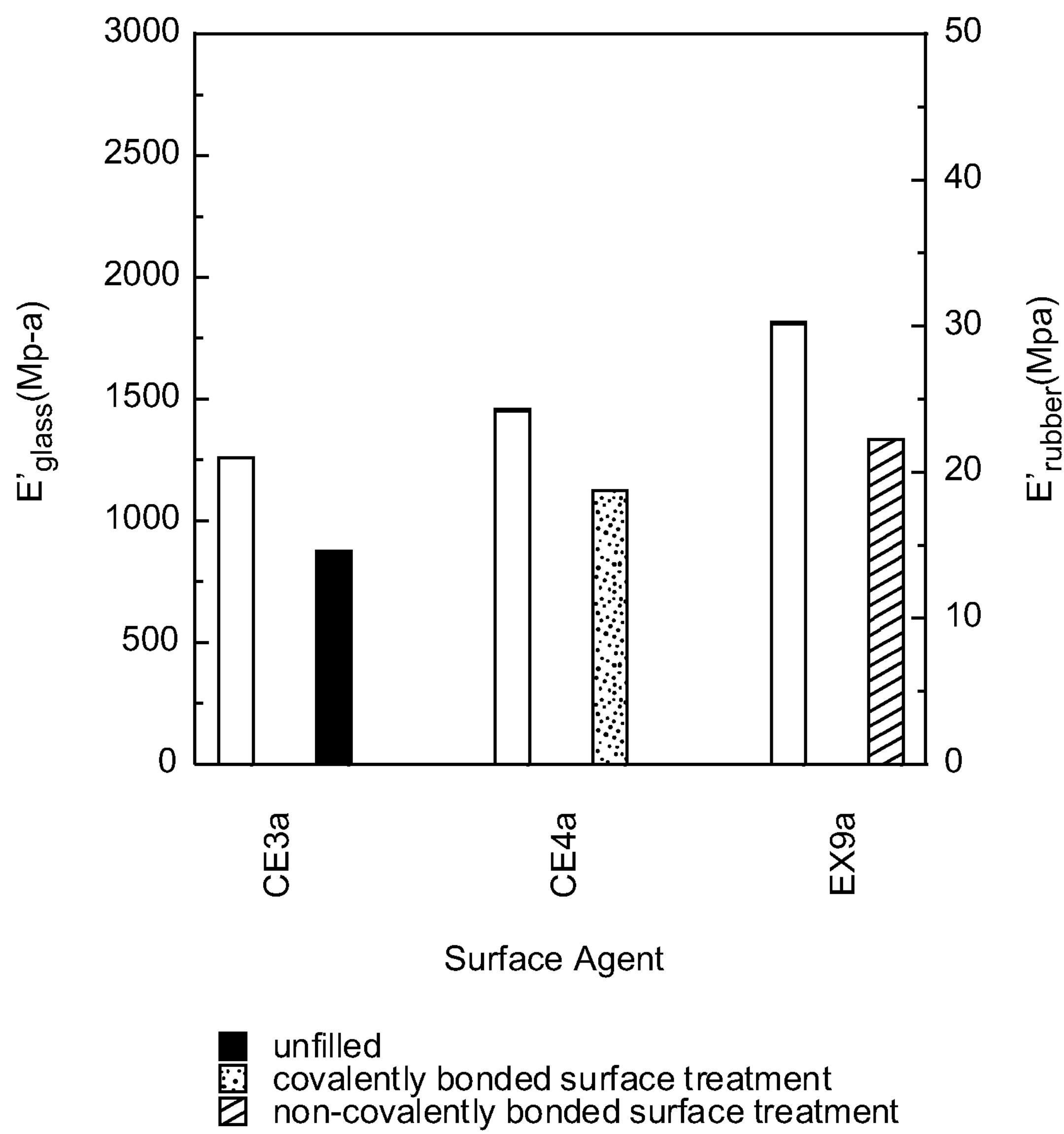

FIG. 3 shows the viscosity of the silica nanocomposite with non-covalently surface treatment is significantly higher than either the unfilled resin or the nanocomposite with covalently bonded surface treatment. FIG. 4 shows the silica nanocomposite with non-covalently bonded surface treatment exhibits higher modulus in both the glassy and rubber plateau regions relative to both the unfilled resin and nanocomposite with covalently bonded surface treatment. In the graph of FIG. 4, each of the white bars corresponds to the glassy modulus, whereas each of the patterned bars corresponds to the rubber modulus.

Comparative Example 5

Resin without Silica Nanoparticles

The resin of Comparative Example 5 was prepared by mixing a liquid epoxy (EPON 826) and solid epoxy (EPON 1001F) according to Table 7 using a speedmixer (Model ARV-3 Vacuum Mixer, Thinky USA, Inc., Laguna Hills, Calif.). Prior to mixing with the speedmixer, the solid epoxy (EPON 1001F) was melted and manually mixed with the liquid epoxy (EPON 826).

Example 10

Silica Nanocomposites with Non-Covalently Bonded Surface Treatment

The silica nanocomposite of Example 10 was prepared as Example 2 except the resin was a blend of liquid epoxy (EPON 826) and solid epoxy ((EPON 1001F). The milling conditions, final composition, and viscosity are given in Table 7.

TABLE 7

Composition, milling conditions, and characterization of control and silica nanocomposite with liquid (EPON 826) and solid (EPON 1001F) epoxies

| Example | Control CE 5 | Solvent-free EX 10 |
|---|---|---|
| Silica Particle | n/a[1] | TIXOSIL W9010 |
| Surface Agent | n/a | |
| Nanoparticle (wt. %) | — | 20.0 |
| Epoxy (EPON 826) (wt. %) | 80.0 | 62.4 |
| Epoxy (EPON 1001F) (wt. %) | 20.0 | 15.6 |
| Surface Agent (wt. %) | — | 2.0 |
| Mill Time (hr:min) | n/a | 5:00 |
| Mill Temperature (° C.) | n/a | 112 |
| Mean Particle Size (nm) | n/a | 104 |
| D90 Particle Size (nm) | n/a | 135 |
| Peak 1 Distribution (%) | n/a | 98.5 |
| Viscosity @ 50° C. (Pa-s) | 98 | 4,825 |

Example 10a

Cured Silica Nanocomposites with Non-Covalently Bonded Surface Treatment

Example 10a was prepared by mixing Example 10 with an amine curing agent (EPIKURE 3230) according to Table 8 using a speedmixer (Model ARV-3 Vacuum Mixer, Thinky USA, Inc., Laguna Hills, Calif.). The mixture was transferred to a mold and then placed in an oven. The example was cured for 2 hour at 80° C. followed by a post cure for 2 hour at 125° C.

TABLE 8

Composition and characterization of cured silica nanocomposite with liquid (EPON 826) and solid (EPON 1001F) epoxies

| Example | Solvent-free EX 10a |
|---|---|
| Silica Particle | TIXOSIL W9010 |
| Surface Agent | |
| Epoxy Nanocomposite (wt. %) | 78.6 (EX 10) |
| Epoxy (EPON 826) (wt. %) | — |
| Epoxy (EPON 1001F) (wt. %) | — |
| Curing Agent (EPIKURE 3230) (wt. %) | 14.9 |
| $E'_{glass}$ (Mpa) | 1,452 |
| Tg (° C.) | 83.9 |
| $E'_{rubber}$ (Mpa) | 11.46 |

Figure 5:
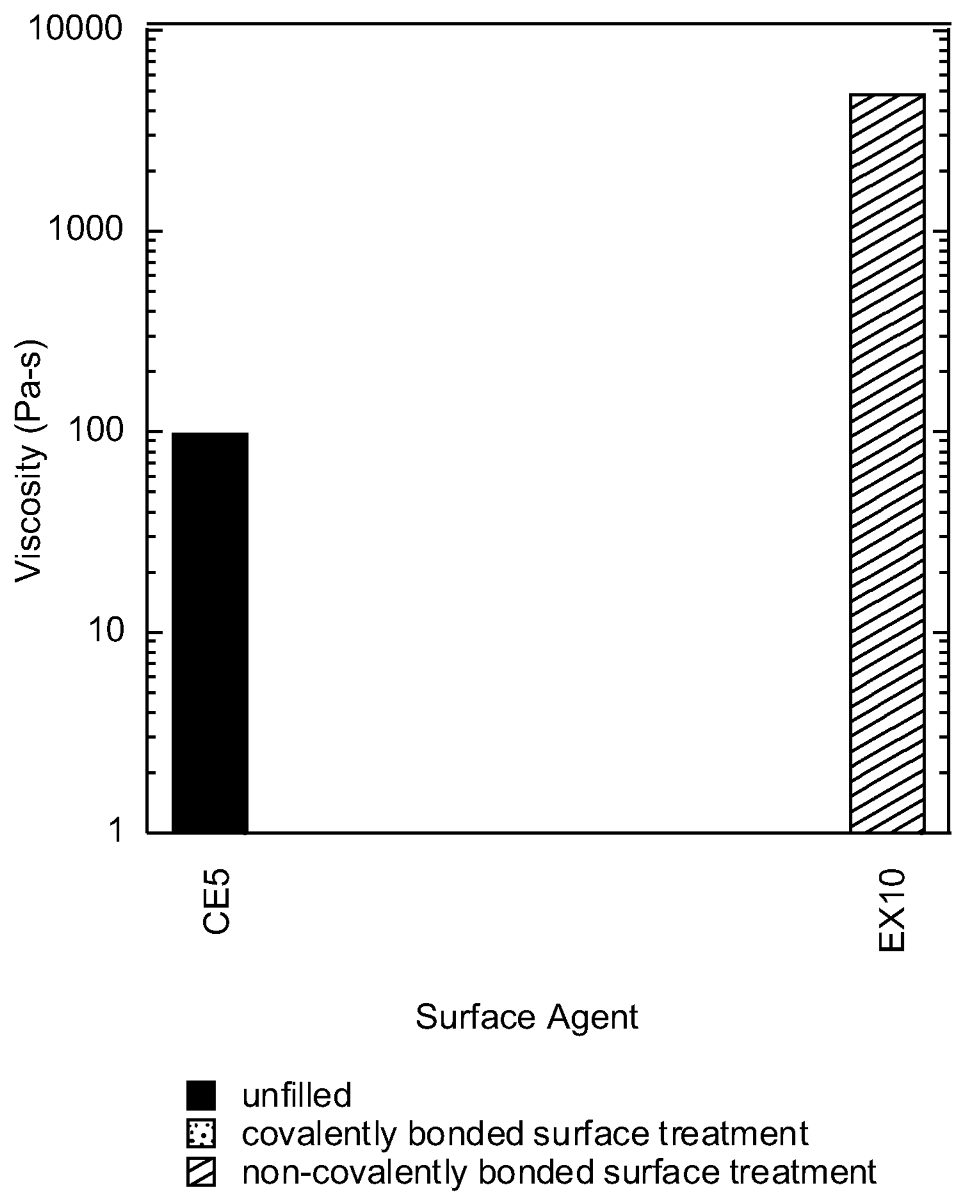
FIG. 5 is a graph presenting the measured viscosity of each of Comparative Example 5 and Example 10.

FIG. 5 shows the viscosity of the silica nanocomposite with the non-covalently surface treatment is significantly higher than the unfilled resin. Table 8 shows the modulus of the cured nanocomposite illustrating that despite its high viscosity, the nanocomposite of Example 10 is processable.

Comparative Example 6

Resin without Silica Nanoparticles

The resin of Comparative Example 6 was prepared by mixing epoxy (EPON 826) and reactive diluent (HELOXY 107) according to Table 9 using a speedmixer (Model ARV-3 Vacuum Mixer, Thinky USA, Inc., Laguna Hills, Calif.).

Comparative Example 7

Epoxy Nanocomposite by a Solvent-Based Method

The silica nanocomposite of Comparative Example 7 was prepared using a mixture of surface treated colloidal silicas (NALCO 2329 and NALCO 2327). The surface treatment process of Comparative Example 7 was similar to the methods described in Examples 1 and 9-13 of International Patent Application Publication No. WO 2009/120846 (Tiefenbruck et al.). Phenyl trimethoxysilane (TMPS) was used as the surface treatment agent. Upon completion of the surface treatment process, epoxy (EPON 826) was compounded into the dispersion. The dispersion was then fed through a wiped film evaporator to remove the water and solvent from the dispersion, according to methods described in international Patent Application Publication No. WO 2011/159521 (Thunhorst et al.). The completion of the stripping process yielded a nanocomposite of silane covalently bonded to the silica in epoxy with composition shown in Table 9.

Examples 11 and 12

Curative Nanocomposite by a Solvent-Free Method

The curative nanocomposites of Example 11 and 12 were prepared using a solvent-free method as described above, Immersion Mill Method—Curative Nanocomposites. The composition, milling conditions, and viscosity are given in Table 9.

TABLE 9

Composition, milling conditions, and characterization of curative nanocomposites

| | Control | Solvent-based | Solvent-free | |
|---|---|---|---|---|
| | CE 6 | CE 7 | EX 11 | EX 12 |
| Silica Particle | n/a[1] | NALCO TMPS | NANOSIL | NANOSIL |
| Surface Agent | n/a | | W9010 | W9010 |
| Nanoparticle (wt. %) | — | 41.7 | 33.0 | 50.0 |
| Epoxy (EPON 826) (wt. %) | 80.0 | 57.6 | — | — |
| Diluent (HELOXY 107) (wt. %) | 20.0 | — | — | — |
| Surface Agent (wt. %) | — | 0.7 | 3.3 | 5.0 |
| Curing Agent (LINDRIDE 36V) (wt. %) | — | — | 63.7 | 45.0 |
| Mill Time (hr:min) | n/a | n/a | 3:00 | 3:00 |
| Mill Temperature (° C.) | n/a | n/a | 45 | 80 |
| Nitrogen ($N_2$) Purge? | n/a | n/a | Yes | Yes |
| Mean Particle Size (nm) | n/a | NM[2] | 329 | 120 |
| D90 Particle Size (nm) | n/a | NM | 1,220 | 161 |
| Peak 1 Distribution (%) | n/a | NM | 84 | 100 |
| Viscosity @ 30° C. (Pa-s) | 4.4 | 530 | 1.8 | 8.3 |

[1]n/a: not applicable.
[2]NM: not measured

Comparative Example 6a

Cured Resin without Nanoparticles

Comparative Example 6a was prepared by mixing Comparative Example 6 with an anhydride curing agent (LINDRIDE 36V) according to Table 10 using a speedmixer (Model ARV-3 Vacuum Mixer, Thinky USA, Inc., Laguna Hills, Calif.). The mixture was transferred to a mold and then placed in an oven. The example was cured for 3 hour at 80° C. followed by a post cure for 2 hour at 150° C.

Comparative Example 7a

Epoxy Nanocomposite

Comparative Example 7a was prepared by mixing the epoxy nanocomposite of Comparative Example 2 with anhydride curing agent (LINDRIDE 36V), epoxy (EPON 826), and reactive diluent (HELOXY 107) according to Table 10 using a speedmixer (Model ARV-3 Vacuum Mixer, Thinky USA, Inc., Laguna Hills, Calif.). The mixture was transferred to a mold and then placed in an oven. The example was cured for 3 hour at 80° C. followed by a post cure for 2 hour at 150° C.

Examples 11a and 12a

Curative Nanocomposites

Examples 11a and 12a were prepared by mixing the curative nanocomposites of Examples 11 and 12 with epoxy (EPON 826) and reactive diluent (HELOXY 107) according to Table 10 using a speedmixer (Model ARV-3 Vacuum Mixer, Thinky USA, Inc., Laguna Hills, Calif.). The mixture was transferred to a mold and then placed in an oven. The example was cured for 3 hour at 80° C. followed by a post cure for 2 hour at 150° C.

TABLE 10

Composition and characterization of cured control and silica nanocomposites

| | Control | Solvent-based | Solvent-free | |
|---|---|---|---|---|
| Example | CE 6a | CE 7a | EX 11a | EX 12a |
| Silica Particle | n/a[1] | NALCO TMPS | NANOSIL | NANOSIL |
| Surface Agent | n/a | | W9010 | W9010 |
| Epoxy Nanocomposite (wt. %) | — | 48.0 (CE 7) | — | — |
| Curative Nanocomposite (wt. %) | — | — | 60.0 (EX 11) | 68.0 (EX 12) |
| Epoxy (EPON 826) (wt. %) | 40.9 | 5.0 | 31.9 | 25.6 |
| Diluent (HELOXY 107) (wt. %) | 10.2 | 8.1 | 8.1 | 6.4 |
| Curing Agent (LINDRIDE 36V) (wt. %) | 48.8 | 38.9 | — | — |
| $E'_{glass}$ (Mpa) | 1,265 | 1,589 | 1,797 | 2,040 |
| Tg (° C.) | 135.77 | 131.8 | 125.1 | 115.5 |
| $E'_{rubber}$ (Mpa) | 25.23 | 31.86 | 25.54 | 32.88 |

[1]n/a: not applicable

Figure 6:
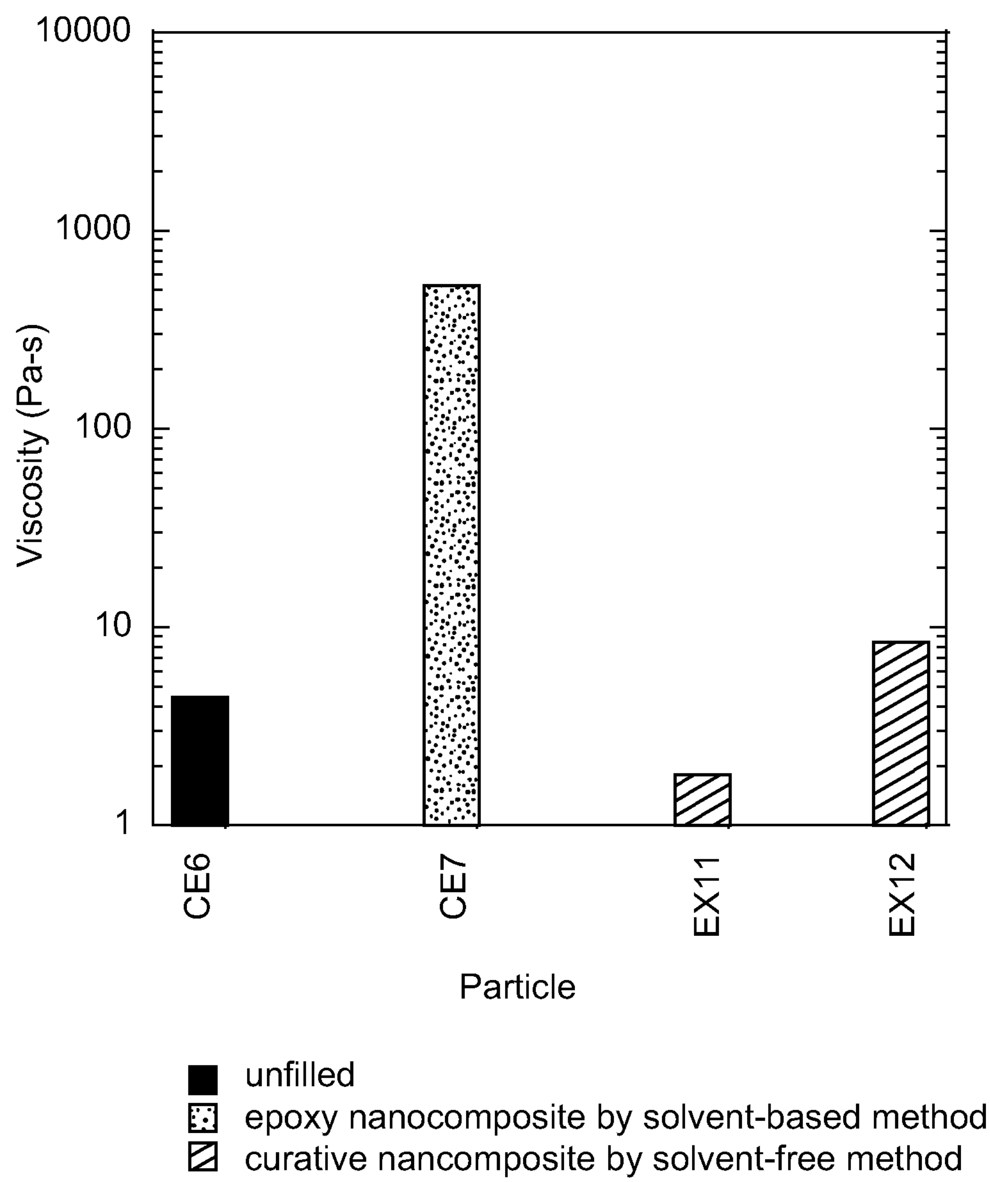
FIG. 6 is a graph presenting the measured viscosity of each of Comparative Example 6, Comparative Example 7, Example 11, and Example 12.
Figure 7:
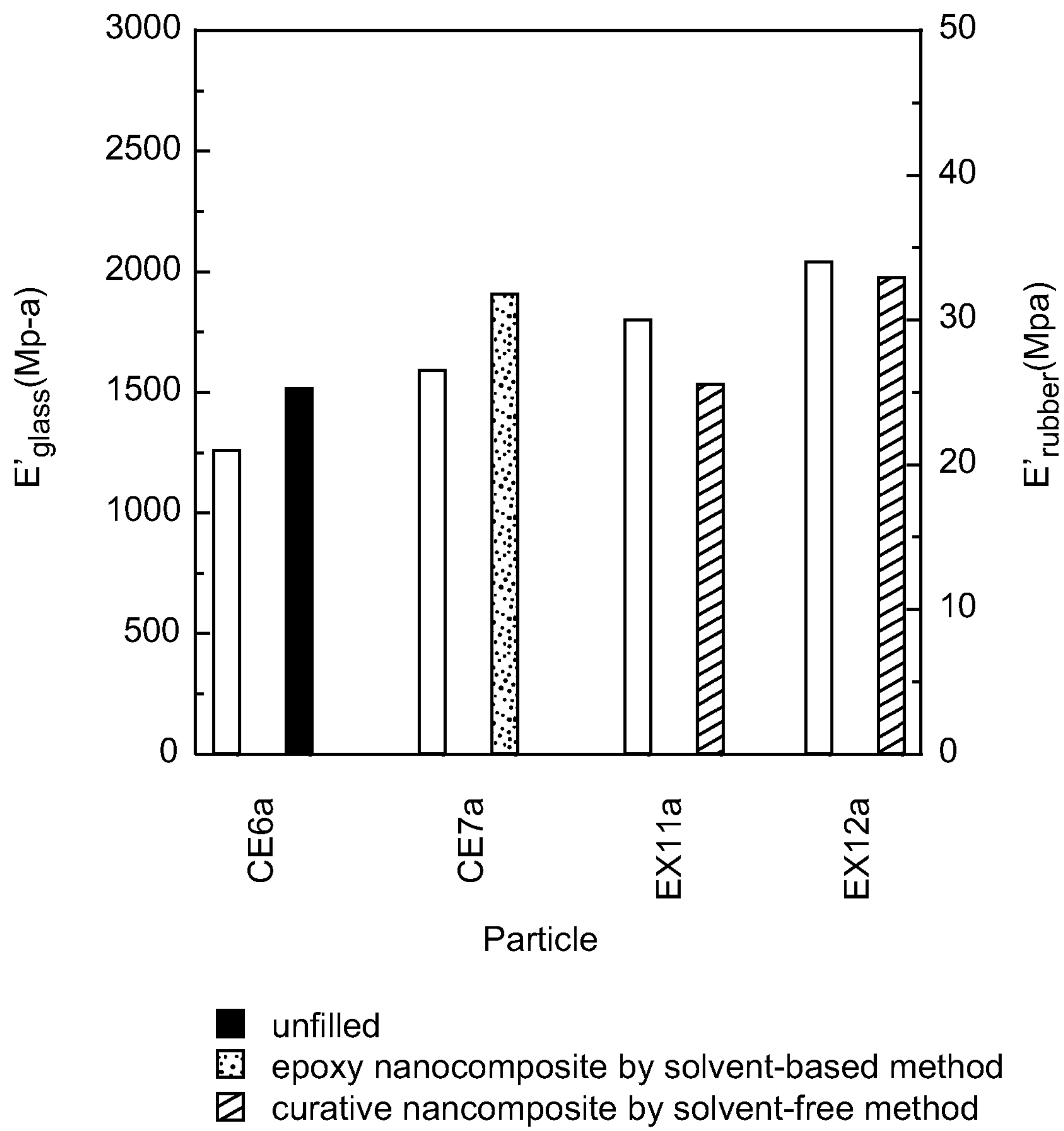

FIG. 6 shows the viscosity of the unfilled resin of Comparative Example 6, uncured epoxy nanocomposite of Comparative Example 7, and uncured curative nanocomposites of Examples 11 and 12. The curing agent (LINDRIDE 36V) has lower viscosity than the epoxy (EPON 826) and reactive diluent (HELXOY 107). The viscosity results show it is possible to prepare a highly loaded curative nanocomposite (50 wt. % silica) by a solvent-free method that exhibits very low viscosity. FIG. 7 shows the cured curative nanocomposites of each of Examples 11 and 12 exhibits higher glassy and rubber modulus compared to the cured unfilled resin of Comparative Example 6a, and that high silica loadings are possible using the curative nanocomposite method. In the graph of FIG. 7, each of the white bars corresponds to the glassy modulus, whereas each of the patterned bars corresponds to the rubber modulus.

Comparative Example 8

Resin without Silica Nanoparticle

The resin of Comparative Example 8 was prepared by mixing epoxy (EPON 826) and reactive diluent (HELOXY 107) according to Table 11 using a speedmixer (Model ARV-3 Vacuum Mixer, Thinky USA, Inc., Laguna Hills, Calif.).

Examples 13 and 14

Epoxy Nanocomposites by a Solvent-Free Method

The epoxy nanocomposites of Examples 13 and 14 were prepared using a solvent-free method as described above, Immersion Mill Method—Curable Resin Nanocomposite using a precipitated silica (TIXOSIL 68). The composition, milling conditions, and viscosity are given in Table 11.

Example 15 and 16

Epoxy Nanocomposites by a Solvent-Free Method

The epoxy nanocomposites of Examples 15 and 16 were prepared as Examples 13 and 14 except a pyrogenic silica (NANOSIL) was used.

TABLE 11

Composition, milling conditions, and characterization of control and epoxy nanocomposites

| | Control | Solvent-based | Solvent-free | | | |
|---|---|---|---|---|---|---|
| | CE 8 | CE 7 | EX 13 | EX 14 | EX 15 | EX 16 |
| Silica Particle | n/a[1] | NALCO | TIXOSIL | TIXOSIL | NANOSIL | NANOSIL |
| Surface Agent | n/a | TMPS | W9010 | W9010 | W9010 | W9010 |
| Nanoparticle (wt. %) | — | 41.7 | 33.0 | 20.0 | 20.0 | 33.0 |
| Epoxy (EPON 826) (wt. %) | 80.0 | 57.6 | 51.0 | 62.4 | 62.4 | 51.0 |
| Diluent (HELOXY 107) (wt. %) | 20.0 | — | 12.7 | 15.6 | 15.6 | 12.7 |
| Surface Agent (wt. %) | — | 0.7 | 3.3 | 2.0 | 2.0 | 3.3 |
| Curing Agent (LINDRIDE 36V) (wt. %) | — | — | — | — | — | — |
| Mill Time (hr:min) | n/a | n/a | 5:00 | 6:00 | 2:00 | 2:00 |
| Mill Temperature (° C.) | n/a | n/a | 110 | 90 | 97 | 95 |
| Mean Particle Size (nm) | n/a | NM[2] | 128 | 95 | 102 | 106 |
| D90 Particle Size (nm) | n/a | NM | 126 | 113 | 145 | 147 |
| Peak 1 Distribution (%) | n/a | NM | 96.4 | 98.8 | 100 | 100 |
| Viscosity @ 30° C. (Pa-s) | 4.4 | 530 | 233 @ 90° C. | 65 | 14 | 27 |

[1]n/a: not applicable.
[2]NM: not measured

Example 17

Curative Nanocomposite

The curative nanocomposite of Example 17 was prepared using a solvent-free method as described above, Immersion Mill Method—Curative Nanocomposites using a precipitated silica (TIXOSIL 68). The composition, milling conditions, and viscosity are given in Table 12.

Examples 18 and 19

Curative Nanocomposites

The curative nanocomposites of Examples 18 and 19 were prepared as Example 17 except a pyrogenic silica (NANOSIL) was used.

TABLE 12

Composition, milling conditions, and characterization of curative nanocomposites

| | Solvent-free | | |
|---|---|---|---|
| | EX 17 | EX 18 | EX 19 |
| Silica Particle | TIXOSIL W9010 | NANOSIL | NANOSIL |
| Surface Agent | | W9010 | W9010 |
| Nanoparticle (wt. %) | 20.0 | 20.0 | 33.0 |
| Epoxy (EPON 826) (wt. %) | — | — | — |
| Diluent (HELOXY 107) (wt. %) | — | — | — |
| Surface Agent (wt. %) | 2.0 | 2.0 | 3.3 |
| Curing Agent (LINDRIDE 36V) (wt. %) | 78.0 | 78.0 | 63.7 |

TABLE 12-continued

| Composition, milling conditions, and characterization of curative nanocomposites | | | |
|---|---|---|---|
| | | Solvent-free | |
| | EX 17 | EX 18 | EX 19 |
| Mill Time (hr:min) | 6:00 | 3:00 | 3:00 |
| Mill Temperature (° C.) | 103 | 50 | 45 |
| Nitrogen ($N_2$) Purge? | No | Yes | Yes |
| Mean Particle Size (nm) | 188 | 158 | 329 |
| D90 Particle Size (nm) | 180 | 158 | 1,220 |
| Peak 1 Distribution (%) | 96 | 99 | 84 |
| Viscosity @ 30° C. (Pa-s) | 33 | 0.8 | 1.8 |

Comparative Example 8a

Cured Resin without Nanoparticles

Comparative Example 8a was prepared by mixing Comparative Example 8 with an anhydride curing agent (LINDRIDE 36V) according to Table 13 using a speedmixer (Model ARV-3 Vacuum Mixer, Thinky USA, Inc., Laguna Hills. Calif.). The mixture was transferred to a mold and then placed in an oven. The example was cured for 3 hour at 80° C. followed by a post cure for 2 hour at 150° C.

Comparative Example 7b

Cured Epoxy Nanocomposite

Comparative Example 7b was prepared by mixing Comparative Example 7 with an anhydride curing agent (LINDRIDE 36V), epoxy (EPON 826), and reactive diluent (HELOXY 107) according to Table 13 using a speedmixer (Model ARV-3 Vacuum Mixer, Thinky USA, Inc., Lagunn Hills, Calif.). The mixture was transferred to a mold and then placed in an oven. The example was cured for 3 hour at 80° C. followed by a post cure for 2 hour at 150° C.

Example 13a

Cured Epoxy Nanocomposite

In an attempt to prepare Example 13a, it was found that the epoxy nanocomposite of Example 13 was too viscous to mix with the anhydride curing agent (LINDRIDE 36V), epoxy (EPON 826), and reactive diluent (HELOXY 107).

Example 14a

Cured Two Part Curable Nanocomposite

Example 14a was prepared by mixing the epoxy nanocomposite of Example 14 and the curative nanocomposite of Example 17 which were both at the same silica concentration, 20 wt. %. A precipitated silica (TIXOSIL 68) was used. The two nanocomposites were mixed according to Table 3 using a speedmixer (Model ARV-3 Vacuum Mixer, Thinky USA, Inc., Laguna Hills. Calif.). The example was cured for 3 hour at 80° C. followed by a post cure for 2 hour at 150° C.

Example 15a

Cured Two Part Curable Nanocomposite

Example 15a was prepared by mixing the epoxy nanocomposite of Example 15 and the curative nanocomposite of Example 18 which were both at the same silica concentration, 20 wt. %. A pyrogenic silica (NANOSIL) was used. The two nanocomposites were mixed according to Table 13 using a speedmixer (Model ARV-3 Vacuum Mixer, Thinky USA, Inc., Laguna Hills, Calif.). The example was cured for 3 hour at 80° C. followed by a post cure for 2 hour at 150° C.

Example 16a

Cured Two Part Curable Nanocomposite

Example 16a was prepared by mixing the epoxy nanocomposite of Example 16 and the curative nanocomposite of Example 19 which were both at the same silica concentration, 33 wt. %. A pyrogenic silica (NANOSIL) was used. The two nanocomposites were mixed according to Table 13 using a speedmixer (Model ARV-3 Vacuum Mixer, Thinky USA, Inc. Laguna Hills, Calif.). The example was cured for 3 hour at 80° C. followed by a post cure for 2 hour at 150° C.

TABLE 13

| Composition and characterization of cured control and silica nanocomposites | | | | | | |
|---|---|---|---|---|---|---|
| | Control | Solvent-based | Solvent-free | | | |
| Example | CE 8a | CE 7b | EX 13a | EX 14a | EX 15a | EX 16a |
| Silica Particle | n/a[1] | NALCO | TIXOSIL | TIXOSIL | NANOSIL | NANOSIL |
| Surface Agent | n/a | TMPS | W9010 | W9010 | W9010 | W9010 |
| Epoxy Nanocomposite (wt. %) | — | 48.0 (CE 7) | 60.6 (EX 13) | 51.1 (EX 14) | 51.1 (EX 15) | 51.1 (EX 16) |
| Curing Agent Nanocomposite (wt. %) | — | — | — | 48.9 (EX 17) | 48.9 (EX 18) | 48.9 (EX 19) |
| Epoxy (EPON 826) (wt. %) | 40.9 | 5.0 | 1.2 | — | — | — |
| Diluent (HELOXY 107) (wt. %) | 10.2 | 8.1 | 0.3 | — | — | — |
| Curing Agent (LINDRIDE 36V) (wt. %) | 48.8 | 38.9 | 37.9 | — | — | — |
| $E'_{glass}$ (Mpa) | 1,265 | 1,589 | — | 2,038 | 1,408 | 2,220 |
| Tg (° C.) | 135.8 | 131.8 | — | 112.7 | 126.9 | 119.6 |
| $E'_{rubber}$ (Mpa) | 25.23 | 31.86 | — | 19.77 | 26.18 | 34.22 |

Figure 8:
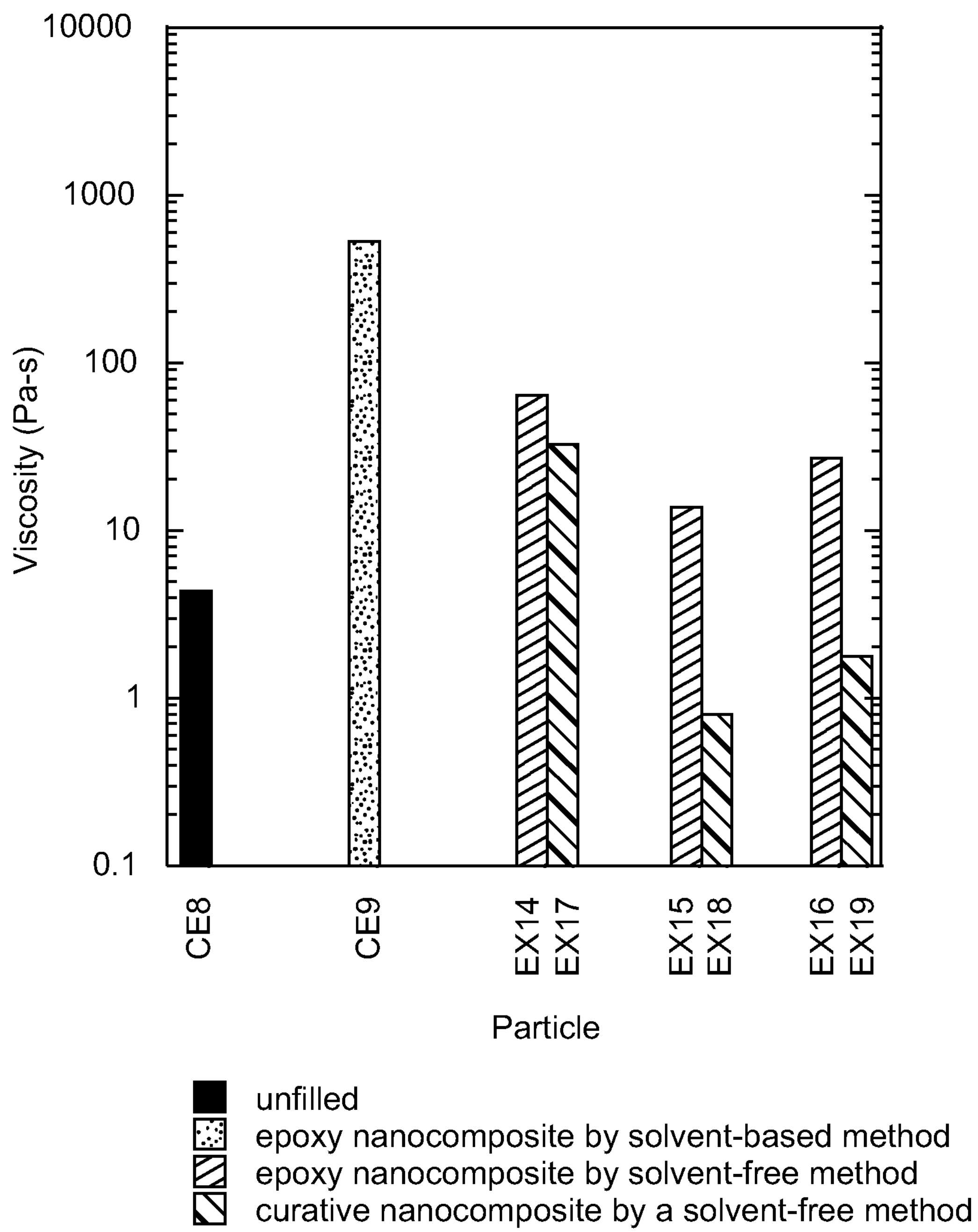
FIG. 8 is a graph presenting the measured viscosity of each of Comparative Example 8, Comparative Example 7, Example 14, Example 15, Example 16, Example 17, Example 18, and Example 19.
Figure 9:
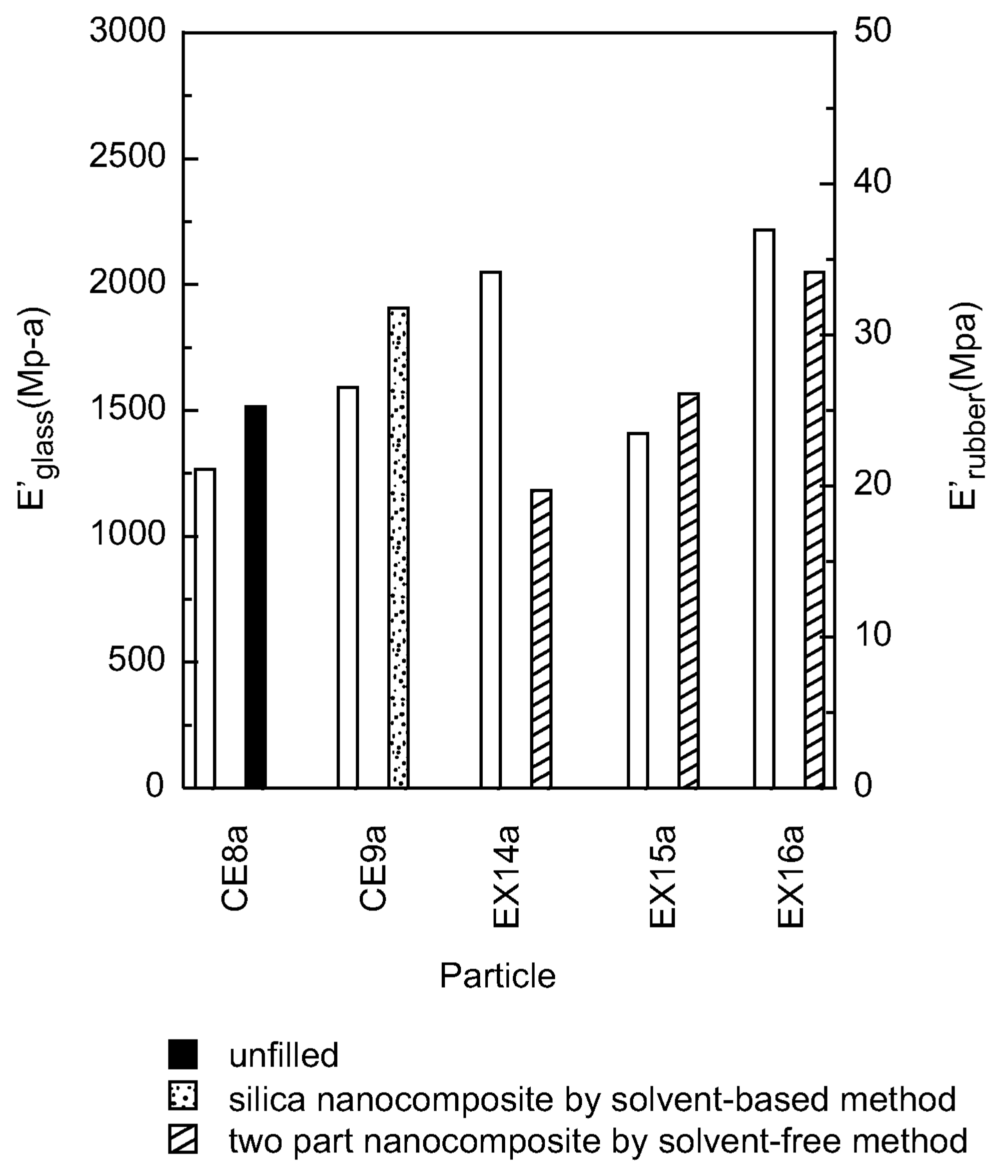

Nearly a 1:1 curing agent to epoxy ratio is required with the anhydride curing agent (LINDRIDE 36V). Therefore, the silica concentration in the epoxy nanocomposite must be high due to the dilution effect of the curing agent. To mitigate the need to process at high silica concentrations, a two part curable nanocomposite method was developed. The two part nanocomposite, an epoxy nanocomposite and a curative nanocomposite, each at the same silica concentration, was milled by a solvent-free method. FIG. 8 shows the viscosity of each of the two parts of the curable nanocomposite is lower than that of the concentrated (42 wt. %) epoxy nanocomposite with the exception of the concentrated (33 wt/o) epoxy nanocomposite prepared with precipitated silica of Example 14. The viscosity of Example 14 needed to be measured at higher temperature due to load limitations on the viscometer. The viscosity of Example 14 is given in Table 11. FIG. 9 shows the mechanical property results for the two part curable nanocomposite method. In the graph of FIG. 9, each of the white bars corresponds to the glassy modulus, whereas each of the patterned bars corresponds to the rubber modulus. Example 16a, which was prepared using the two part curable nanocomposite method, shows a significant mechanical property enhancement relative to the unfilled epoxy of Comparative Example 8a and the 20 wt % silica loaded epoxy nanocomposite of Comparative Example 9a which was prepared by the solvent-based method. The superior performance of Example 16a is due to high nanosilica loading in the cured epoxy utilizing the two part curable nanocomposite method. Further illustrating the benefit of the two part curable nanocomposite method is provided by comparing Example 13a and 14a. Example 13a shows an attempt to prepare a 20 wt. % silica nanocomposite by diluting a 33 wt. % epoxy nanocomposite with pure curing agent failed due to the high viscosity of the epoxy nanocomposite. However, the attempt to prepare a 20 wt. % silica nanocomposite from a two part curable nanocomposite using the same components was successful as exemplified in Example 14a, Comparative Example 9

Resin without Silica Nanocomposites

The resin of Comparative Example 9 was epoxy (EPON 826).

Comparative Example 10

Silica Nanocomposites by a Solvent-Based Method

The silica nanocomposite of Comparative Example 10 was prepared using a mixture of surface treated colloidal silicas (NALCO 2329 and NALCO 2327). The surface treatment process of Comparative Example 10 was similar to the methods described in Examples 1 and 9-13 of International Patent Application Publication No. WO 2009/120846 (Tiefenbruck et al.). Phenyl trimethoxysilane (TMPS) was used as the surface treatment agent. Upon completion of the surface treatment process, epoxy (EPON 826) was compounded into the dispersion. The dispersion was then fed through a wiped film evaporator to remove the water and solvent from the dispersion, according to methods described in International Patent Application Publication No. WO 2011/159521 (Thunhorst et al.). The completion of the stripping process yielded a nanocomposite of silane covalently bonded to the silica in epoxy. The silica nanocomposite was diluted with epoxy (EPON 826) using a speedmixer (Model ARV-3 Vacuum Mixer, Thinky USA, Inc., Laguna Hills, Calif.) to achieve the final composition of Table 14.

Example 20

Silica Nanocomposites by a Solvent-Based Method

The silica nanocomposite of Example 20 was prepared with a precipitated silica (TIXOSIL 68) using the Immersion Mill Method—Curable Resin Nanocomposites described above. The composition, milling conditions, and viscosity of the silica nanocomposite are given in Table 14.

Example 21

Silica Nanocomposites by a Solvent-Based Method

The silica nanocomposite of Example 21 was prepared as Example 20 except a pyrogenic silica (NANOSIL) was used.

TABLE 14

Composition, milling conditions, and characterization of control and epoxy nanocomposites

| | Control | Solvent-based | Solvent-free | |
|---|---|---|---|---|
| Example | CE 9 | CE 10 | EX 20 | EX 21 |
| Particle | n/a[1] | NALCO | TIXOSIL W9010 | NANOSIL |
| Surface Agent | n/a | TMPS | | W9010 |
| Nanoparticle (wt. %) | — | 20.0 | 20.0 | 20.0 |
| Epoxy (EPON 826) (wt. %) | 100.0 | 79.3 | 78.0 | 78.0 |
| Surface Agent (wt. %) | — | 0.7 | 2.0 | 2.0 |
| Mill Time (hr:min) | n/a | n/a | 5:00 | 2:00 |
| Mill Temperature (° C.) | n/a | n/a | 101 | 99 |
| Mean Particle Size (nm) | n/a | NM[2] | 101 | 107 |
| D90 Particle Size (nm) | n/a | NM | 128 | 146 |
| Peak 1 Distribution (%) | n/a | NM | 98.6 | 100 |
| Viscosity @ 30° C. (Pa-s) | 30 | 90 | 594 | 7.0 |

[1]n/a: not applicable.
[2]NM: not measured

Figure 10:
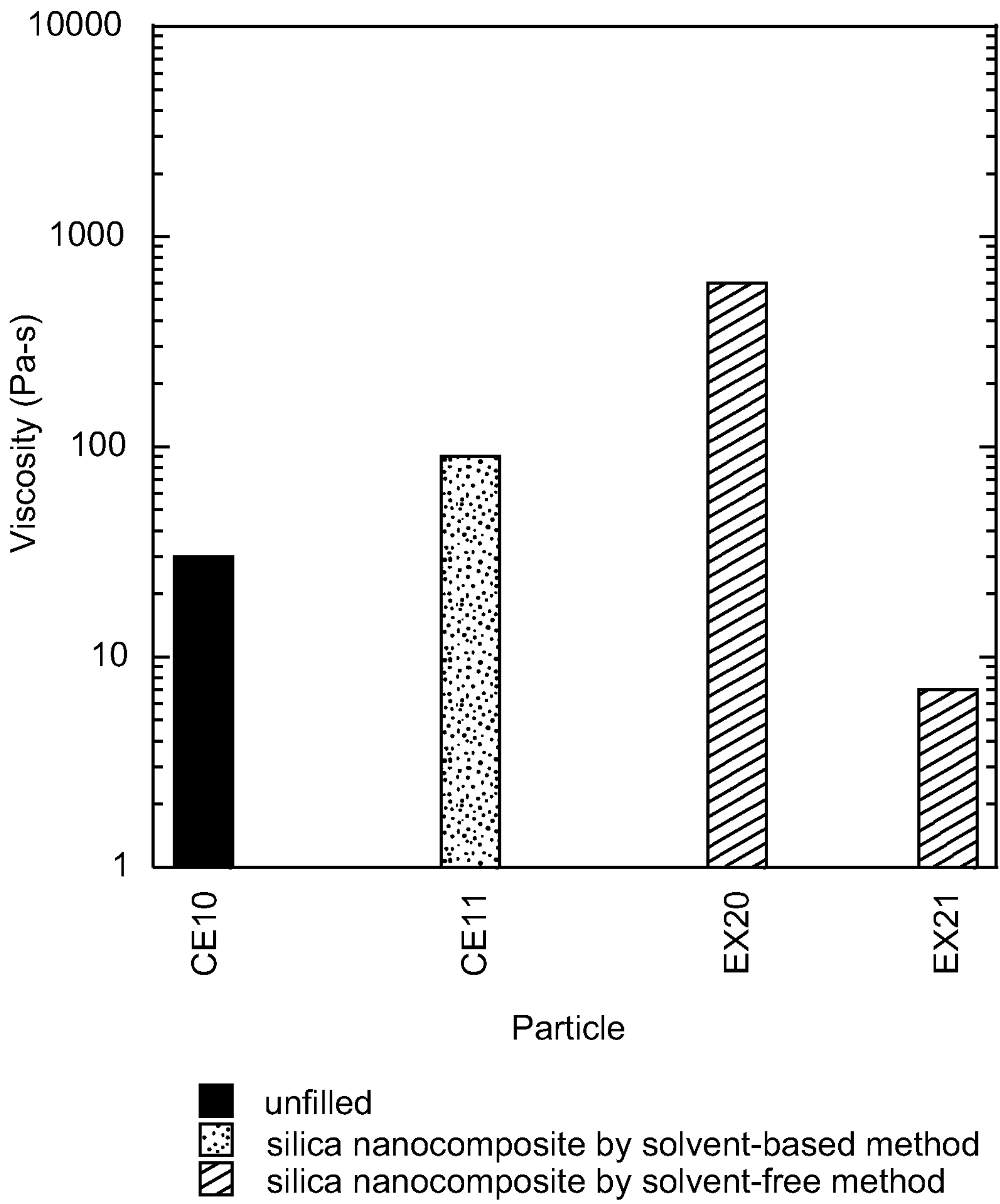
FIG. 10 is a graph presenting the measured viscosity of each of Comparative Example 9, Comparative Example 10, Example 20, and Example 21.

FIG. 10 shows the silica nanocomposite of Example 21 prepared with a low surface area pyrogenic silica (NANOSIL) and a solvent-free method exhibits similar viscosity to the silica nanocomposite of Comparative Example 10 which was prepared using a low surface area colloidal silica and solvent-based method.

Comparative Example 19a

Cured Resin without Silica Nanocomposites

Comparative Example 19a was prepared by mixing Comparative Example 9 with an amine curing agent (EPIKURE 3230) according to Table 15 using a speedmixer (Model ARV-3 Vacuum Mixer, Thinky USA, Inc., Laguna Hills, Calif.). The mixture was transferred to a mold and then placed in an oven. The example was cured for 2 hour at 80° C. followed by a post cure for 2 hour at 125° C.

Comparative Example 10a

Cured Silica Nanocomposite

Comparative Example 10a was prepared as Comparative Example 9a except the nanocomposite of Comparative Example 10 was used as the uncured resin.

Comparative Example 20a

Cured Silica Nanocomposite

Example 20a was prepared as Comparative Example 9a except the nanocomposite of Example 20 was used as the uncured resin.

Comparative Example 21a

Cured Silica Nanocomposite

Example 21a was prepared as Comparative Example 9a except the nanocomposite of Example 21 was used as the uncured resin.

TABLE 15

Composition and characterization of control and nanocomposites cured with amine curing agent (EPIKURE 3230)

| | Control | Solvent-based | Solvent-free | |
|---|---|---|---|---|
| Example | CE 9a | CE 10a | EX 20a | EX 21a |
| Particle | n/a[1] | NALCO TMPS | TIXOSIL W9010 | NANOSIL |
| Surface Agent | n/a | | | W9010 |
| Epoxy Nanocomposite (wt. %) | — | 79.4 (CE 10) | 79.1 (EX 20) | 79.1 (EX 21) |
| Epoxy (EPON 826) (wt. %) | 75.2 | — | — | — |
| Curing Agent (EPIKURE 2320) (wt. %) | 24.8 | 20.6 | 20.9 | 20.9 |
| $E'_{glass}$ (Mpa) | 1,256 | 1,447 | 1,447 | 1,426 |
| Tg (° C.) | 92.9 | 93.5 | 96.8 | 104.5 |
| $E'_{rubber}$ (Mpa) | 14.64 | 18.73 | 28.13 | 21.81 |

Figure 11:
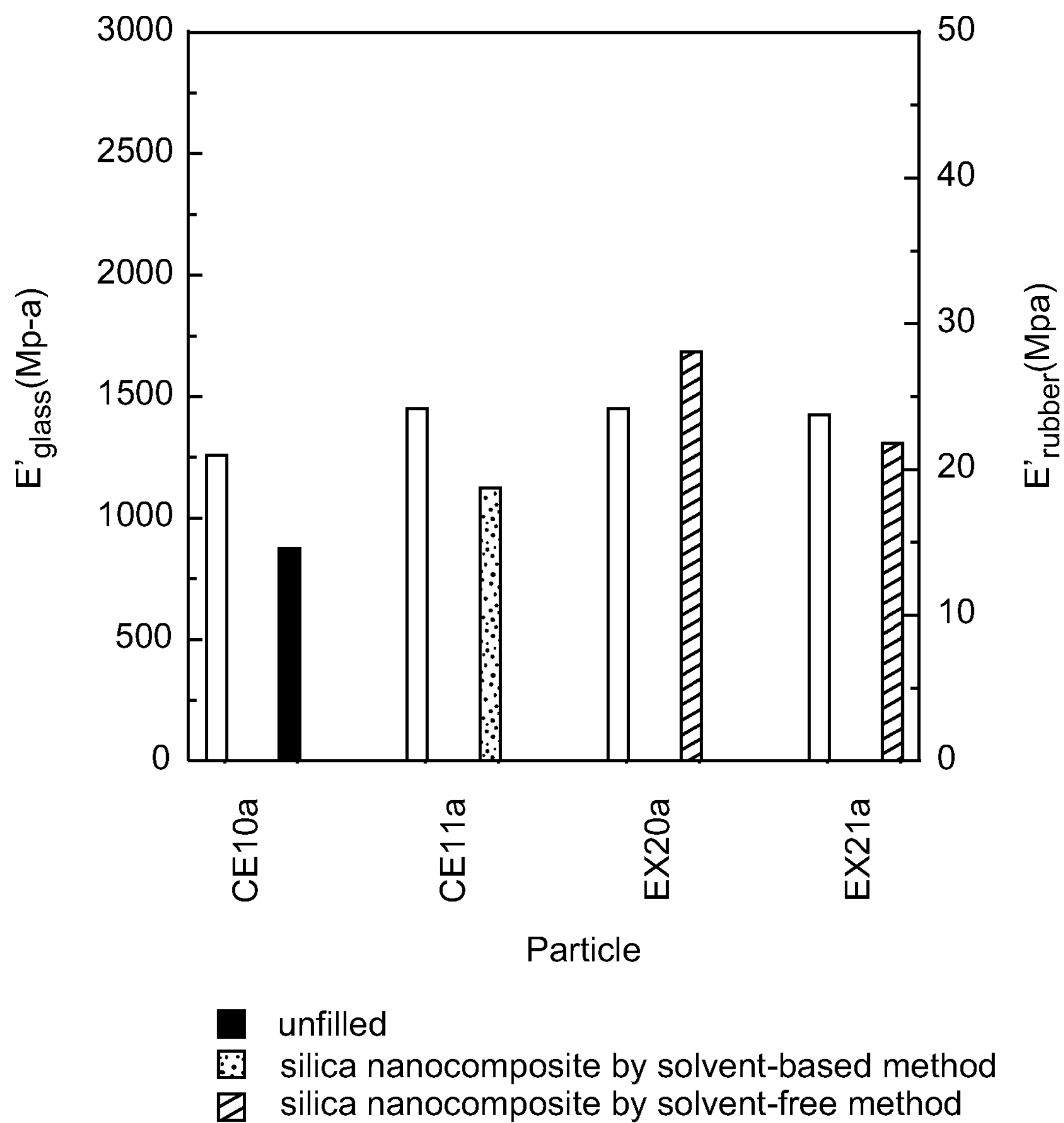
Figure 12A:
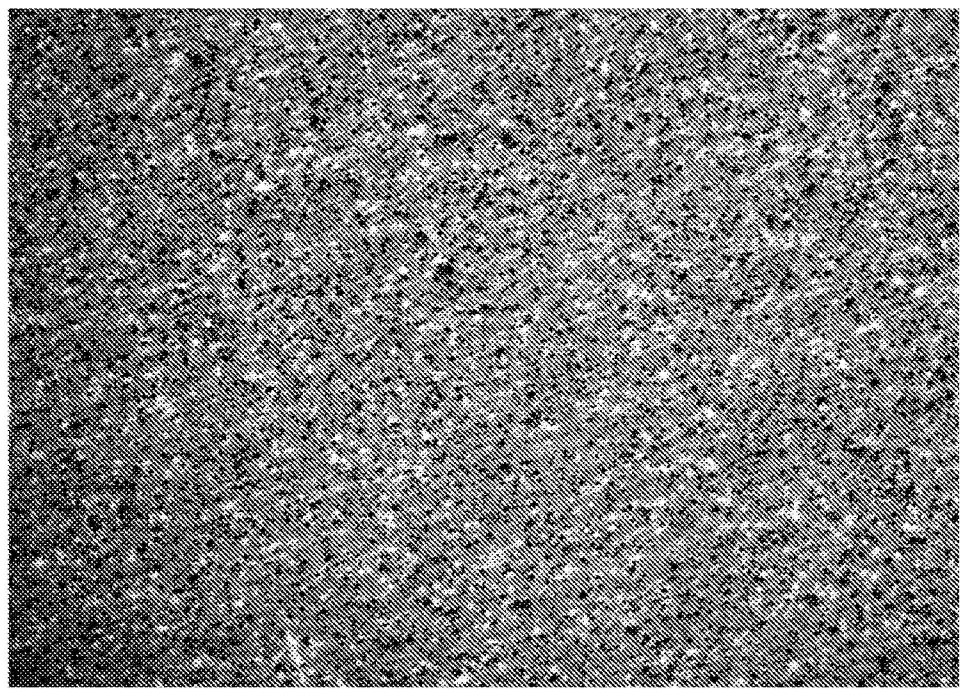
Figure 12B:
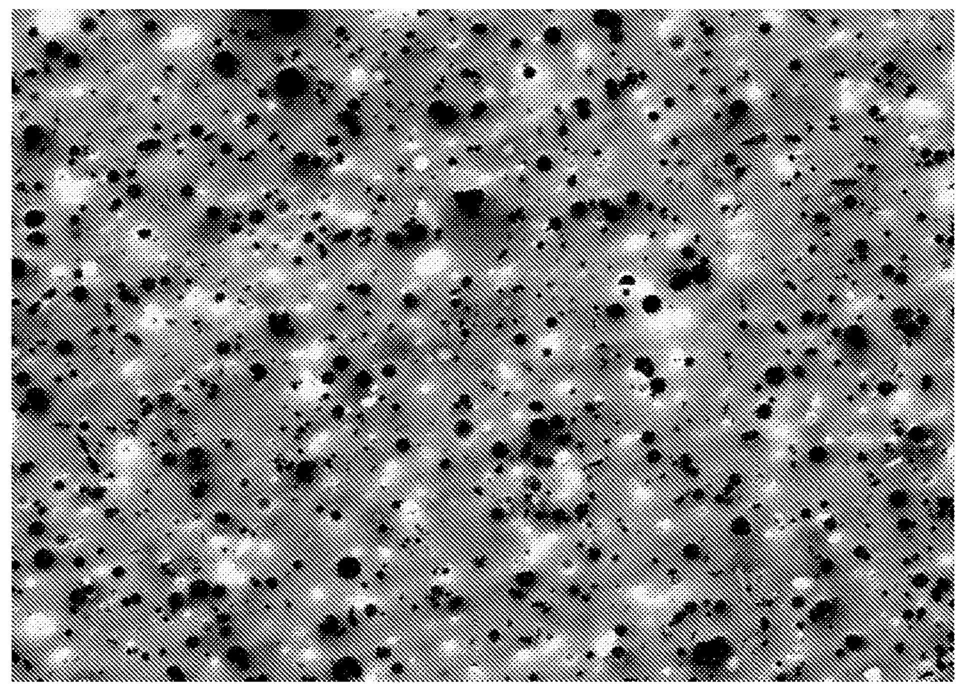
FIG. 12B is an SEM image of Example 21a, having a higher magnification than the SEM image of FIG. 12A.
Figure 13A:
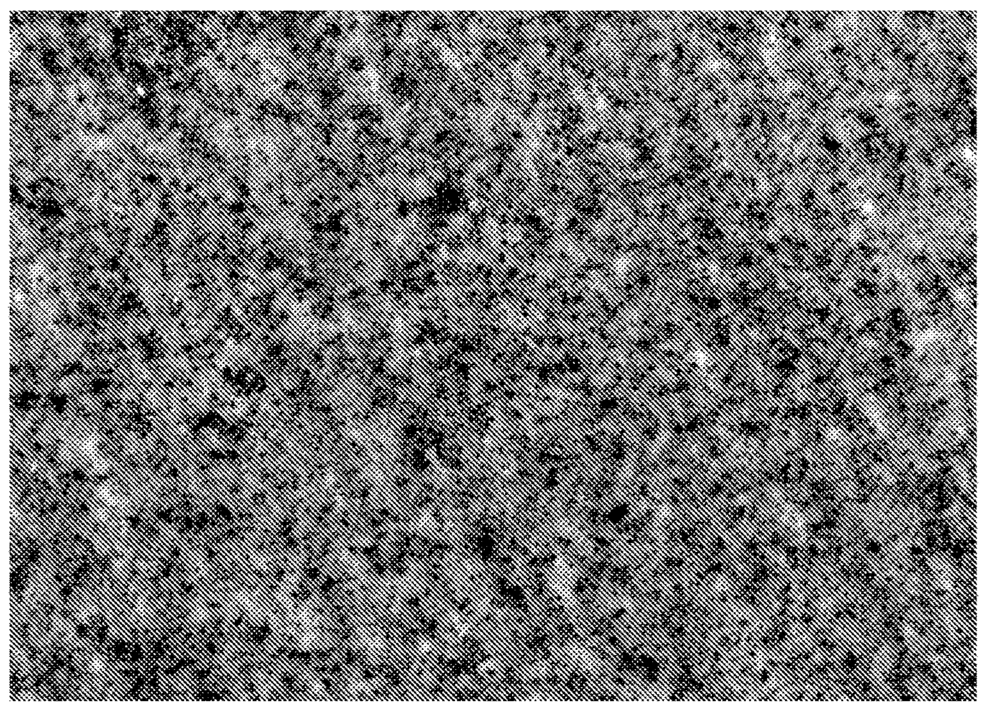
Figure 13B:
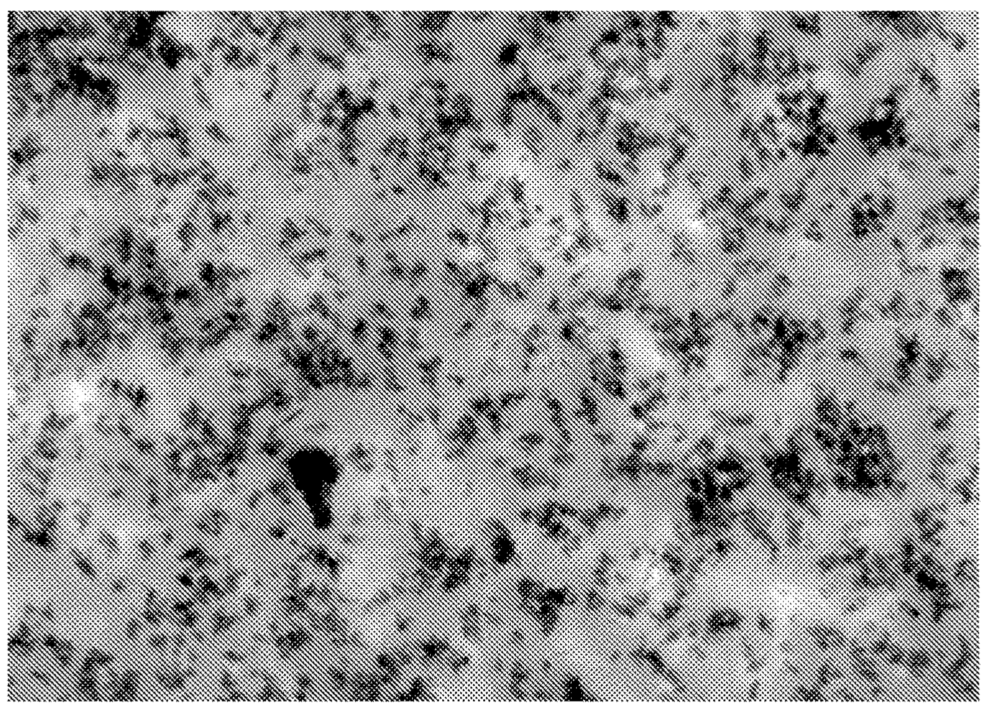
FIG. 13B is an SEM image of Example 20a, having a higher magnification than the SEM image of FIG. 13A.

FIG. 11 shows the mechanical performance of the low viscosity silica nanocomposite of Example 21 (NANOSIL) is higher than that of the unfilled resin of Comparative Example 19a and similar to that of the nanocomposite of Comparative Example 10a. In the FIG. 11, each of the white bars corresponds to the glassy modulus, whereas each of the patterned bars corresponds to the rubber modulus. FIGS. 12A and 12B provide scanning electron microscope (SEM) images of Example 21a at two different magnifications. The images show that the silica nanoparticles (NANOSIL) have spherical primary particles with a broad particle size distribution, and good dispersion quality in the nanocomposite is shown. FIGS. 13A and 13B provide SEM images of Example 20a, show that the silica nanoparticles (TIXOSIL) have nonspherical shapes with small primary particle sizes, and good dispersion quality in the nanocomposite is shown.

Comparative Example 11

Resin without Silica Nanocomposites

The resin of Comparative Example 11 was prepared by mixing epoxy resin (EPON 826) and reactive diluent (HELOXY 68) according to Table 16 using a speedmixer (Model ARV-3 Vacuum Mixer, Thinky USA, Inc., Laguna Hills, Calif.).

Comparative Example 12

Silica Nanocomposite by a Solvent-Based Method

The silica nanocomposite of Comparative Example 12 was prepared as Comparative Example 10 except the dilution was performed with epoxy (EPON 826) and reactive diluent (HELXOY 68). The composition of Comparative Example 12 is given in Table 16.

Example 22

Silica Nanocomposite by a Solvent-Free Method

The silica nanocomposite of Example 22 was prepared using the Immersion Mill Method—Curable Resin Nanocomposites described above with a precipitated silica (TIXOSIL 68). The milling conditions, final composition and viscosity are given in Table 16.

Example 23

Silica Nanocomposite by a Solvent-Free Method

The silica nanocomposite of Example 23 was prepared as Example 22 except a pyrogenic silica (NANOSIL) was used.

TABLE 16

Silica nanocomposites with epoxy (EPON 826) and reactive diluent (HELOXY 68)

| | Control | Solvent-based | Solvent-free | |
|---|---|---|---|---|
| Example | CE 11 | CE 12 | EX 22 | EX 23 |
| Particle | n/a[1] | NALCO TMPS | TIXOSIL W9010 | NANOSIL |
| Surface Agent | n/a | | | W9010 |
| Nanoparticle (wt. %) | — | 20.0 | 20.0 | 20.0 |
| Epoxy (EPON 826) (wt. %) | 75.0 | 59.5 | 58.5 | 58.5 |
| Diluent (HELOXY 68) (wt. %) | 25.0 | 19.8 | 19.5 | 19.5 |
| Surface Agent (wt. %) | — | 0.7 | 2.0 | 2.0 |
| Mill Time (hr:min) | n/a | n/a | 4:00 | 3:30 |
| Mill Temperature (° C.) | n/a | n/a | 98 | 84 |
| Mean Particle Size (nm) | n/a | NM[2] | 89 | 111 |
| D90 Particle Size (nm) | n/a | NM | 112 | 162 |
| Peak 1 Distribution (%) | n/a | NM | 100 | 100 |
| Viscosity @ 30° C. (Pa-s) | 1.7 | 5.8 | 3.8 | 6.0 |

NM: not measured

Comparative Example 11a

Cured Resin without Nanocomposites

Comparative Example 1a was prepared by mixing Comparative Example 11 with an amine curing agent (EPIKURE 3230) according to Table 17 using a speedmixer (Model ARV-3 Vacuum Mixer, Thinky USA, Inc., Laguna Hills, Calif.). The mixture was transferred to a mold and then placed in an oven. The example was cured for 2 hour at 80° C. followed by a post cure for 2 hour at 125° C.

Comparative Example 12a

Cured Silica Nanocomposite

Comparative Example 12a was prepared as Comparative Example 11a except the nanocomposite of Comparative Example 12 was used as the uncured resin.

Example 22a

Cured Silica Nanocomposite

Example 22a was prepared as Comparative Example 12a except the nanocomposite of Example 22 was used as the uncured resin.

Example 23a

Cured Silica Nanocomposite

Example 23a was prepared as Comparative Example 12a except the nanocomposite of Example 23 was used as the uncured resin.

TABLE 17

Composition and characterization of silica nanocomposites cured with amine (EPIKURE 3230)

| | Control | Solvent-based | Solvent-free | |
|---|---|---|---|---|
| Example | CE 11a | CE 12a | EX 22a | EX 23a |
| Particle | n/a[1] | NALCO TMPS | TIXOSIL W9010 | NANOSIL |
| Surface Agent | n/a | | | W9010 |
| Epoxy Nanocomposite (wt. %) | — | 78.7 (CE 12) | 78.7 (EX 22) | 78.7 (EX 23) |
| Epoxy (EPON 826) (wt. %) | 55.6 | — | — | — |
| Diluent (HELOXY 68) (wt. %) | 18.5 | — | — | — |
| Curing Agent (EPIKURE 3230) (wt. %) | 25.9 | 21.3 | 21.3 | 21.3 |
| $E'_{glass}$ (Mpa) | 1,516 | 1,987 | 1,896 | 1,640 |
| Tg (° C.) | 66.6 | 63.7 | 70.5 | 77.8 |
| $E'_{rubber}$ (Mpa) | 13.42 | 17.33 | 23.02 | 17.20 |

Figure 14:
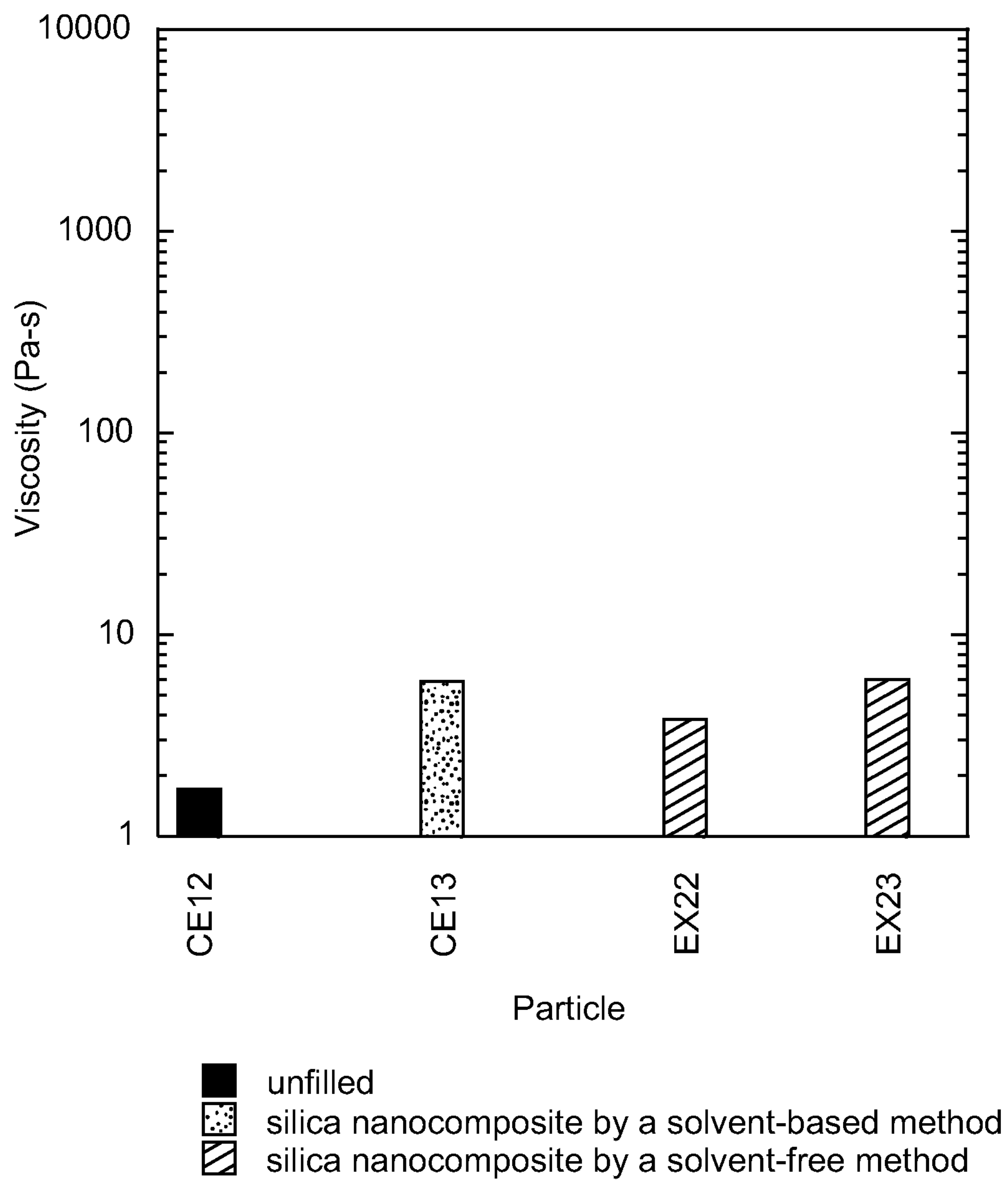
FIG. 14 is a graph presenting the measured viscosity of each of Comparative Example 11, Comparative Example 12, Example 22, and Example 23.
Figure 15:
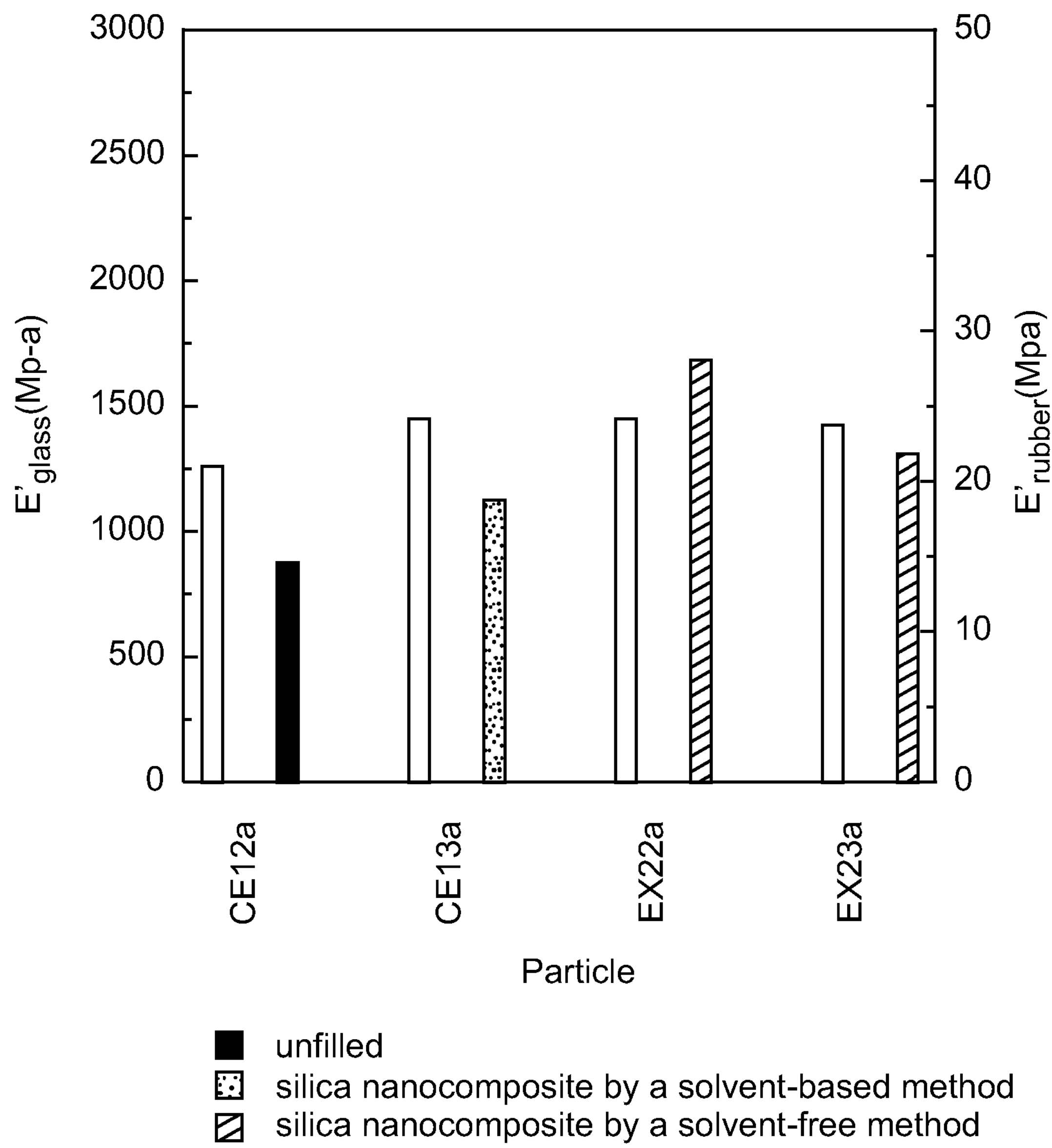

FIG. 14 shows the three silica nanocomposites exhibit similar low viscosity when diluted with HELOXY 68. FIG. 15 shows, as was the case in FIG. 11, the nanocomposites prepared by the solvent-free method, Examples 22a and 23a, exhibit higher mechanical performance than the unfilled resin of Comparative Example 11a and performance similar to that of the solvent-based nanocomposite of Comparative Example 12a. In FIG. 15, each of the white bars corresponds to the glassy modulus, whereas each of the patterned bars corresponds to the rubber modulus.

Comparative Example 13

Resin without Silica Nanocomposites

The resin of Comparative Example 13 was prepared by mixing epoxy resin (EPON 826) and reactive diluent (HELOXY 107) according to Table 18 using a speedmixer (Model ARV-3 Vacuum Mixer, Thinky USA, Inc., Laguna Hills, Calif.).

Comparative Example 14

Silica Nanocomposite by a Solvent-Based Method

The silica nanocomposite of Comparative Example 14 was prepared as Comparative Example 10 except the dilution was performed with epoxy (EPON 826) and reactive diluent (HELXOY 107). The composition of Comparative Example 14 is given in Table 18,

Example 24

Silica Nanocomposite by a Solvent-Free Method

The silica nanocomposite of Example 24 was prepared using the Immersion Mill Method—Curable Resin Nanocomposites described above with a precipitated silica (TIXOSIL 68). The milling conditions, final composition, and viscosity are given in Table 18.

Example 25

Silica Nanocomposite by a Solvent-Free Method

The silica nanocomposite of Example 25 was prepared as Example 24 except a pyrogenic silica (NANOSIL) was used.

TABLE 18

Silica nanocomposites with epoxy (EPON 826) and reactive diluent (HELOXY 107)

| | Control | Solvent-based | Solvent-free | |
|---|---|---|---|---|
| Example | CE 13 | CE 14 | EX 24 | EX 25 |
| Particle | n/a[1] | NALCO TMPS | TIXOSIL W9010 | NANOSIL |
| Surface Agent | n/a | | | W9010 |
| Nanoparticle (wt %) | — | 41.7 | 33.0 | 50.0 |
| Epoxy (EPON 826) (wt. %) | 80.0 | 57.6 | 51.0 | 36.0 |
| Diluent (HELOXY 107) (wt. %) | 20.0 | — | 12.7 | 9.0 |
| Surface Agent (wt. %) | — | 0.7 | 3.3 | 5.0 |
| Mill Time (hr:min) | n/a | n/a | 5:00 | 2:00 |
| Mill Temperature (° C.) | n/a | n/a | 112 | 99 |
| Mean Particle Size (nm) | n/a | NM[2] | 128 | 106 |
| D90 Particle Size (nm) | n/a | NM | 126 | 139 |
| Peak 1 Distribution (%) | n/a | NM | 96.4 | 100 |
| Viscosity @ 30° C. (Pa-s) | 4.4 | 530 | 233 @ 90° C. | 126 |

NM: not measured

Comparative Example 13a

Cured Resin without Nanocomposites

Comparative Example 13a was prepared by mixing Comparative Example 13 with an anhydride curing agent (LINDRIDE 36V) according to Table 19 using a speedmixer (Model ARV-3 Vacuum Mixer, Thinky USA, Inc., Laguna Hills, Calif.). The mixture was transferred to a mold and then placed in an oven. The example was cured for 3 hour at 80° C. followed by a post cure for 2 hour at 150° C.

Comparative Example 14a

Silica Nanocomposite by a Solvent-Based Method

Comparative Example 14a was prepared as Comparative Example 13a except the nanocomposite of Comparative Example 14 was used as the uncured resin.

Example 25a

Silica Nanocomposite by a Solvent-Free Method

Example 25a was prepared as Comparative Example 13a except the nanocomposite of Example 25 was used as the uncured resin.

Example 25b

Silica Nanocomposite by a Solvent-Free Method

Example 25b was prepared as Comparative Example 13a except the nanocomposite of Example 25 was used as the uncured resin.

TABLE 19

Composition and characterization of silica nanocomposites cured with anhydride (LINDRIDE 36V)

| | Control | Solvent-based | Solvent-free | |
|---|---|---|---|---|
| Example | CE 13a | CE 14a | EX 25a | EX 25b |
| Particle | n/a[1] | NALCO TMPS | NANOSIL | NANOSIL |
| Surface Agent | n/a | | W9010 | W9010 |
| Epoxy Nanocomposite (wt. %) | — | 48.0 (CE 14) | 39.8 (EX 25) | 62.3 (EX 25) |
| Epoxy (EPON 826) (wt %) | 40.9 | 5.0 | 17.5 | 4.4 |
| Diluent (HELOXY 107) (wt. %) | 10.2 | 8.1 | 4.4 | 1.3 |
| Curing Agent (LINDRIDE 36V) (wt. %) | 48.9 | 38.9 | 38.2 | 32.1 |
| $E'_{glass}$ (Mpa) | 1,265 | 1,589 | 1,713 | 2,136 |
| Tg (° C.) | 135.8 | 131.8 | 130.5 | 126.9 |
| $E'_{rubber}$ (Mpa) | 25.23 | 31.86 | 31.70 | 36.13 |

Figure 16:
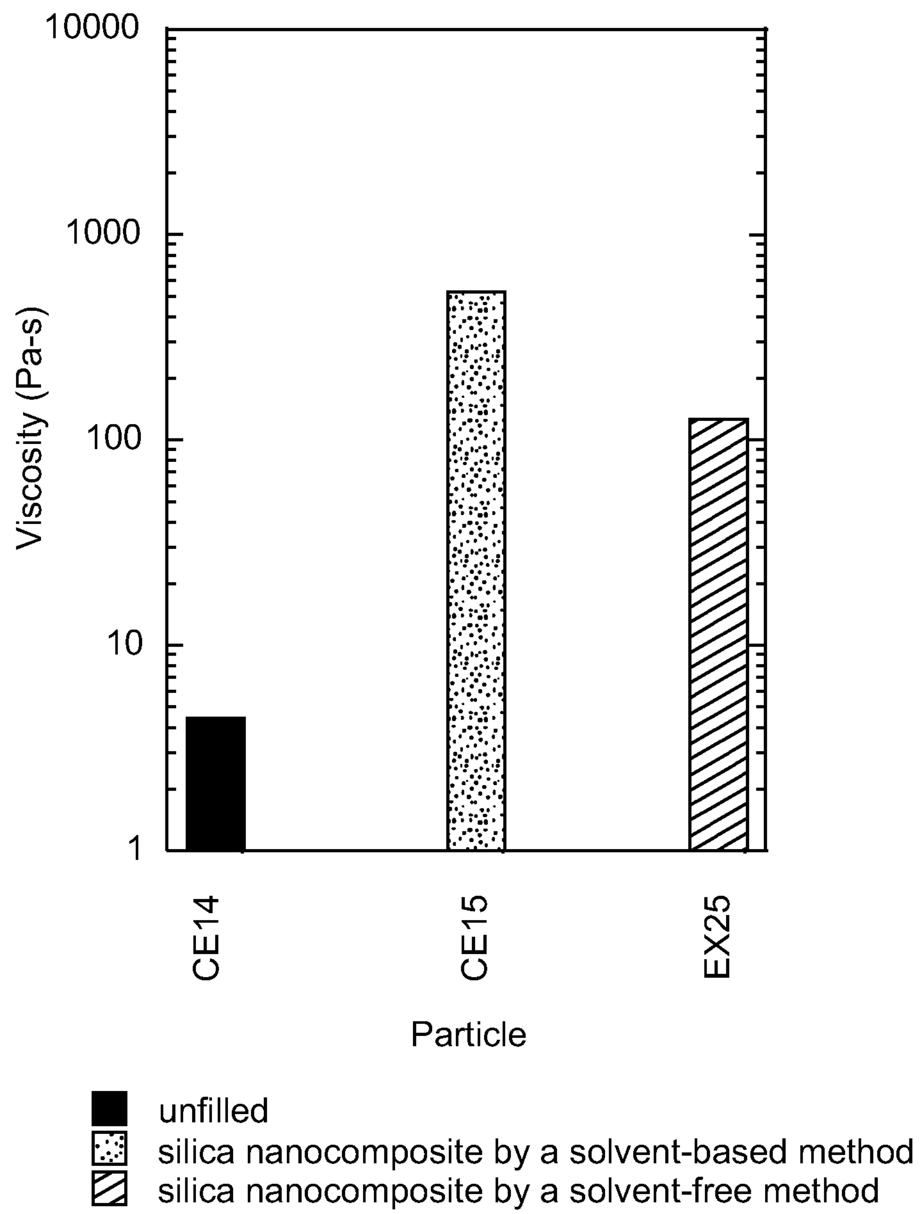
FIG. 16 is a graph presenting the measured viscosity of each of Comparative Example 13, Comparative Example 14, and Example 25.
Figure 17:
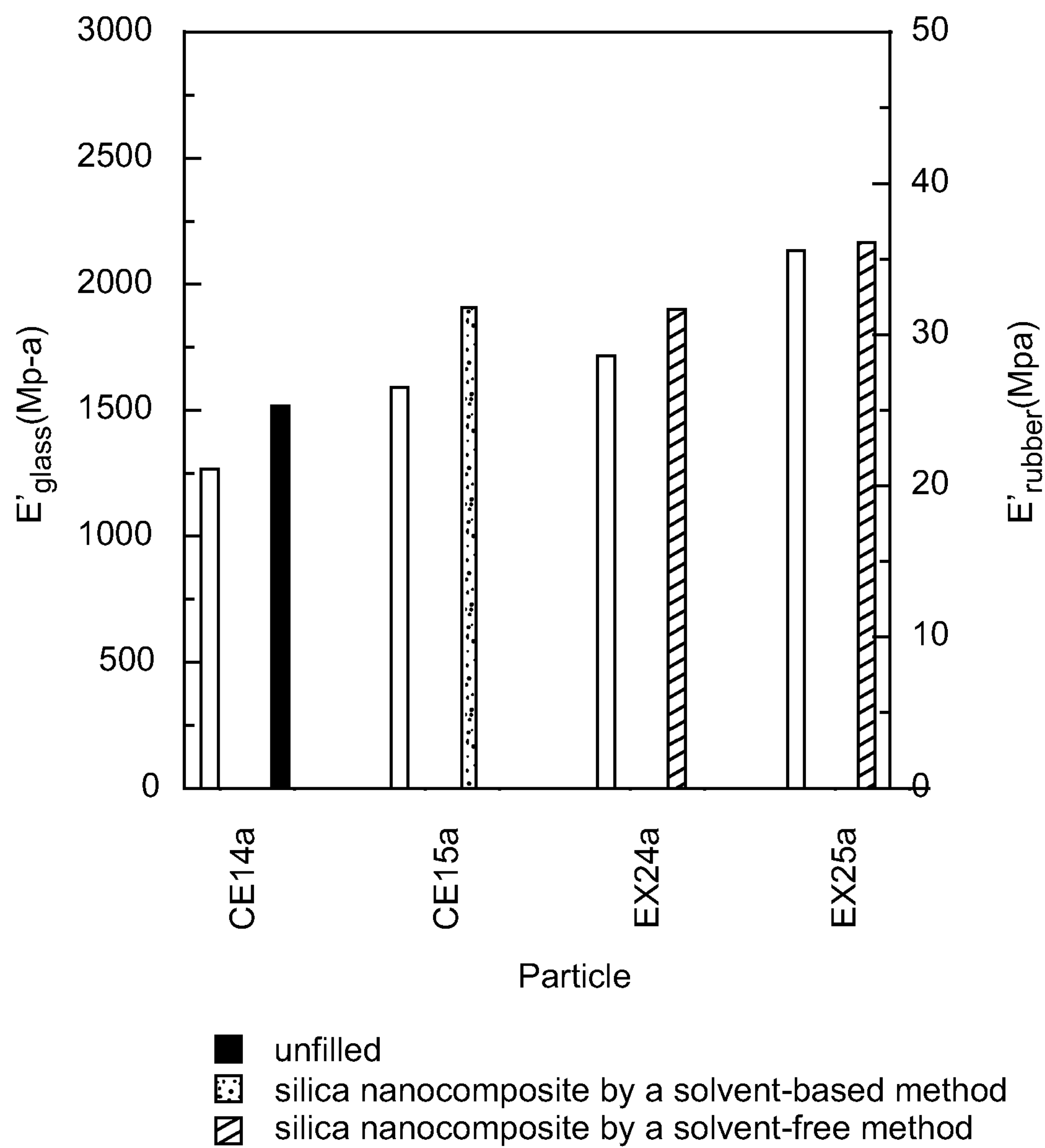
FIG. 17 is a graph presenting the measured storage modulus in the rubber plateau region and in the glassy plateau region of each of Comparative Example 13a, Comparative Example 14a, Example 25a, and Example 25b.

FIG. 16 shows the silica nanocomposite of Example 25 prepared with the NANOSIL exhibits the lowest viscosity even though it was the most concentrated of the three nanocomposites. The TIXOSIL nanocomposite, though milled successfully, was too viscous for room temperature mixing with the anhydride curing agent (LINDRIDE 36V). As shown in Table 18, the viscosity of the silica nanocomposite with 31 wt. % TIXOSIL 68 was 233 Pa·s at 90° C. FIG. 17 shows the cured NANOSIL silica nanocomposite of Example 25a exhibits higher glassy and rubber modulus relative to the unfilled resin of Comparative Example 13a and similar modulus values relative to the solvent-based silica nanocomposite of Comparative Example 14a. In the graph of FIG. 17, each of the white bars corresponds to the glassy modulus, whereas each of the patterned bars corresponds to the rubber modulus. Also shown in FIG. 17 is the silica nanocomposite with NANOSIL at higher silica loading, 31 wt. %. The low viscosity of the solvent-free nanocomposite of Example 25 with NANOSIL enables higher silica loadings of Example 25b and higher mechanical performance, as shown in FIG. 17.

Example 26 (Prophetic Example)

Pressure Vessel Containing Solvent-Free Silica Nanocomposite

Example 26 is prepared by forming a silica nanocomposite according to the formulation and method of Example 1. A pressure vessel is prepared by winding carbon fiber (e.g., TORAY T700SC-12000-SOC. Lot #A2106M2, Toray Carbon Fibers America, Inc., Decatur, Ala.) saturated in the silica nanocomposite, according to the coating process described in U.S. application Ser. No. 13/154,615 (Thunhorst et al.). The wound vessel is then cured according to the conditions described in U.S. application Ser. No. 13/154,615 (Thunhorst et al.) to form the pressure vessel.

While the specification has described in detail certain exemplary embodiments, it will be appreciated that those skilled in the art, upon attaining an understanding of the foregoing, may readily conceive of alterations to, variations of, and equivalents to these embodiments. Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

What is claimed is:

1. A nanocomposite comprising silica nanoparticles and a dispersant dispersed in a curable resin; wherein the silica nanoparticles comprise nonspherical precipitated silica nanoparticles, spherical pyrogenic silica nanoparticles, or a combination thereof, and wherein the nanocomposite contains less than 2% by weight solvent, and wherein the silica nanoparticles comprise a unimodal particle size distribution, and wherein the nonspherical precipitated silica nanoparticles comprise a population of clusters of primary spherical silica nanoparticles, the population of clusters having a mean size in the range of from 40 to 900 nanometers, and the primary spherical silica nanoparticles having a diameter in the range of from 1 to 100 nanometers.

2. The nanocomposite of claim 1 wherein the silica nanoparticles consist of nonspherical precipitated silica nanoparticles.

3. The nanocomposite of claim 1 wherein the silica nanoparticles consist of spherical pyrogenic silica nanoparticles.

4. The nanocomposite of claim 1 further comprising a catalyst for reacting silanol groups on the surface of the silica nanoparticles with the curable resin system.

5. The nanocomposite of claim 1 further including a surface treatment agent including an organosilane, a monohydric alcohol, a polyol, or a combination thereof.

6. The nanocomposite of claim 1 further comprising at least one diluent comprising a mono- or poly-functional glycidyl ether or styrene.

7. The nanocomposite of claim 1 further comprising at least one additive selected from the group consisting of curing agents, cure accelerators, defoamers, air release agents, crosslinking agents, dyes, flame retardants, pigments, impact modifiers, and flow control agents.

8. The nanocomposite of claim 1 wherein the curable resin comprises an epoxy resin, a curable imide resin, a vinyl ester resin, an acrylic resin, a bisbenzocyclobutane resin, a polycyanate ester resin, or a mixture thereof.

9. The nanocomposite of claim 1 wherein the nanocomposite comprises from about 10 to about 70 weight percent of the silica nanoparticles.

10. The nanocomposite of claim 1 further comprising a filler comprising at least one of reinforcing continuous fibers, reinforcing discontinuous fibers, and hollow glass bubbles, wherein the filler comprises carbon, glass, ceramic, boron, silicon carbide, basalt, polyimide, polyamide, polyethylene, polypropylene, polyacrylonitrile, or a combination thereof.

11. A prepreg comprising the nanocomposite of claim 1.

12. A nanocomposite consisting essentially of silica nanoparticles and a dispersant dispersed in a curing agent; wherein the silica nanoparticles comprise nonspherical precipitated silica nanoparticles, spherical pyrogenic silica nanoparticles, or a combination thereof, and wherein the nanocomposite contains less than 2% by weight solvent, and wherein the silica nanoparticles comprise a unimodal particle size distribution, and wherein the nonspherical precipitated silica nanoparticles comprise a population of clusters of primary spherical silica nanoparticles, the population of clusters having a mean size in the range of from 40 to 900 nanometers, and the primary spherical silica nanoparticles having a diameter in the range of from 1 to 100 nanometers.

13. A composite comprising from about 4 to 70 weight percent of silica nanoparticles, and a dispersant, dispersed in a cured resin; and a filler embedded in the cured resin, wherein the silica nanoparticles comprise nonspherical precipitated silica nanoparticles, spherical pyrogenic silica nanoparticles, or a combination thereof, and the filler comprising at least one of a reinforcing continuous fiber, reinforcing discontinuous fibers, and hollow glass bubbles, and wherein the silica nanoparticles comprise a unimodal particle size distribution, and wherein the nonspherical precipitated silica nanoparticles comprise a population of clusters of primary spherical silica nanoparticles, the population of clusters having a mean size in the range of from 40 to 900 nanometers, and the primary spherical silica nanoparticles having a diameter in the range of from 1 to 100 nanometers.

14. The composite of claim 13, wherein the silica nanoparticles comprise nonspherical precipitated silica nanoparticles.

15. An article comprising from about 10 to about 50 weight percent of silica nanoparticles, and a dispersant, dispersed in a cured resin; wherein the silica nanoparticles comprise nonspherical precipitated silica nanoparticles, spherical pyrogenic silica nanoparticles, or a combination thereof, and wherein the silica nanoparticles comprise a unimodal particle size distribution, and wherein the nonspherical precipitated silica nanoparticles comprising a population of clusters of spherical primary nanoparticles, the population of clusters having a mean size in the range of from 40 to 900 nanometers, and the primary silica nanoparticles having a diameter in the range of from 1 to 100 nanometers.

16. The article of claim 15 wherein the silica nanoparticles comprise nonspherical precipitated silica nanoparticles.

17. The article of claim 15 wherein the article comprises a turbine blade, a pressure vessel, an aerospace part, a cable, or sporting goods equipment.

18. The article of claim 17 wherein the article comprises a pressure vessel.

19. A method of preparing a nanoparticle-containing curable resin system comprising:

mixing from 10 to 70 weight percent of aggregated silica nanoparticles with a curable resin, a first dispersant, and optionally a catalyst, a surface treatment agent, and/or a diluent, to form a first mixture, wherein the mixture comprises less than 2% by weight solvent; and milling the first mixture in a first immersion mill comprising milling media to form a milled resin system comprising silica nanoparticles and the first dispersant dispersed in the curable resin, wherein the silica nanoparticles comprise nonspherical precipitated silica nanoparticles comprising a population of clusters of primary spherical silica nanoparticles, the population of clusters having a mean size in the range of from 40 to 900 nanometers, and the primary spherical silica nanoparticles having a diameter in the range of from 1 to 100 nanometers.

20. The method of claim 19 further comprising:

mixing from 10 to 70 weight percent of aggregated silica nanoparticles with a curing agent and a second dispersant to form a second mixture, wherein the second mixture comprises less than 2% by weight solvent;

milling the second mixture in a second immersion mill comprising milling media to form a milled composition comprising silica nanoparticles and the second dispersant dispersed in the curing agent; and mixing the milled resin system with the milled composition.

21. The method of claim 19, wherein the milling media includes yttrium-stabilized zirconia beads.

* * * * *

UNITED STATES PATENT AND TRADEMARK OFFICE

CERTIFICATE OF CORRECTION

PATENT NO. : 10,442,914 B2
APPLICATION NO. : 14/911058
DATED : October 15, 2019
INVENTOR(S) : Peter Condo et al.

It is certified that error appears in the above-identified patent and that said Letters Patent is hereby corrected as shown below:

In the Specification

Column 2,
Line 63, delete “Example 1.” and insert -- Example 1, --, therefor.

Column 6,
Line 45, delete “C=C).” and insert -- C≡C). --, therefor.

Column 8,
Line 51, delete “m/” and insert -- $m^2$/ --, therefor.

Column 9,
Line 42, delete “I-DK” and insert -- HDK --, therefor.
Line 43, delete “IHP” and insert -- HP --, therefor.
Line 47, delete “XYSII” and insert -- XYSIL --, therefor.
Line 48, delete “Company.” and insert -- Company, --, therefor.
Line 57, delete “5” and insert -- 15 --, therefor.

Column 12,
Lines 24 & 25, delete “4,4’-dihbydroxydiphenyl” and insert -- 4,4’-dihydroxydiphenyl --, therefor.

Column 13,
Line 21, delete “triacrylate:” and insert -- triacrylate; --, therefor.
Line 25, delete “ether,” and insert -- ether; --, therefor.
Lines 43 & 44, delete “1,4-dicyanatobcnzene,” and insert -- 1,4-dicyanatobenzene, --, therefor.

Column 16,
Lines 17 & 18, delete “theological” and insert -- rheological --, therefor.

Signed and Sealed this
Eighteenth Day of February, 2020

Andrei Iancu
*Director of the United States Patent and Trademark Office*

Column 17,
Line 2, delete "Resins." and insert -- Resins, --, therefor.

Column 18,
Line 39, delete "in" and insert -- In --, therefor.

Column 29,
Line 63, delete "methylethyl idene)" and insert -- methylethylidene) --, therefor.

Column 32,
Line 20, delete "(Brookfleld" and insert -- (Brookfield --, therefor.

Column 33,
Line 10, delete "4.000" and insert -- 4,000 --, therefor.
Line 53, delete "4.000" and insert -- 4,000 --, therefor.

Column 41,
Line 18, delete "international" and insert -- International --, therefor.

Column 45,
Line 24, delete "Hills." and insert -- Hills, --, therefor.
Line 35, delete "Lagunn" and insert -- Laguna --, therefor.

Column 46,
Line 14, delete "Hills." and insert -- Hills, --, therefor.
Line 42, delete "Inc." and insert -- Inc., --, therefor.

Column 47,
Line 13, delete "wt/o)" and insert -- wt%) --, therefor.
Line 38, delete "14a," and insert -- 14a. --, therefor.

Column 50,
Line 52, delete "1a" and insert -- 11a --, therefor.

Column 52,
Line 2, delete "18," and insert -- 18. --, therefor.

Column 54,
Line 2, delete "SOC," and insert -- 50C, --, therefor.